United States Patent
Volin

(10) Patent No.: US 10,244,731 B1
(45) Date of Patent: Apr. 2, 2019

(54) FOURTEEN-DEVICE-IN-ONE CRUMPLABLE-SEATBELTABLE-RAMPABLE-LEGGABLE-TOP-PANEL PET CRATE, HAVING CRUMPLABLE-SEATBELTABLE-RAMPABLE-LEGGABLE-TOP-PANEL SYSTEM, TOP PANEL-LOCKING-AND-RELEASING STOPPER-AND-HOOK SYSTEMS, SIDE PANEL-LOCKING-AND-RELEASING STOPPER-AND-HOOK SYSTEMS, AND REMOVABLE MULTI-FUNCTION DOUBLE-CLIP-AND-RING-HOOK SYSTEMS

(71) Applicant: Dee Volin, Gresham, OR (US)

(72) Inventor: Dee Volin, Gresham, OR (US)

( * ) Notice: Subject to any disclaimer, the term of this patent is extended or adjusted under 35 U.S.C. 154(b) by 0 days.

(21) Appl. No.: 16/175,347

(22) Filed: Oct. 30, 2018

(51) Int. Cl.
*A01K 1/03* (2006.01)
*A01K 1/02* (2006.01)

(52) U.S. Cl.
CPC .......... *A01K 1/034* (2013.01); *A01K 1/0272* (2013.01)

(58) Field of Classification Search
CPC .......... A01K 1/034; A01K 1/03; A01K 1/032; A01K 1/035; A01K 1/0272; A01K 1/0236; A01K 1/0245; A01K 1/02
See application file for complete search history.

(56) References Cited

U.S. PATENT DOCUMENTS

| 844,955 A | 2/1907 | Morgan |
|---|---|---|
| 3,896,766 A | 7/1975 | Martin |

(Continued)

FOREIGN PATENT DOCUMENTS

FR 770055 A * 9/1934 ............ A01K 1/032

*Primary Examiner* — Jessica B Wong

(57) ABSTRACT

A fourteen-device-in-one crumplable-seatbeltable-rampable-leggable-top-panel pet crate comprises crumplable-seatbeltable-rampable-leggable top, bottom, left, right, front, and rear panels attached to one another, removable multi-function mezzanine, removable crumple-zone multi-function locking double clips, removable crumple-zone multi-function accessory-hanging ring hooks for holding towels and accessories, left door, front door, top quick-panel-locking-and-releasing stoppers and hooks for safely and releasably locking the front and rear panels to the top panel, and side quick-panel-locking-and-releasing stoppers and hooks for safely and releasably locking the front and rear panels to the left and right panels. The removable crumple-zone multi-function locking double clips enable the crumplable-seatbeltable-rampable-leggable top panel to be removed and stored inside the tray at the bottom of the pet crate to reduce 30% of the thickness of the NON-removable-top-panel pet crate when the pet crate is folded for storage and transportation. The removable crumple-zone multi-function locking double clips enable the crumplable-seatbeltable-rampable-leggable top panel to function as a hanger, an arm, a lid, a convertor, a car-seat fastener, a spike, a leg, a ladder, a ramp, and a crumple zone when attached to a seat or headrest to absorb collision to protect pets in an accident. The removable crumple-zone multi-function locking double clips also enable the crumplable-seatbeltable-rampable-leggable top panel and the removable multi-function mezzanine to divide the pet crate into multiple compartments and stories for multiple pets, and to function as removable roof, floor, ramp, balcony, awning, partition, ceiling, angled divider, pet toy storage, patio.

20 Claims, 84 Drawing Sheets

(56) References Cited

U.S. PATENT DOCUMENTS

| | | |
|---|---|---|
| 3,951,106 A | 4/1976 | Wright |
| 4,319,545 A | 3/1982 | Sou |
| 4,763,606 A | 8/1988 | Ondrasik |
| 5,626,098 A | 5/1997 | Askins |
| 5,671,698 A | 9/1997 | Farrugia |
| 6,408,797 B2 | 6/2002 | Pivonka |
| 6,732,676 B1 | 11/2004 | Smith |
| D611,202 S | 3/2010 | Jakubowski |
| 7,926,447 B2 | 4/2011 | Flannery |
| 8,267,048 B2 | 9/2012 | Flannery |
| 8,336,500 B1 | 12/2012 | Britt |
| D723,225 S | 2/2015 | Lee |
| 9,119,375 B2 | 9/2015 | Flannery |
| 9,339,006 B1 | 5/2016 | Eby |
| 2006/0150917 A1 | 7/2006 | Morton |
| 2007/0000447 A1* | 1/2007 | Jakubowski ........... A01K 1/034 119/453 |
| 2015/0034018 A1 | 2/2015 | Edmonds |

* cited by examiner

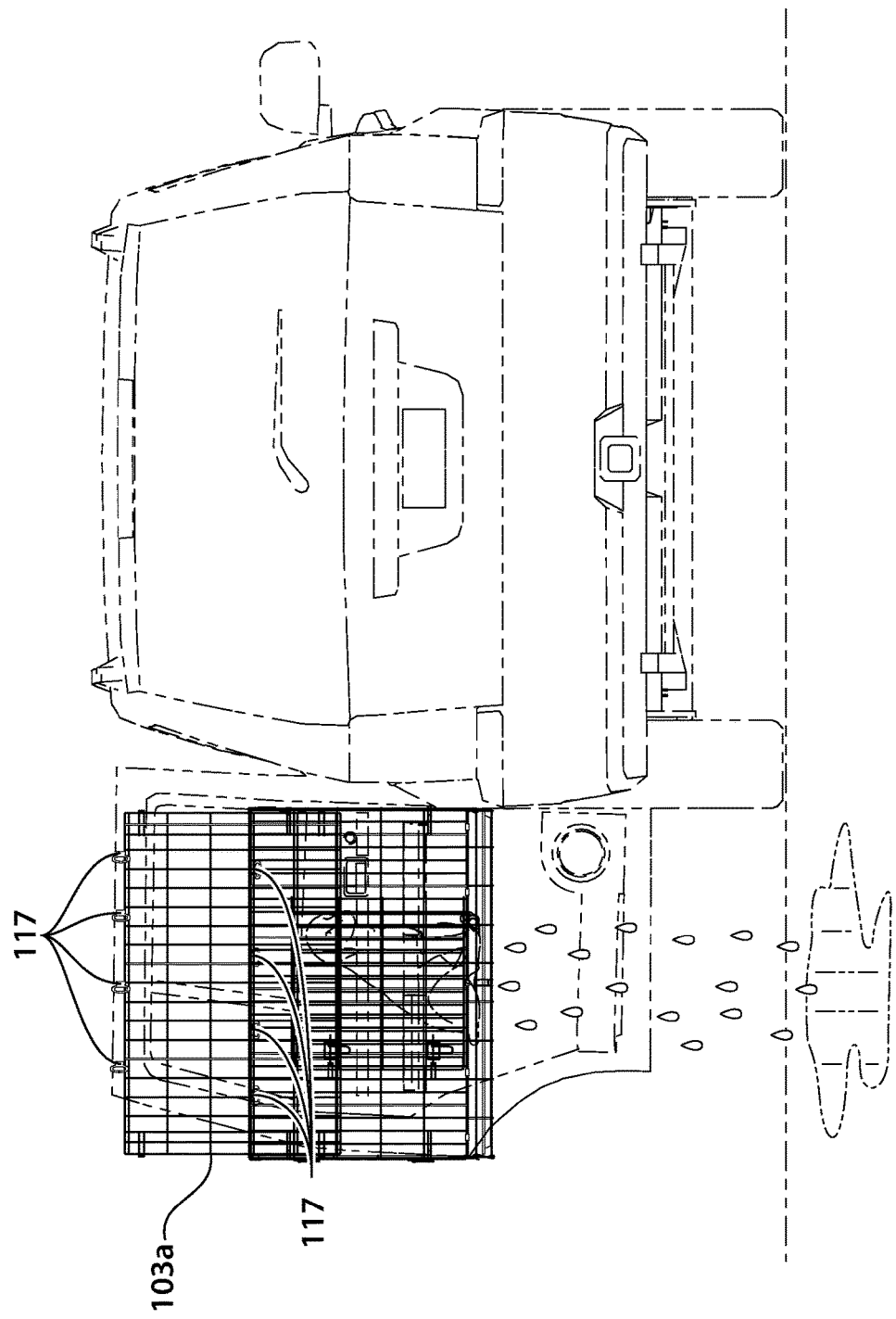

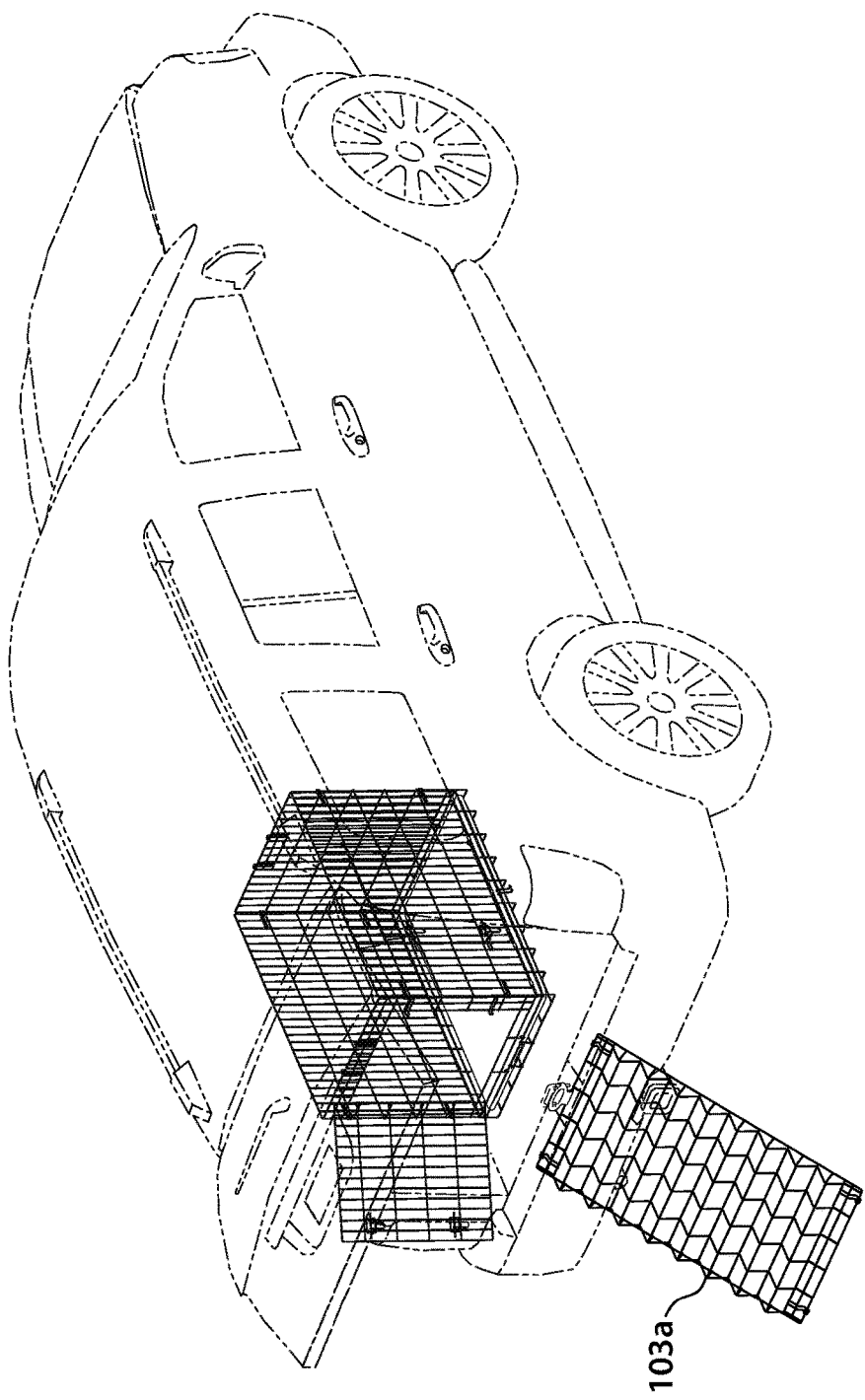

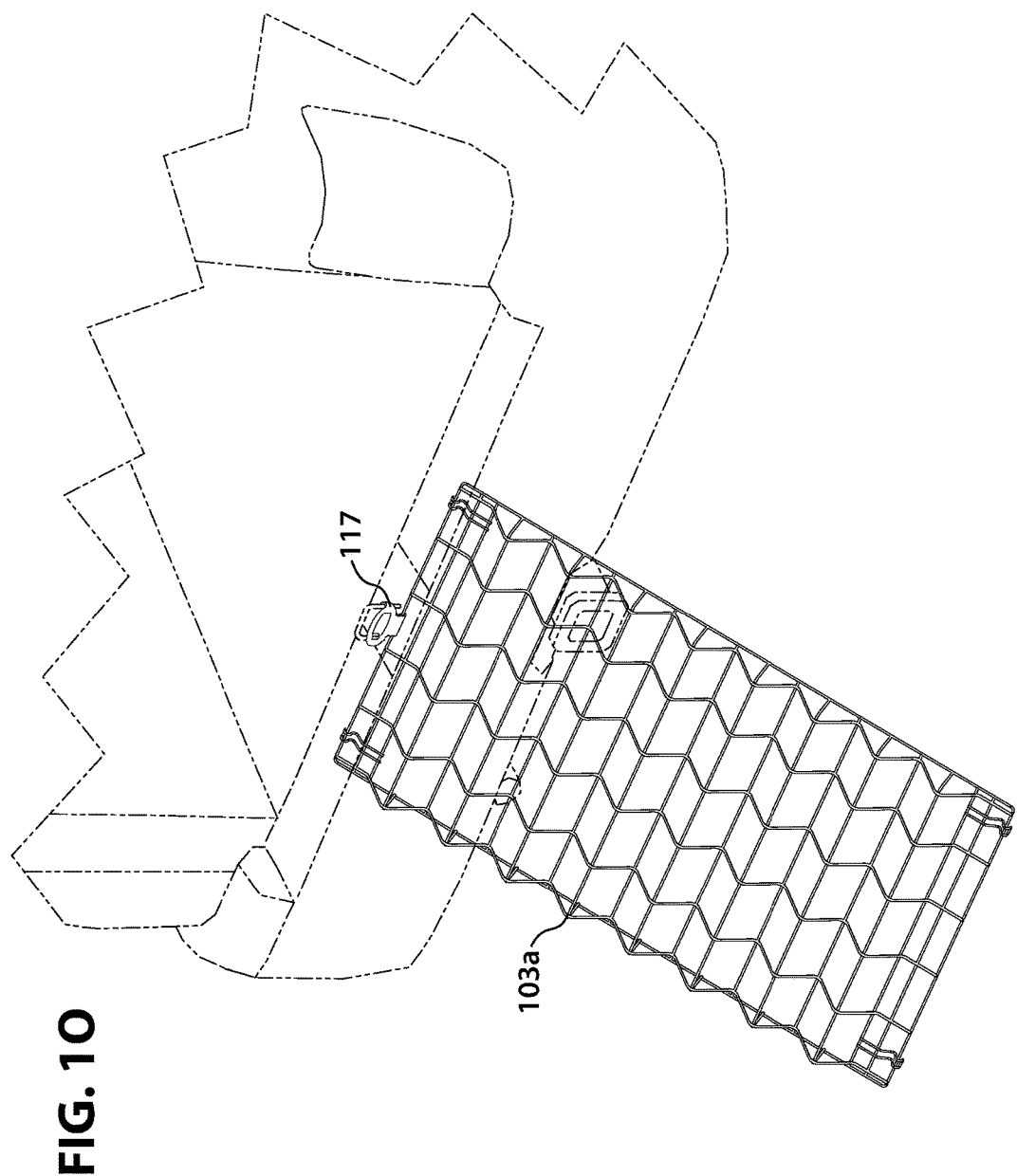

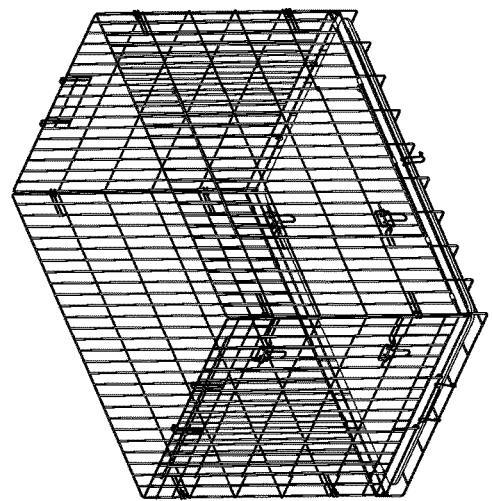
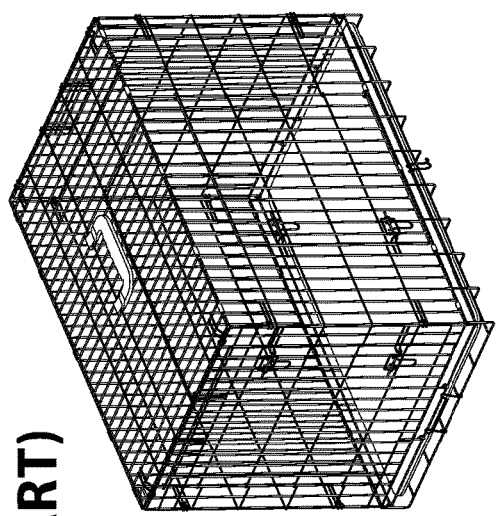
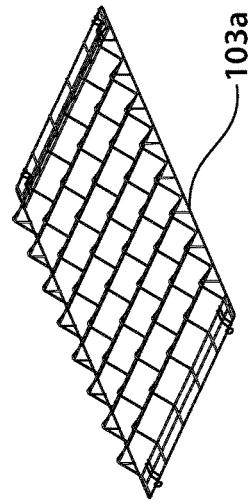
FIG. 1P
(PRIOR ART)
FIG. 1Q

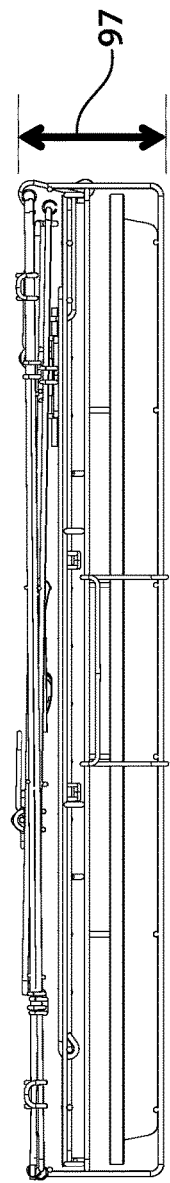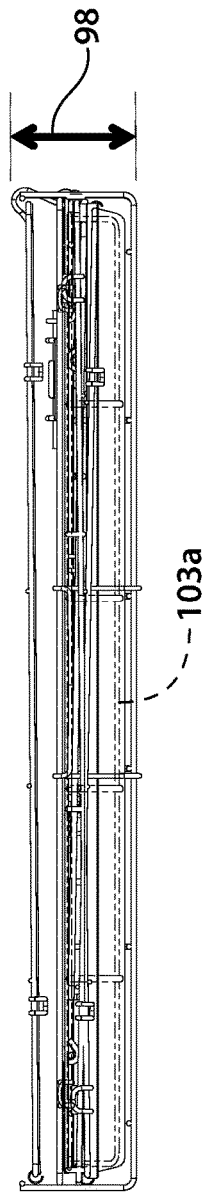
FIG. 2C (PRIOR ART)
FIG. 2D

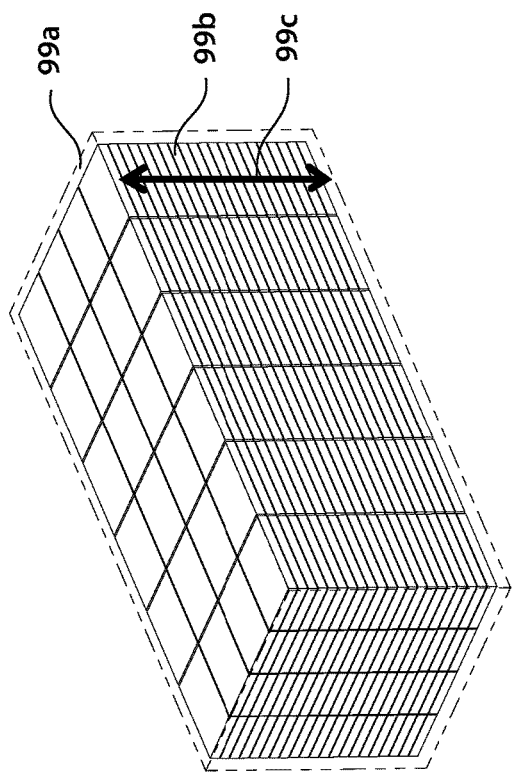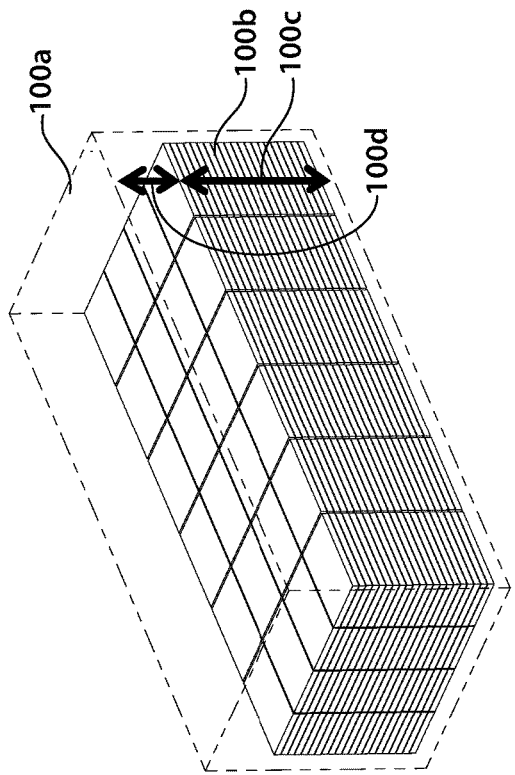
FIG. 3A
(PRIOR ART)
FIG. 3B

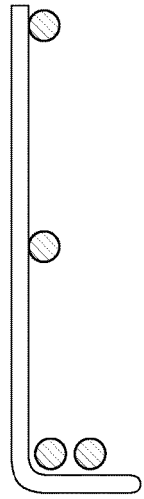
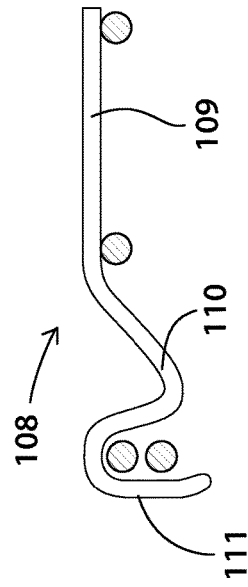
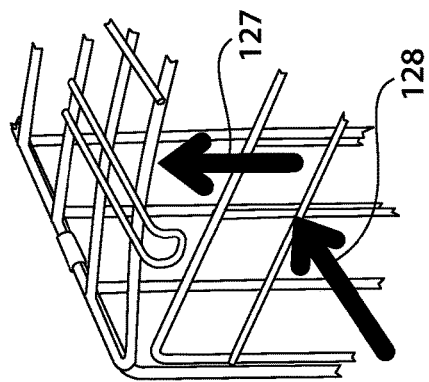
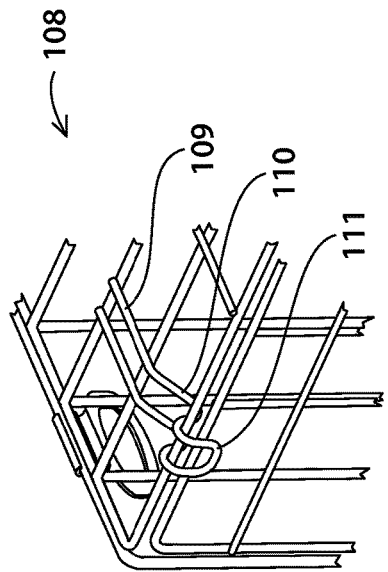
FIG. 3D (PRIOR ART)
FIG. 3F
FIG. 3C (PRIOR ART)
FIG. 3E

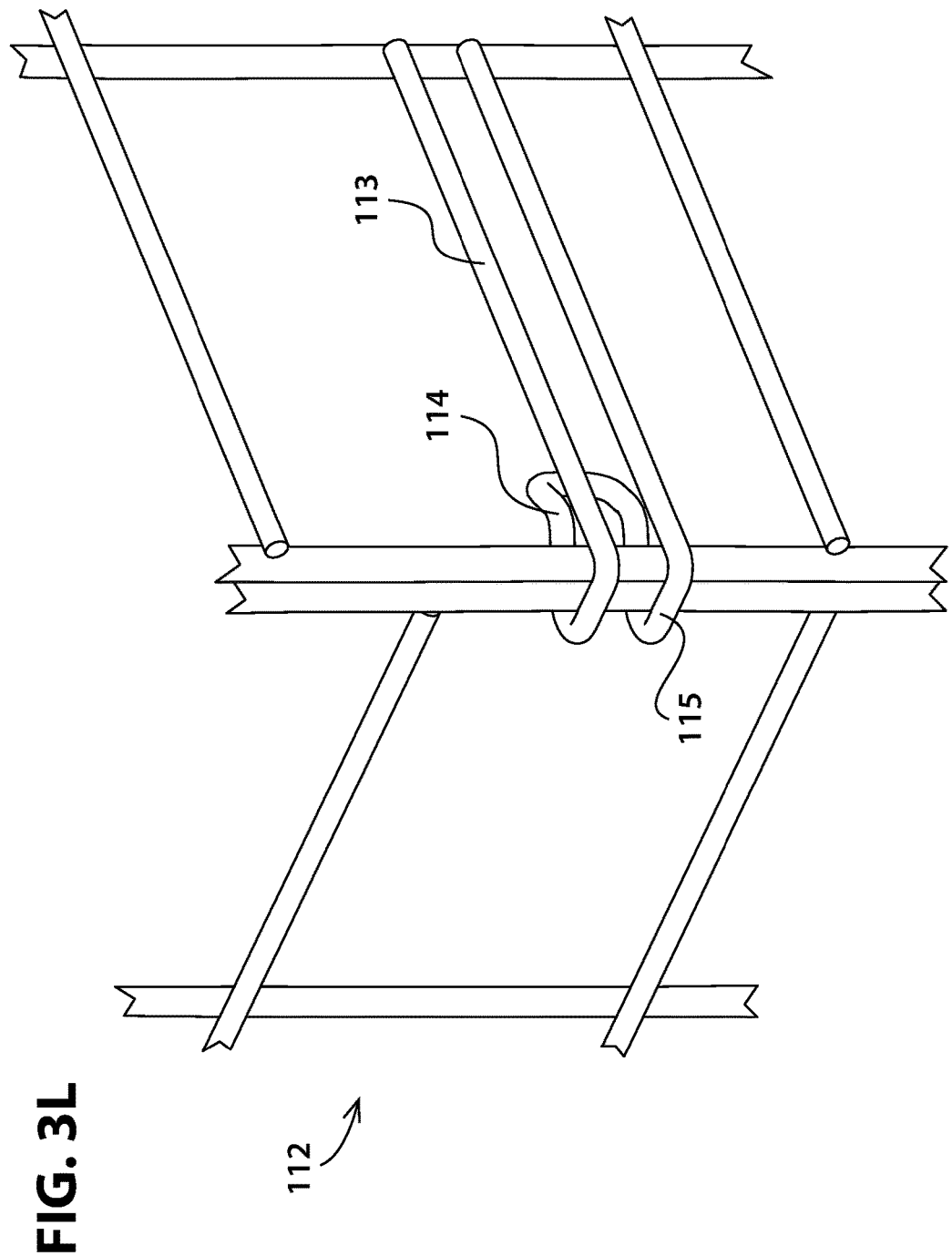

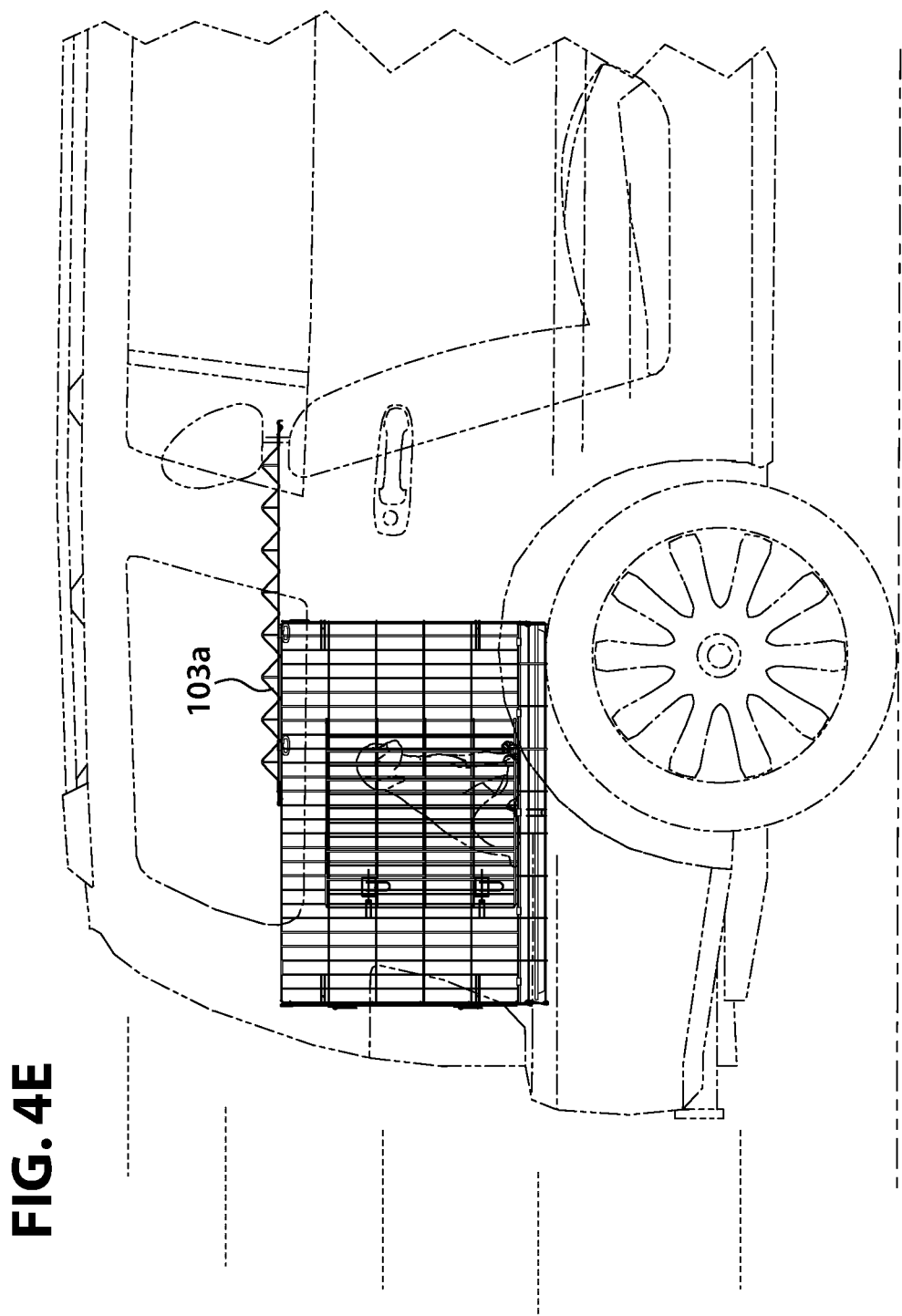

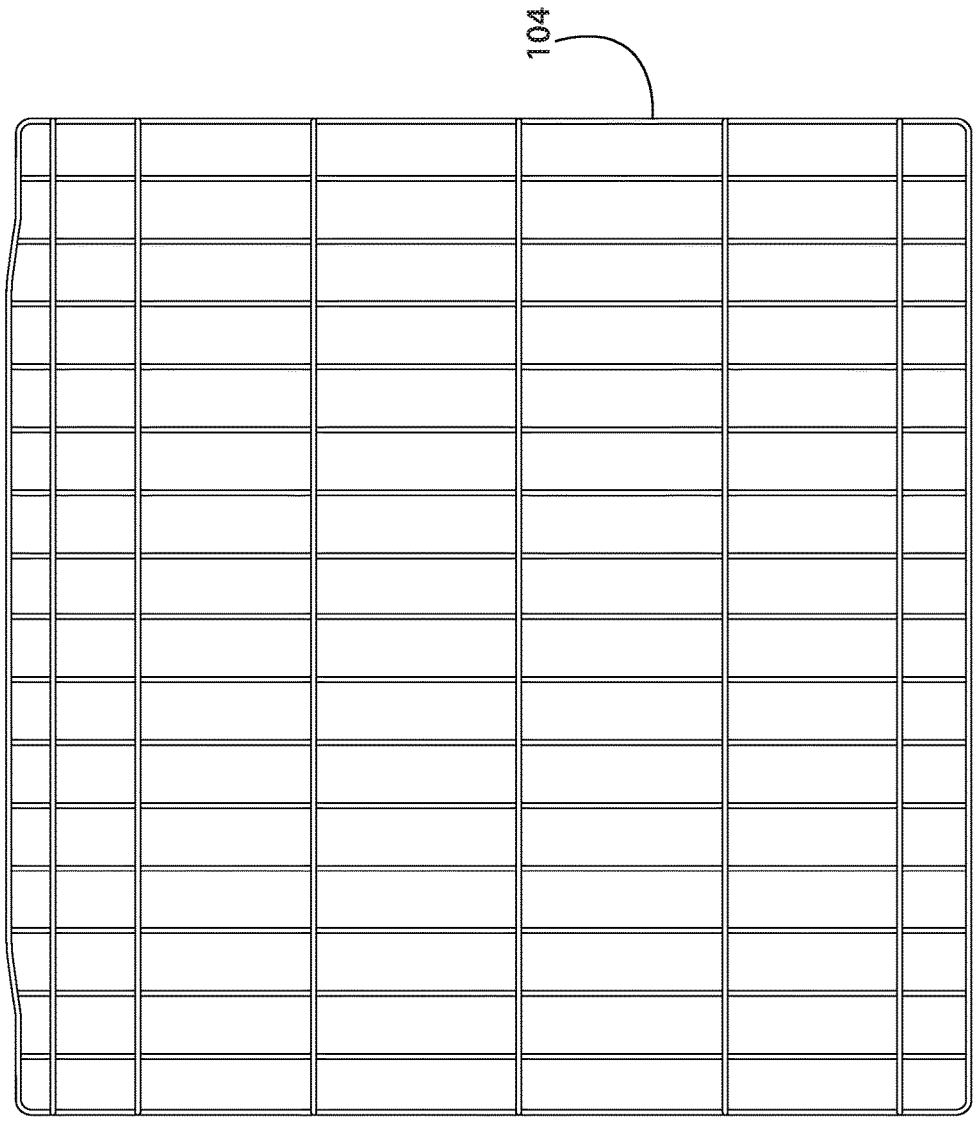

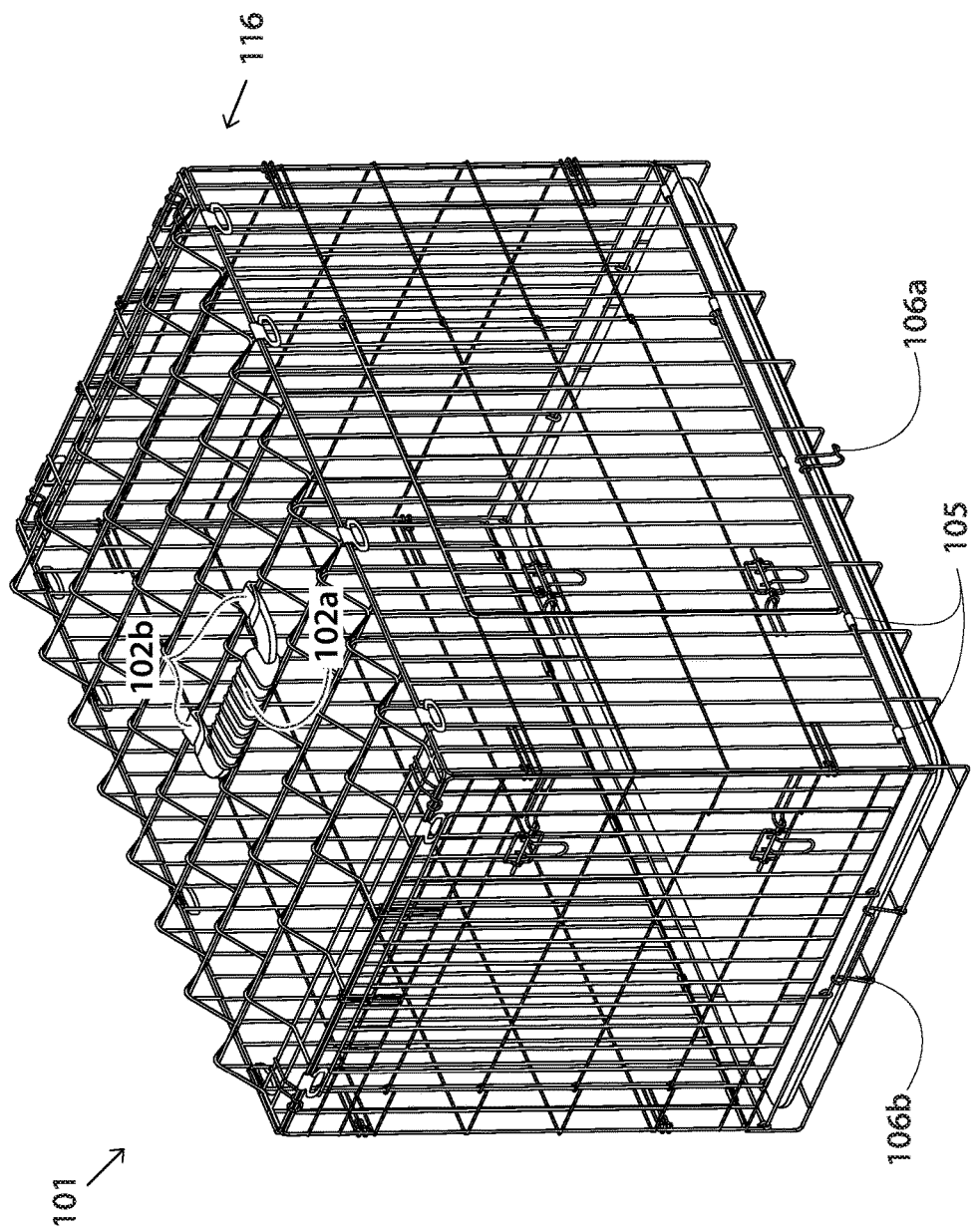

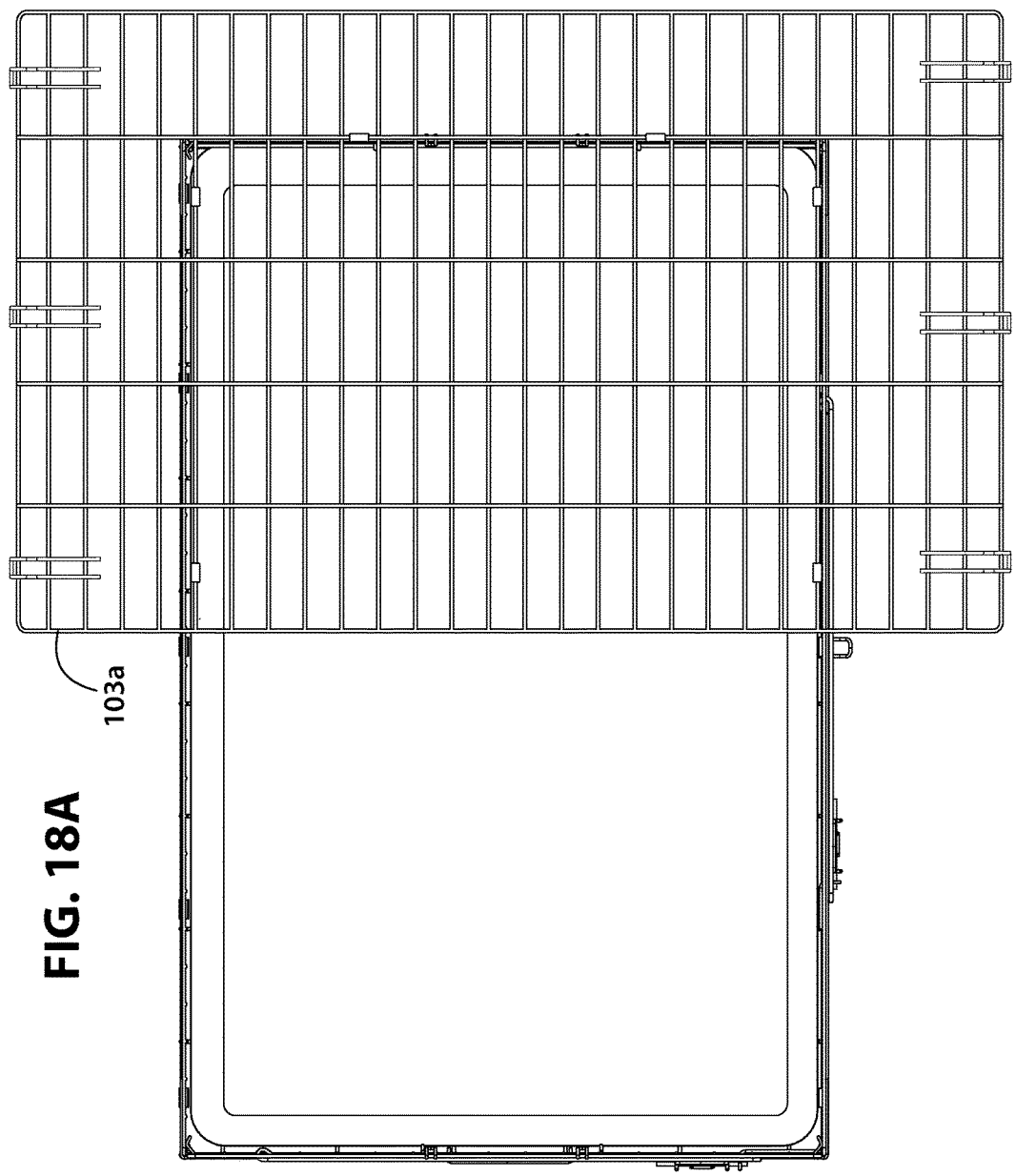

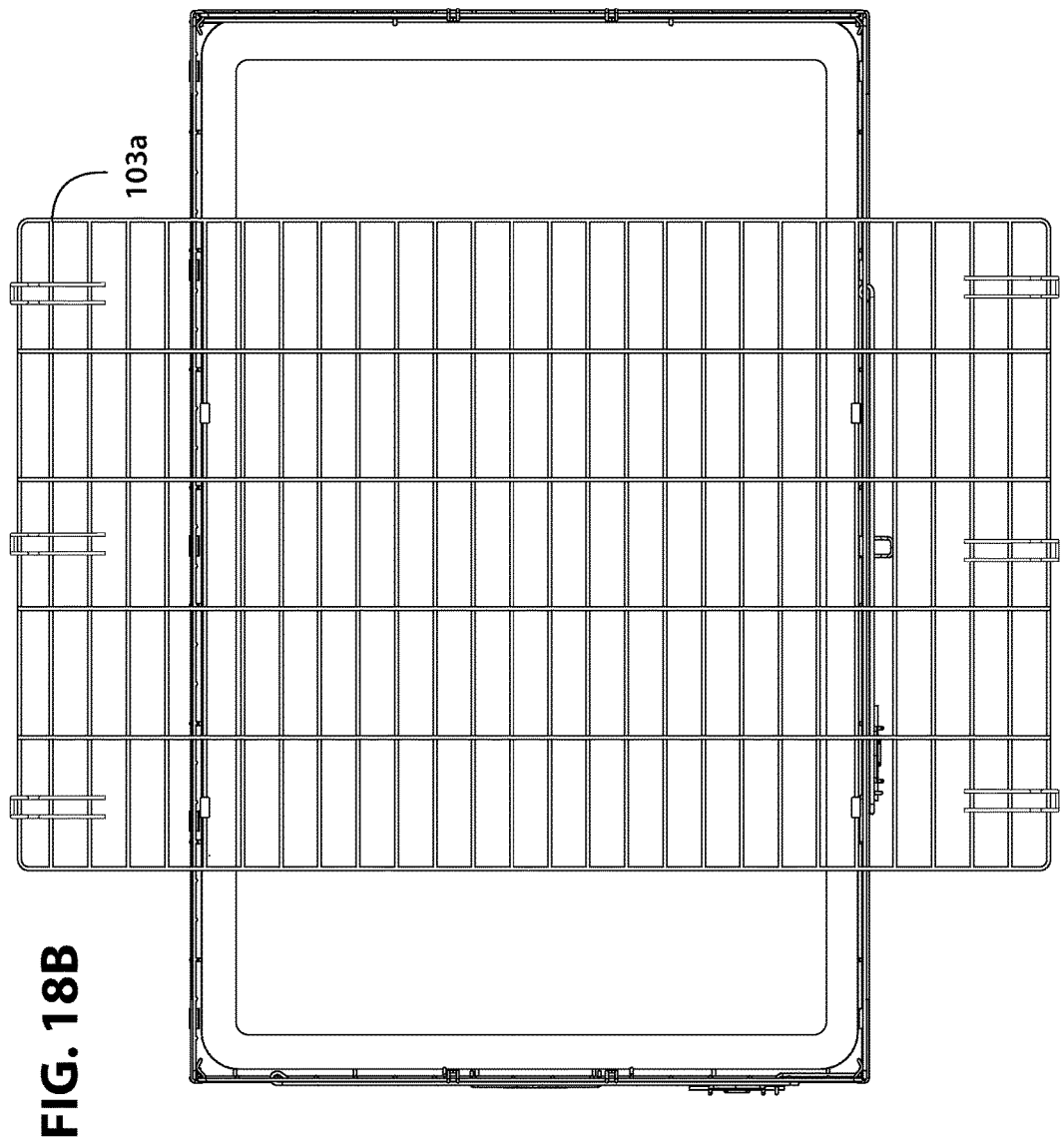

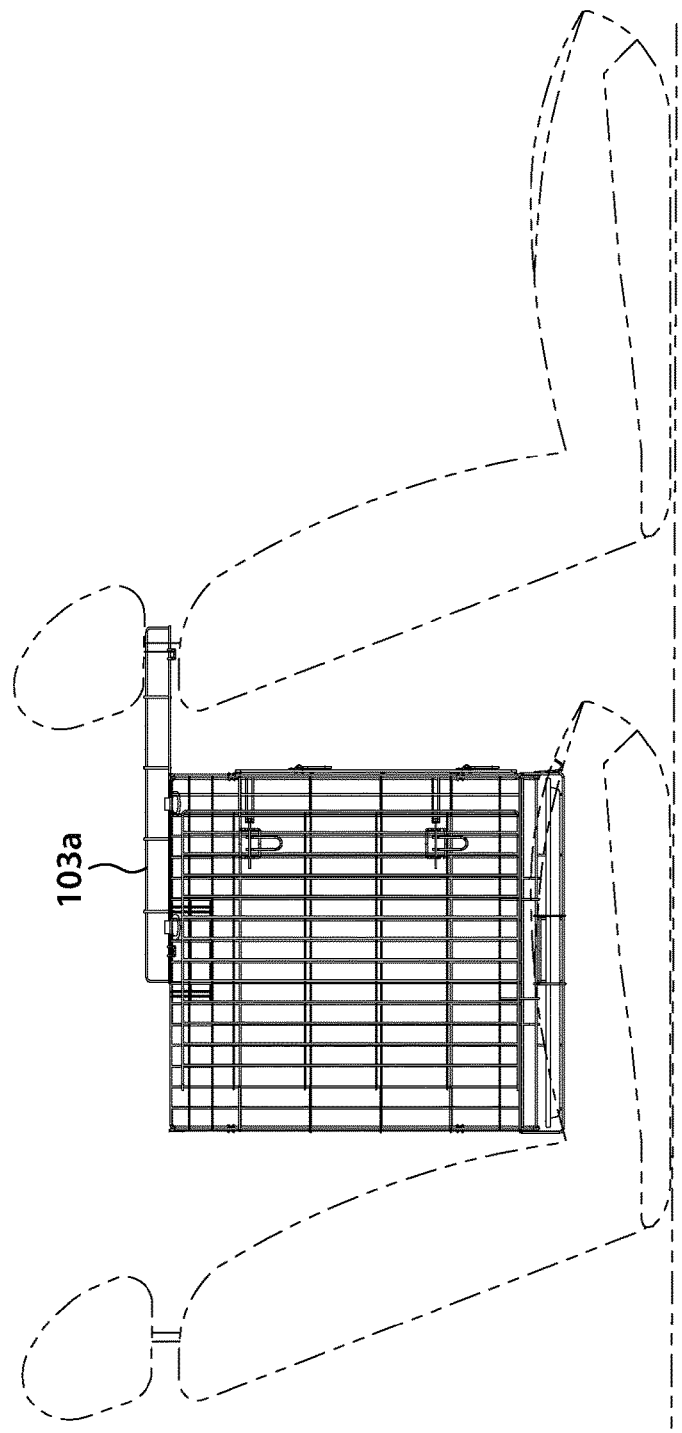

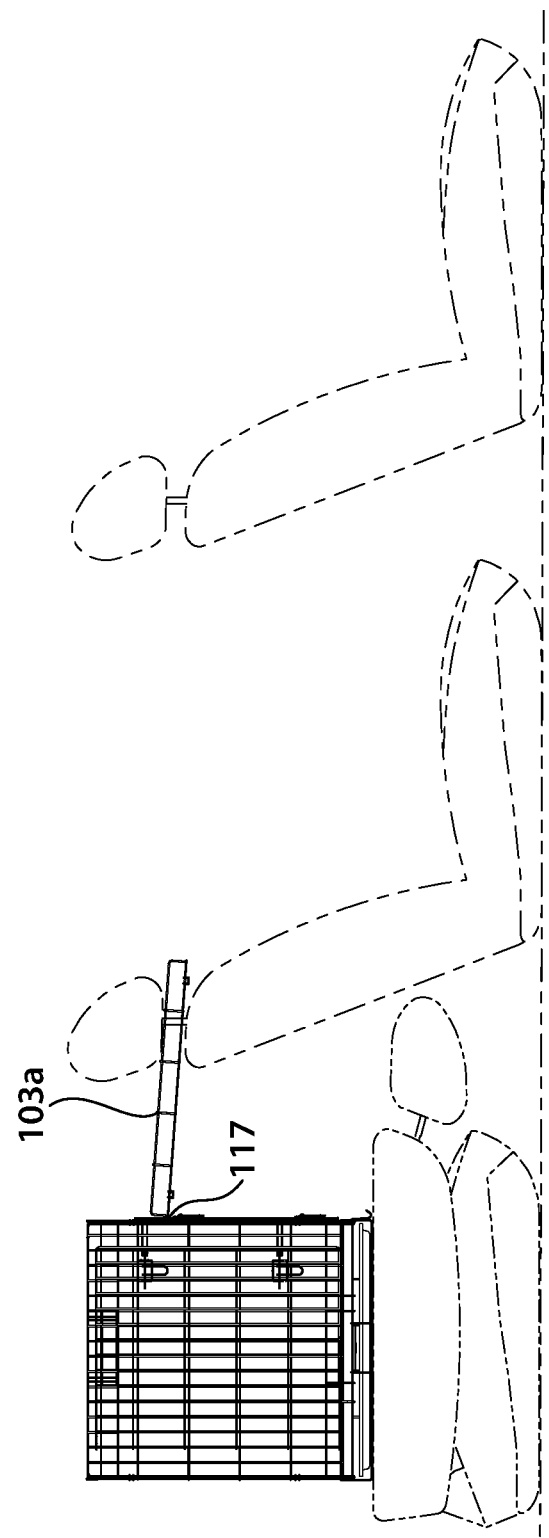

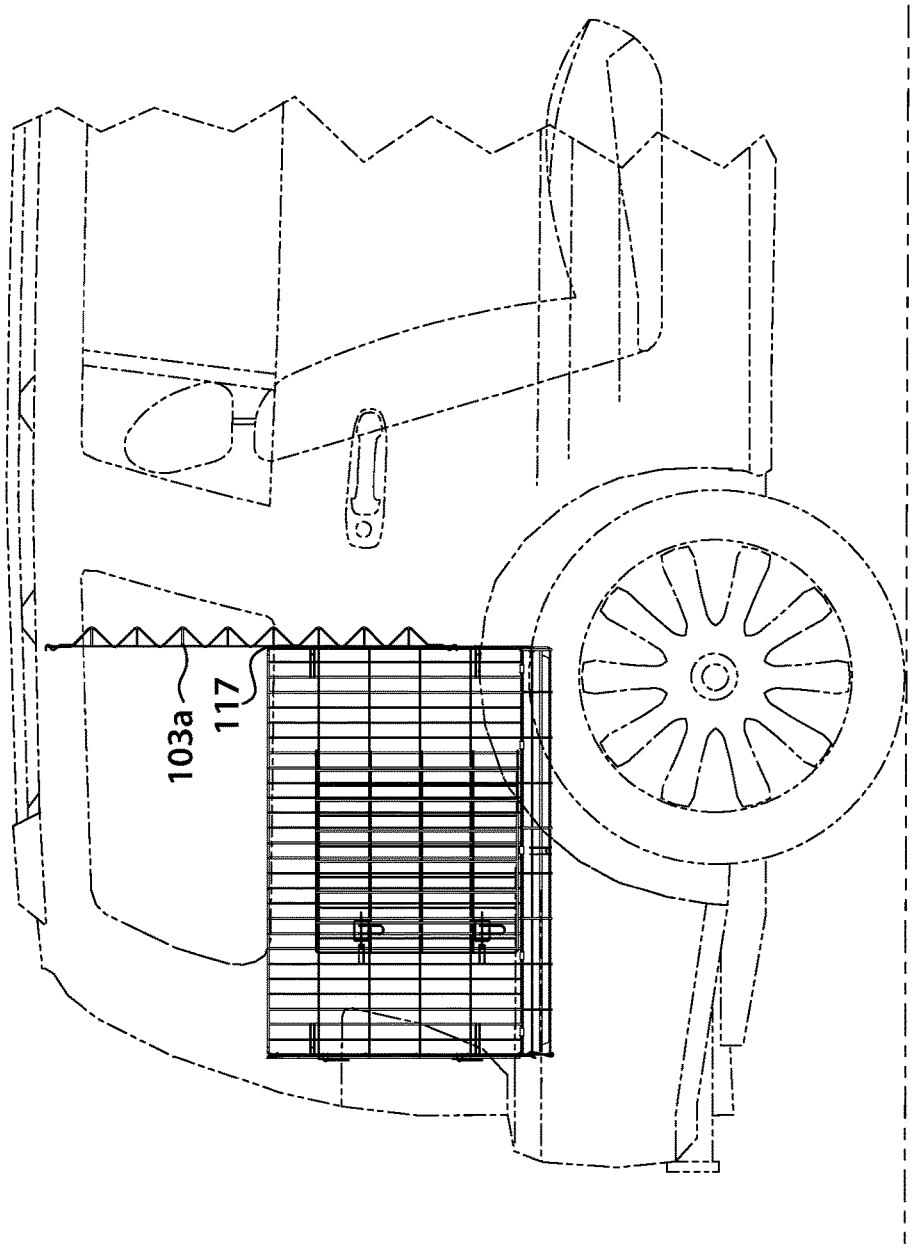

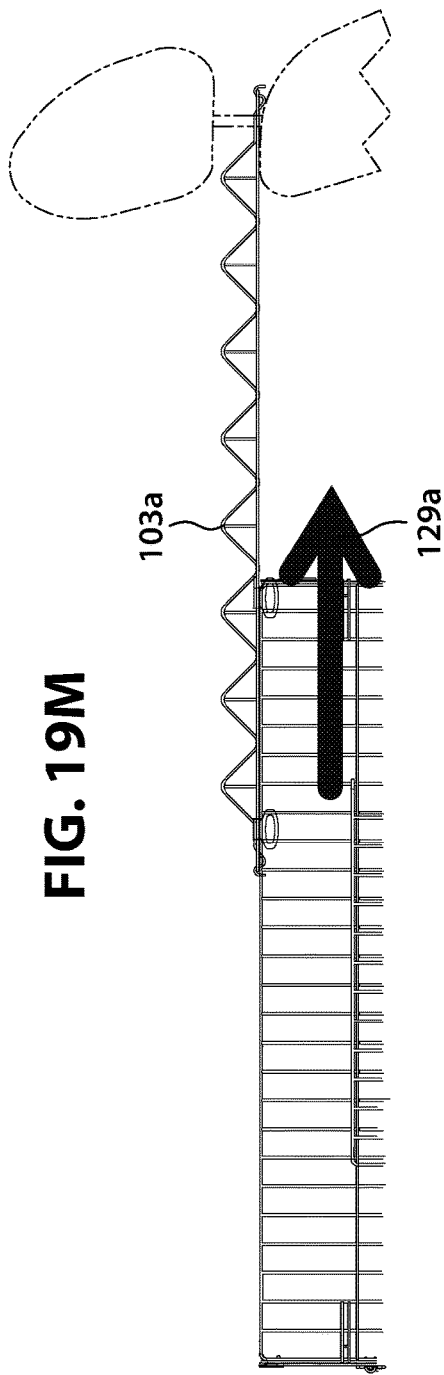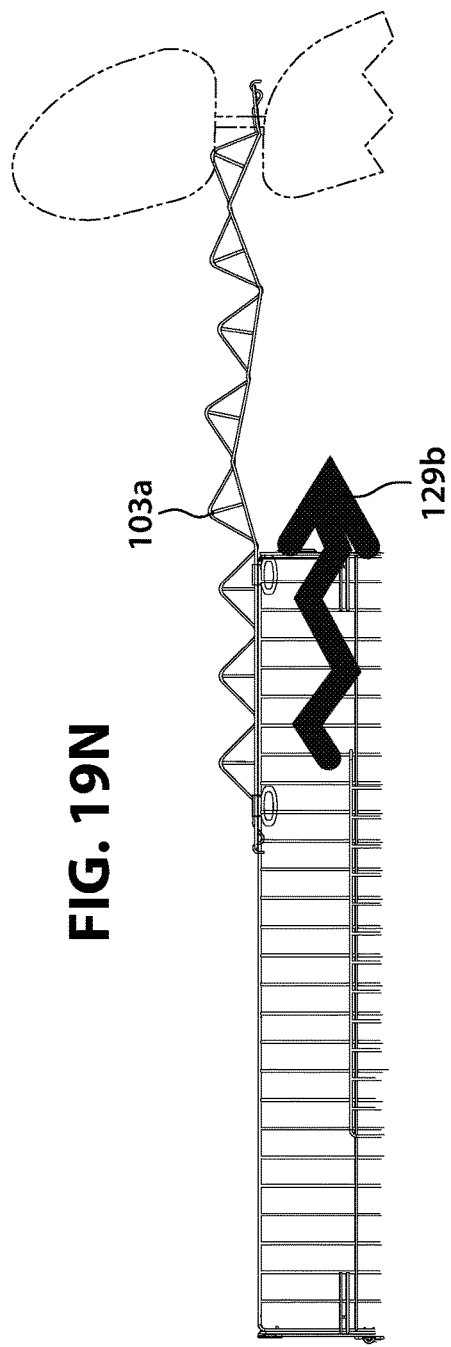

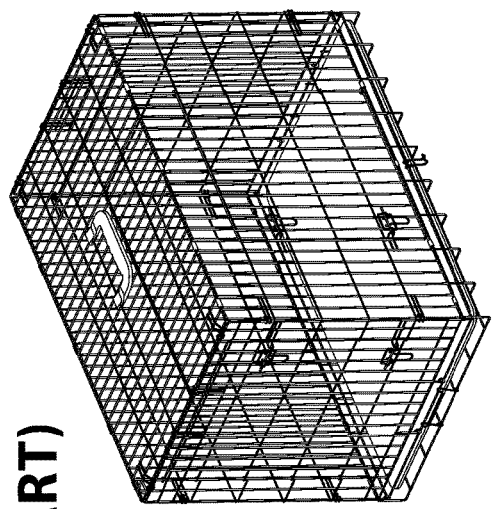
FIG. 20A
(PRIOR ART)
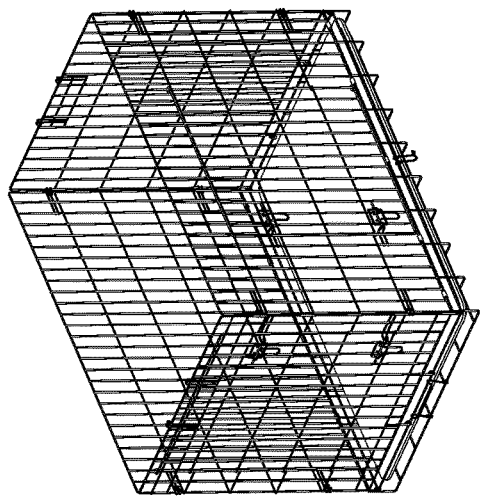
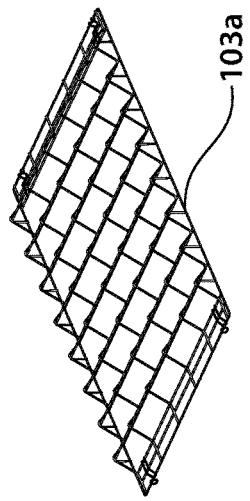
FIG. 20B

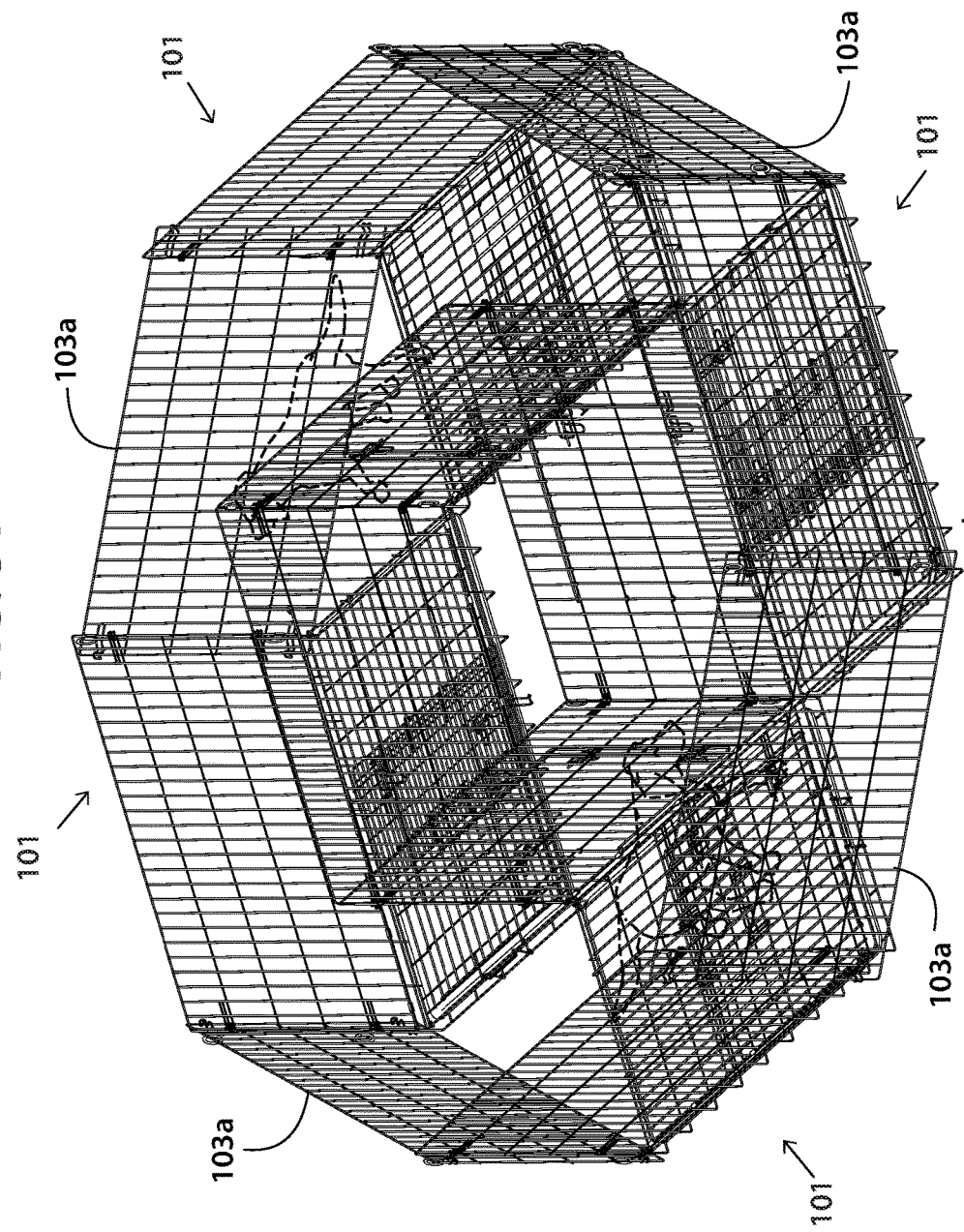

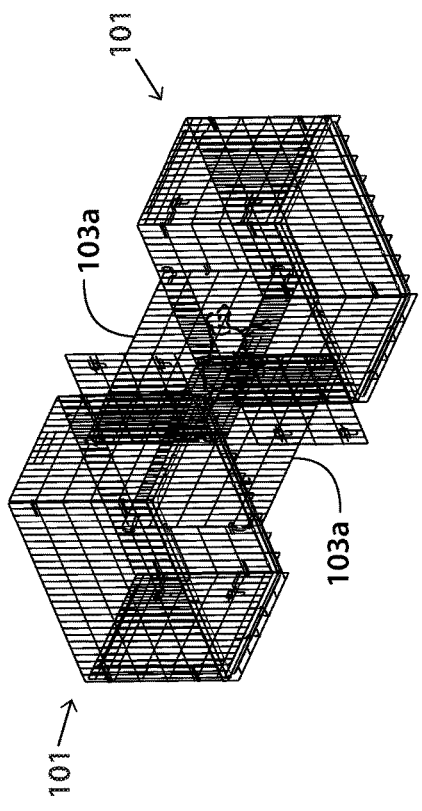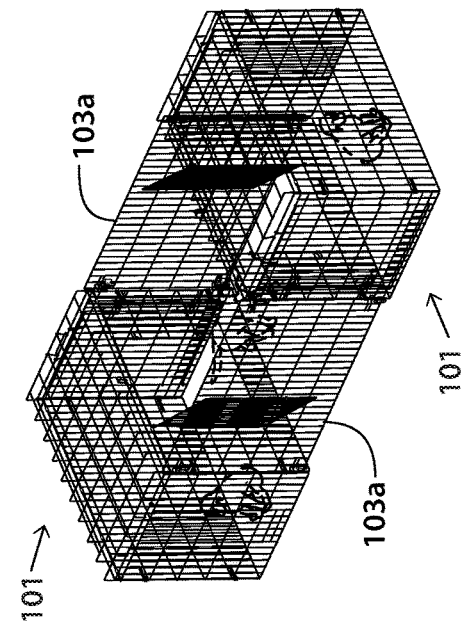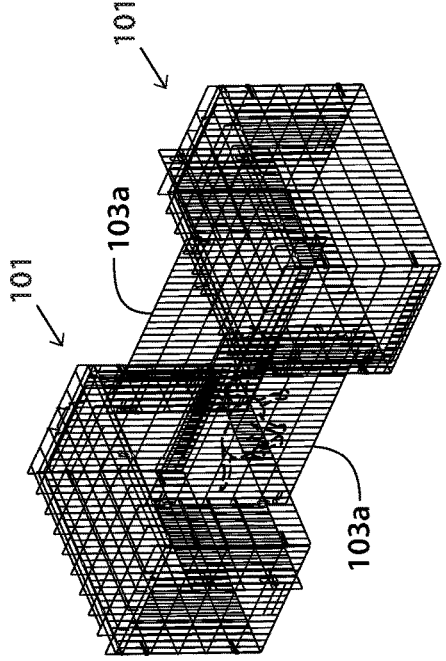
FIG. 32A
FIG. 32B
FIG. 32C

FOURTEEN-DEVICE-IN-ONE
CRUMPLABLE-SEATBELTABLE-RAMPABLE-
LEGGABLE-TOP-PANEL PET CRATE,
HAVING
CRUMPLABLE-SEATBELTABLE-RAMPABLE-
LEGGABLE-TOP-PANEL SYSTEM, TOP
PANEL-LOCKING-AND-RELEASING
STOPPER-AND-HOOK SYSTEMS, SIDE
PANEL-LOCKING-AND-RELEASING
STOPPER-AND-HOOK SYSTEMS, AND
REMOVABLE MULTI-FUNCTION
DOUBLE-CLIP-AND-RING-HOOK SYSTEMS

1) FIELD OF THE INVENTION

The present invention relates to a pet crate, which is economical to produce, is easy to ship as one unit, requires no tools, and can be quickly and easily folded and unfolded. particularly, the present invention relates to a fourteen-device-in-one crumplable-seatbeltable-rampable-leggable-top-panel pet crate, having:
  1) Crumplable-seatbeltable-rampable-leggable-top-panel system,
  2) Top quick-panel-locking-and-releasing stopper-and-hook systems,
  3) Side quick-panel-locking-and-releasing stopper-and-hook systems, and
  4) Removable multi-function double-clip-and-ring-hook systems.

2) DESCRIPTION OF THE PRIOR ART

A variety of inventions of pet crates have been introduced.

U.S. Pat. No. 844,955, issued 1907 Feb. 19, to Robert Morgan, demonstrates that the invention is an improvement in crates of the collapsible type, and consists in certain novel constructions and combinations of parts hereinafter described and claimed.

U.S. Pat. No. 2,932,279, issued 1958 Jul. 25, to William N. Giles, describes an invention related to shelters, enclosures, or other protective enclosures for cats, dogs, etc.

U.S. Pat. No. 3,896,766, issued 1975 Jul. 29, to Harlan W. Martin, describes a collapsible animal cage formed of rectilinear welded wire. The cage has front and rear rectangular end wall structures movable between an erected position and a folded position overlying a litter tray on the bottom of the cage, and a top hingedly secured to the top of the side wall structures. The front end structure has a foldable door which can be readily latched in its closed position or held in its open position.

U.S. Pat. No. 3,951,106, issued 1976 Apr. 20, to William L. Wright, details a modular kennel having an individual exercise area and enclosure for each dog. Each enclosure has a door which can be operated by the dog to allow access to the adjacent exercise area in addition to having a gate leading to a common area for grooming, cleaning and general storage.

U.S. Pat. No. 4,319,545, issued 1982 Mar. 16, to Yoshikazu Yamamoto, details a pet cage comprising a sectional frame including a back plate, a pair of side plates, and a top plate which are detachably connected with each other to form the rigid frame, thereby forming an enclosure therein, a base dish and a base wire net slidably supported by the side plates therebetween, and a shutter plate which is vertically movably supported by the side plates, engaging at the front end with a vertically slidable lid for an window of the covering net.

U.S. Pat. No. 4,763,606, issued 1988 Aug. 16, to Vladimir J. Ondrasik, II, describes an animal cage comprising an outer frame defining the peripheral edges of a box like enclosure, and a series of wall panels for releasably mounting in respective faces of the enclosure to form spaced side, end, and top and bottom walls of the enclosure.

U.S. Pat. No. 5,626,098, issued 1997 May 6, to William Askins, demonstrates a collapsible cage for dogs or rabbits having a rectangular base, fold-down end walls folding side-walls, and a roof. The walls and roof are made of metal grids. The end-walls fold down onto the base one over the other. The side-walls fold in the middle and are hinged at the top to opposite edges of the roof. The base has a pull-out tray or pan and an access door is provided in one of the end walls.

U.S. Pat. No. 5,671,698, issued 1997 Sep. 30, to Dorothy Jeanine Farrugia, details a pet carrier is a housing having a rigid bottom panel enclosed in a bottom cover, which is attached to a plastic mesh which is shaped to form the pet carrier sides and top. The pet carrier has a rear end panel and door of plastic mesh to complete the enclosure. Coupling rings may also be attached on a frame for use such as the seat belt of an automobile.

U.S. Pat. No. 6,408,797, issued 2002 Jun. 25, to Scott Pivonka, demonstrates a collapsible pet housing structure that includes a floor panel having a pair of parallel sides and a pair of ends extending between the sides. The structure will also include a roof panel that extends between the walls and which is hingedly connected to the walls; and the roof panel is supported by the walls when the wall panels are at the second position.

U.S. Pat. No. 6,732,676, issued 2004 Nov. 3, to Douglas C. Smith, details an integrated table includes a pet storage area covered by an openable gate, a storage area for storing equipment, a horizontal surface resting on a top portion of the pet storage area. The grooming surface, which may be optionally covered with a material, covers the equipment storage area in a vertical orientation.

U.S. Pat. No. 7,926,447, issued 2011 Apr. 19, to Mark A. Flannery, details a bed for a pet such as a cat or dog, including a frame having a collapsible and expandable network of interlocking legs and a covering for the frame. The first cover portion hides the networked frame from view. The second cover portion includes a cushion to provide further resiliency to the pet bed and further includes a carpet of soft fibers on which the pet directly makes contact when lying down.

U.S. Pat. No. 8,267,048, issued 2012 Sep. 18, to Mark A. Flannery, demonstrates a pet crate having a top, a bottom, and a cage between the top and bottom. Can be engaged to and disengaged from each of the top and bottom. When engaged the cage is endless and can safely hold a pet therein. When disengaged from the top and bottom, the cage is foldable into a closed, and can be stored between the top and bottom such that the crate as a whole in such stored configuration is generally flat.

U.S. Pat. No. 8,336,500, issued 2012 Dec. 25, to Jeremy Britt, describes a pet crate device for providing a pet a place to rest and a place to use the bathroom. First access door is disposed in the front of the first container and a first back opening is disposed in the back, and a second container with a second back opening is disposed in the back. A track can slide into and out of the track allowing and preventing access to the inner cavity of the first compartment.

U.S. Pat. No. 9,119,375, issued 2015 Sep. 1, to Mark A. Flannery, describes a pet cage that engages to and disengaged from each of the top and bottom. When disengaged from the top and bottom, the cage is foldable into a closed, endless, and flat configuration such that the cage can be stored between the top and bottom such that the crate as a whole in such stored configuration is generally flat.

U.S. Pat. No. 9,339,006, issued 2016 May 16, to Michael L. Eby, details a pet kennel configured restraining a pet indoors while allowing access to out-of-doors including bottom and peripheral panels attached to the bottom and extending upwardly and wherein at least one of the panels is constructed of a durable mesh. A top is affixed to an upper edge of the plurality of peripheral panels.

U.S. Pat. No. D611,202, issued 2010 Mar. 2, to Todd M. Jakubowski, demonstrates the ornamental design for a foldable pet crate, as shown and described.

U.S. Pat. No. D723,225, issued 2015 Feb. 24, to Melody Lee, demonstrates the ornamental design for a pet crate, as shown and described.

U.S. Patent No. 20060150917, issued 2006 Jul. 13, to Julian Morton, details a collapsible cage/crate for pets having an inner framework within a soft-sided shell. In its deployed configuration, the crate provides an area for an animal to be confined whereas when the crate is collapsed the crate is compact and easy to transport.

U.S. Patent No 20150034018, issued 2015 Feb. 5, to Addison Edmonds, describes an animal enclosure including an inner wall defining an enclosure space for an animal and an outer wall at least partially surrounding the inner wall. A gap is defined between the inner and outer walls. The animal enclosure includes an upper housing member and a lower housing member in some embodiments.

DISADVANTAGES OF THE PRIOR ART

The prior art have failed to solve many problems associated with such pet crate as follows:
1) No prior art mention or disclose any pet crate, having
   Crumplable-seatbeltable-rampable-leggable top panel 103a,
   removable crumple-zone multi-function locking clamps 117, and
   removable crumple-zone multi-function locking double clips 118.
   Therefore, the prior art of pet crate:
      a) Can not have top panel 103a functioning as a hanger
         to hang the pet crate on the latch of an open tailgate of an SUV
         to allow, for example, pool or river water to drip down from pets to dry the pets
         (see FIG. 1D and FIG. 19P);
      b) Can not have top panel 103a functioning as an arm
         to attach the pet crate to the top edge of a closed tailgate of an SUV
         to allow, for example, pool or river water to drip down from pets to dry the pets
         (see FIG. 1E and FIG. 19Q);
      c) Can not have top panel 103a functioning as a lid to hook the pet crate on the latch of an engine hood of an SUV
         to allow, for example, pool or river water to drip down from pets to dry the pets
         (see FIG. 1F and FIG. 19R);
      d) Can not have top panel 103a functioning as a convertor to clamp the pet crate to the top edge of an open door of an SUV
         to allow, for example, pool or river water to drip down from pets to dry the pets
         (see FIG. 1G and FIG. 19S);
      e) Can not have top panel 103a functioning as a car-seat fastener (by inserting a seatbelt through handle 102a on top panel 103a of the pet crate and securing top panel 103a to left panel 103c of the pet crate,
         to fasten the pet crate to the car seat.
         (see FIG. 1H and FIG. 19T);
      f) Can not have top panel 103a functioning as a spike (by parallelly securing top panel 103a to bottom panel 103b of the pet crate)
         to dig into a slanted sandy or soil beach or
         to dig into a slanted carpeted floor of an RV going downhill
         to prevent the pet crate from sliding downwards
         (See FIG. 1I, FIG. 1J, FIG. 19U, and FIG. 19V);
      g) Can not have top panel 103a functioning as a leg (by vertically securing top panel 103a to bottom panel 103b of the pet crate)
         to support bottom panel 103b of the pet crate
         (See FIG. 1K and FIG. 19W);
      h) Can not have top panel 103a functioning as a ladder (by angledly securing top panel 103a to the pet crate)
         to allow a pet to walk up to or to walk down from the back of an SUV
         (See FIG. 1M, FIG. 1N, FIG. 1O, FIG. 19H, FIG. 19I, and FIG. 19J); and
      i) Can not have top panel 103a functioning as a ramp (by angledly securing top panel 103a to the latch of an SUV)
         to allow a pet to walk up to or to walk down from the back of an SUV
         (See FIG. 1M, FIG. 1N, FIG. 1O, FIG. 19H, FIG. 19I, and FIG. 19J).
2) No prior art mention or disclose any pet crate, having
   Crumplable-seatbeltable-rampable-leggable top panel 103a,
   removable crumple-zone multi-function locking clamps 117, and
   removable crumple-zone multi-function locking double clips 118.
   Therefore, the prior art of pet crate:
      a) Can not have top panel 103a quickly and easily removed and stored inside a urine-waste-catching tray
         to reduce 30% of the thickness of NON-removable-top-panel pet-crate of the SAME size when the removable-top-panel pet crate is folded,
         to reduce 30% of the space needed in each shipping container,
         to reduce significantly the shipping cost of the pet crate
         (FIG. 1P (PRIOR ART illustrates a fixed top panel)
         (FIG. 1Q illustrates removable top panel 103a stored in tray 107)
         (FIG. 2A (PRIOR ART) illustrates a larger thickness 97 of the pet crate)
         (FIG. 2B illustrates a smaller thickness 98 of the new pet crate with removable top panel 103a stored in tray 107)
         (FIG. 2C (PRIOR ART) illustrates a larger thickness 97 of the pet crate)
         (FIG. 2D illustrates a smaller thickness 98 of the new pet crate with removable top panel 103a stored in tray 107)
         (FIG. 3A (PRIOR ART) illustrates a shipping container 99a has 100 pet crates 99b filling up all its internal volume 99c)

(FIG. 3B illustrates a shipping container 100*a* has 100 pet crates 100*b* filling up only 70% of its internal volume 100*c* and saving 30% of its internal volume 100*d*)

(For example:

In order to fold a prior-art crate, its top panel and its front and rear panels have to be bent up respectively in the directions of arrows 127 and 128 (see FIG. 3C), and have to be folded atop one another.

In contrast, the top panel of the current invention can simply be snapped off and stored inside tray 107 at the bottom of the crate (see FIG. 2B);

b) Can not be used as an anchor when attached to a seat, headrest or ceiling of an automobile to provide immobilization of the pet crate while traveling (FIG. 4E illustrates removable top panel 103*a* anchored to a headrest immobilizing the pet crate from moving during travel)

(see FIG. 19A, FIG. 19B, FIG. 19C, FIG. 19D, FIG. 19E, FIG. 19F, and FIG. 19G);

c) Can not quickly and easily attach top panel 103*a* to be a crumple zone when attached to a seat or headrest to absorb collision and provide safety to pets in the event of an accident in the direction of arrows 129*a* and 129*b*

(see FIG. 19K, FIG. 19 L, FIG. 19M, and FIG. 19N);

d) Can not have top panel 103*a* quickly and easily detached from the pet crate to convert the fully enclosed pet crate into an open-top pet playpen (see FIG. 15, FIG. 16, FIG. 17, FIG. 18A, FIG. 18B, FIG. 21A, FIG. 21B, FIG. 21C, FIG. 22, FIG. 23, FIG. 24, FIG. 25, FIG. 26, FIG. 27, FIG. 28, FIG. 29, FIG. 30, FIG. 31, FIG. 32A illustrating multiple new pet crates right side up, and FIG. 32B and FIG. 32C illustrating multiple new pet crates upside down);

e) Can not have top panel 103*a* quickly and easily removed to create one or multiple pet playpens or pet runs (see FIG. 15, FIG. 16, FIG. 17, FIG. 18A, FIG. 18B, FIG. 21A, FIG. 21B, FIG. 21C, FIG. 22, FIG. 23, FIG. 24, FIG. 25, FIG. 26, FIG. 27, FIG. 28, FIG. 29, FIG. 30, FIG. 31, FIG. 32A illustrating multiple new pet crates right side up, and FIG. 32B and FIG. 32C illustrating multiple new pet crates upside down); and f) Can not have top panel 103*a* quickly and easily secured in variable positions and orientations, respectively, by using removable crumple-zone multi-function locking double clips 118, to allow top panel 103*a* to function as:
a roof,
a ramp,
a balcony,
an awning, and
a partition (see FIG. 22, FIG. 23, FIG. 24, FIG. 25, FIG. 26, FIG. 27, FIG. 28, FIG. 29).

3) No prior art mention or disclose any pet crate, having
Crumplable-seatbeltable-rampable-leggable top panel 103*a*,
removable crumple-zone multi-function locking clamps 117, and
removable crumple-zone multi-function locking double clips 118.

Therefore, the prior art of pet crate:

a) Can not have top panel 103*a* quickly and easily removed to create an open-top crate,
to make it easily accessible for pets,
to create a non-confining environment for pets,
to create headroom for a tall pet,
to create a way for pets to climb out of the pet crate, or to jump out on adjacent playing or resting ramp, balcony, and patio,
to create multiple different configurations of pet runs;
to allow pets to sit, stand, play, rest, sleep, and climb upon (see FIG. 15, FIG. 16, FIG. 17, FIG. 18A, FIG. 18B, FIG. 21A, FIG. 21B, FIG. 21C, FIG. 22, FIG. 23, FIG. 24, FIG. 25, FIG. 26, FIG. 27, FIG. 28, FIG. 29, FIG. 30, FIG. 31, FIG. 32A illustrating multiple new pet crates right side up, and FIG. 32B and FIG. 32C illustrating multiple new pet crates upside down);

b) Can not have top panel 103*a* function as a suspended top panel at different elevations (see FIG. 23, FIG. 24, FIG. 25, FIG. 26, FIG. 27, FIG. 28, and FIG. 29); and c) Can not have top panel 103*a* function as a multi-pet divider and partition, to accommodate two or more pets in side-by-side compartments.

4) No prior art mention or disclose any pet crate, having
Crumplable-seatbeltable-rampable-leggable top panel 103*a*,
removable crumple-zone multi-function locking clamps 117, and
removable crumple-zone multi-function locking double clips 118.

Therefore, the prior art of pet crate:

a) Can not have top panel 103*a* quickly and easily secured angledly in conjunction with a removable multi-function roof-ramp-balcony-awning-partition mezzanine 104
to allow top panel 103*a* to function as adjustable-depth pet toy storages (see FIG. 24);

b) Can not have top panel quickly and easily secured to allow top panel 103*a* to function as a vertically-adjustable-height ceiling;

c) Can not have top panel 103*a* function as a multi-story floor
to accommodate two or more pets in separate compartments stacked vertically
(see FIG. 29);

d) Can not have top panel 103*a* function as an angled ceiling-divider,
to separate multiple pets, within crumplable-seatbeltable-rampable-leggable top panel 103*a*, and/or in conjunction with removable multi-function roof-ramp-balcony-awning-partition mezzanine 104;

e) Can not have top panel 103*a* function as a bridge between multiple pet crates,
to provide a dry, above-ground walking surface for pets
(see FIG. 29, FIG. 30, FIG. 31, FIG. 32A illustrating multiple new pet crates right side up, and FIG. 32B and FIG. 32C illustrating multiple new pet crates upside down); and f) Can not function as a partial enclosure, with removable multi-function roof-ramp-balcony-awning-partition mezzanine 104 connected vertically inside the pet crate
   to provide separate spaces for multiple pets, one space fully enclosed and the other with an open top
   (See FIG. 29).
5) No prior art mention or disclose any pet crate, having
   removable crumple-zone multi-function locking clamps 117, and
   removable crumple-zone multi-function locking double clips 118.
   Therefore, the prior art of pet crate:
   a) Can not quickly and easily, at multiple different elevations,
      attach crumplable-seatbeltable-rampable-leggable top panel 103*a* to bottom, left, right, front, and rear panels 103*b*, 103*c*, 103*d*, 103*e*, and 103*f* of the pet crate,
      remove crumplable-seatbeltable-rampable-leggable top panel 103*a* from bottom, left, right, front, and rear panels 103*b*, 103*c*, 103*d*, 103*e*, and 103*f* of the pet crate;
   b) Can not quickly and easily, at multiple different elevations,
      attach removable multi-function roof-ramp-balcony-awning-partition mezzanine 104 to top, bottom, left, right, front, and rear panels 103*a*, 103*b*, 103*c*, 103*d*, 103*e*, and 103*f* of the pet crate,
      remove removable multi-function roof-ramp-balcony-awning-partition mezzanine 104 from top, bottom, left, right, front, and rear panels 103*a*, 103*b*, 103*c*, 103*d*, 103*e*, and 103*f* of the pet crate;
   c) Can not quickly and easily snap on top, bottom, left, right, front, and rear panels 103*a*, 103*b*, 103*c*, 103*d*, 103*e*, and 103*f* of the pet crate
      to reposition crumplable-seatbeltable-rampable-leggable top panel 103*a*,
      to reposition removable multi-function roof-ramp-balcony-awning-partition mezzanine 104 without tools;
   d) Can not quickly and easily connect crumplable-seatbeltable-rampable-leggable top panel 103*a* and removable multi-function roof-ramp-balcony-awning-partition mezzanine 104 to the interior or exterior of the pet crate,
      to provide means to convert crumplable-seatbeltable-rampable-leggable top panel 103*a* to a partition, divider, patio, bridge, shelf, ramp, auxiliary platform, balcony, porch, floor, toy storage, and angled ceiling divider;
   e) Can not quickly and easily connect crumplable-seatbeltable-rampable-leggable top panel 103*a* and removable multi-function roof-ramp-balcony-awning-partition mezzanine 104 to the interior or exterior of the pet crate at multiple heights, respectively,
      to provide means to reposition top panel 103*a* and mezzanine 104 at selective vertical levels; and
   f) Can not quickly and easily attach to a U-shaped locking hook of the tailgate of an automobile to be used as an anchor
      to allow top panel 103*a* to be used as a ramp to enter or exit the rear compartment of the automobile
      (see FIG. 19I and FIG. 19J).
6) No prior art mention or disclose any pet crate, having
   Removable crumple-zone multi-function accessory-hanging ring hook 119.
   Therefore, the prior art of pet crate:
   a) Can not quickly and easily attach top panel 103*a* to be a crumple zone when attached to a seat or headrest
      to absorb collision and provide safety to pets in the event of an accident in the direction of arrows 129*a* and 129*b*
      (see FIG. 19K, FIG. 19 L, FIG. 19M, and FIG. 19N);
   b) Can not hold towel,
      to dry pets
      (See FIG. 26);
   c) Can not hold napkin,
      to clean pets
      (See FIG. 26);
   d) Can not hold medicine,
      to cure pets
      (See FIG. 26 and FIG. 32G); and
   e) Can not hold toys,
      to entertain pets
      (See FIG. 26 and FIG. 32G).
7) No prior art mention or disclose any pet crate, having
   removable multi-function roof-ramp-balcony-awning-partition mezzanine 104,
   removable crumple-zone multi-function locking clamps 117, and
   removable crumple-zone multi-function locking double clips 118.
   Therefore, the prior art of pet crate:
   a) Can not create multiple pet-containing compartments,
      to accommodate two or more pets
      (see FIG. 15, FIG. 16, FIG. 17, FIG. 23, FIG. 24, FIG. 25, FIG. 26, FIG. 27, FIG. 28, and FIG. 29);
   b) Can not create multiple sized pet-containing compartments,
      to accommodate pet growth from puppy to adult stage;
   c) Can not create multiple sized pet-containing compartments,
      to accommodate large and small pets simultaneously;
   d) Can not separate multiple pets,
      to allow multiple pets to sleep, rest and play simultaneously therein
      (For example:
      Pets can climb or jump to different elevations in the directions of arrows 130 and 131
      (see FIG. 21A, FIG. 22, FIG. 23, FIG. 24, and FIG. 25);
   e) Can not provide vertical separating means within the pet crate,
      to confine multiple pets in independent compartments side by side,
      to function as a partition,
      to function as a divide;
   f) Can not provide horizontal separating means within the pet crate,
      to confine multiple pets in independent compartments above and below one another;
   g) Can not provide means to create a horizontal platform within the pet crate,
      to function as a pet mezzanine,
      to function as a pet shelf,
      to function as a pet step, to function as a pet floor,
to function as a pet ceiling;
h) Can not provide means to attach to the interior or exterior of the pet crate,
to function as a pet bridge,
to function as a pet step,
to function swingingly as a gate,
to function as a support to crumplable-seatbeltable-rampable-leggable top panel 103*a*; and
i) Can not provide means to connect between multiple pet crates as a common exterior vertical panel.
to function as a wall, and
to function as a floor.
8) No prior art mention or disclose any pet crate, having top quick-panel-locking-and-releasing stoppers 110 and top quick-panel-locking-and-releasing hooks 111.
Therefore, the prior art of pet crate:
a) Can not quickly and easily snap-lock front and rear panels 103*e* and 103*f* past top quick-panel-locking-and-releasing stoppers 110 into
top quick-panel-locking-and-releasing hooks 111 while eliminating the needs for forcefully bending upward crumplable-seatbeltable-rampable-leggable top panel 103*a* to eliminate personal injuries (See FIGS. 3C (PRIOR ART) and 3E);
b) Can not resist the warping forces exerted on top, bottom, left, right, front, and rear panels 103*a*, 103*b*, 103*c*, 103*d*, 103*e*, and 103*f* of the pet crate;
c) Can not resist the twisting forces exerted on top, bottom, left, right, front, and rear panels 103*a*, 103*b*, 103*c*, 103*d*, 103*e*, and 103*f* of the pet crate;
d) Can not resist the bending forces exerted on top, bottom, left, right, front, and rear panels 103*a*, 103*b*, 103*c*, 103*d*, 103*e*, and 103*f* of the pet crate;
e) Can not resist the wobbling forces exerted on top, bottom, left, right, front, and rear panels 103*a*, 103*b*, 103*c*, 103*d*, 103*e*, and 103*f* of the pet crate; and
f) Can not resist the folding forces exerted on top, bottom, left, right, front, and rear panels 103*a*, 103*b*, 103*c*, 103*d*, 103*e*, and 103*f* of the pet crate.
9) No prior art mention or disclose any pet crate, having side quick-panel-locking-and-releasing stoppers 114 and side quick-panel-locking-and-releasing hooks 115.
Therefore, the prior art of pet crate:
a) Can not quickly and easily snap-lock front and rear panels 103*e* and 103*f* past side quick-panel-locking-and-releasing stoppers 114 into
side quick-panel-locking-and-releasing hooks 115 while eliminating the needs for forcefully bending upward crumplable-seatbeltable-rampable-leggable top panel 103*a* to eliminate personal injuries (See FIGS. 3C (PRIOR ART) and 3E);
b) Can not resist the warping forces exerted on top, bottom, left, right, front, and rear panels 103*a*, 103*b*, 103*c*, 103*d*, 103*e*, and 103*f* of the pet crate;
c) Can not resist the twisting forces exerted on top, bottom, left, right, front, and rear panels 103*a*, 103*b*, 103*c*, 103*d*, 103*e*, and 103*f* of the pet crate;
d) Can not resist the bending forces exerted on top, bottom, left, right, front, and rear panels 103*a*, 103*b*, 103*c*, 103*d*, 103*e*, and 103*f* of the pet crate;
e) Can not resist the wobbling forces exerted on top, bottom, left, right, front, and rear panels 103*a*, 103*b*, 103*c*, 103*d*, 103*e*, and 103*f* of the pet crate; and
f) Can not resist the folding forces exerted on top, bottom, left, right, front, and rear panels 103*a*, 103*b*, 103*c*, 103*d*, 103*e*, and 103*f* of the pet crate.

OBJECTS AND ADVANTAGES OF THE INVENTION

The present invention substantially departs from the conventional concepts and designs of the prior art. In doing so, the present invention provides a fourteen-device-in-one crumplable-seatbeltable-rampable-leggable-top-panel pet crate (having: a) Crumplable-seatbeltable-rampable-leggable-top-panel system, b) Top quick-panel-locking-and-releasing stopper-and-hook systems, c) Side quick-panel-locking-and-releasing stopper-and-hook systems, and d) Removable multi-function double-clip-and-ring-hook systems), having many new and significant features, functions, and advantages, which overcome all the disadvantages of the prior art, as follows:
1) It is an object of the new invention to provide a fourteen-device-in-one crumplable-seatbeltable-rampable-leggable-top-panel pet crate, having
Crumplable-seatbeltable-rampable-leggable top panel 103*a*,
removable crumple-zone multi-function locking clamps 117, and
removable crumple-zone multi-function locking double clips 118.
Therefore, the fourteen-device-in-one crumplable-seatbeltable-rampable-leggable-top-panel pet crate:
a) Can have top panel 103*a* functioning as a hanger to hang the pet crate on the latch of an open tailgate of an SUV
to allow, for example, pool or river water to drip down from pets to dry the pets
(see FIG. 1D and FIG. 19P);
b) Can have top panel 103*a* functioning as an arm to attach the pet crate to the top edge of a closed tailgate of an SUV
to allow, for example, pool or river water to drip down from pets to dry the pets
(see FIG. 1E and FIG. 19Q);
c) Can have top panel 103*a* functioning as a lid to hook the pet crate on the latch of an engine hood of an SUV
to allow, for example, pool or river water to drip down from pets to dry the pets
(see FIG. 1F and FIG. 19R);
d) Can have top panel 103*a* functioning as a convertor to clamp the pet crate to the top edge of an open door of an SUV
to allow, for example, pool or river water to drip down from pets to dry the pets
(see FIG. 1G and FIG. 19S);
e) Can have top panel 103*a* functioning as a car-seat fastener (by inserting a seatbelt through handle 102*a* on top panel 103*a* of the pet crate and securing top panel 103*a* to left panel 103*c* of the pet crate,
to fasten the pet crate to the car seat.
(see FIG. 1H and FIG. 19T);
f) Can have top panel 103*a* functioning as a spike (by parallelly securing top panel 103*a* to bottom panel 103*b* of the pet crate)
to dig into a slanted sandy or soil beach or
to dig into a slanted carpeted floor of an RV going downhill
to prevent the pet crate from sliding downwards
(See FIG. 1I, FIG. 1J, FIG. 19U, and FIG. 19V);
g) Can have top panel 103*a* functioning as a leg (by vertically securing top panel 103*a* to bottom panel 103*b* of the pet crate)

to support bottom panel 103*b* of the pet crate
(See FIG. 1K and FIG. 19W);
h) Can have top panel 103*a* functioning as a ladder (by angledly securing top panel 103*a* to the pet crate)
to allow a pet to walk up to or to walk down from the back of an SUV
(See FIG. 1M, FIG. 1N, FIG. 1O, FIG. 19H, FIG. 19I, and FIG. 19J); and
i) Can have top panel 103*a* functioning as a ramp (by angledly securing top panel 103*a* to the latch of an SUV)
to allow a pet to walk up to or to walk down from the back of an SUV
(See FIG. 1M, FIG. 1N, FIG. 1O, FIG. 19H, FIG. 19I, and FIG. 19J).
2) It is another object of the new invention to provide a fourteen-device-in-one crumplable-seatbeltable-rampable-leggable-top-panel pet crate, having
Crumplable-seatbeltable-rampable-leggable top panel 103*a*,
removable crumple-zone multi-function locking clamps 117, and
removable crumple-zone multi-function locking double clips 118.
Therefore, the fourteen-device-in-one crumplable-seatbeltable-rampable-leggable-top-panel pet crate:
a) Can have top panel 103*a* quickly and easily removed and stored inside a urine-waste-catching tray
to reduce 30% of the thickness of NON-removable-top-panel pet-crate of the SAME size when the removable-top-panel pet crate is folded,
to reduce 30% of the space needed in each shipping container,
to reduce significantly the shipping cost of the pet crate
(FIG. 1P (PRIOR ART illustrates a fixed top panel)
(FIG. 1Q illustrates removable top panel 103*a* stored in tray 107)
(FIG. 2A (PRIOR ART) illustrates a larger thickness 97 of the pet crate)
(FIG. 2B illustrates a smaller thickness 98 of the new pet crate with removable top panel 103*a* stored in tray 107)
(FIG. 2C (PRIOR ART) illustrates a larger thickness 97 of the pet crate)
(FIG. 2D illustrates a smaller thickness 98 of the new pet crate with removable top panel 103*a* stored in tray 107)
(FIG. 3A (PRIOR ART) illustrates a shipping container 99*a* has 100 pet crates 99*b* filling up all its internal volume 99*c*)
(FIG. 3B illustrates a shipping container 100*a* has 100 pet crates 100*b* filling up only 70% of its internal volume 100*c* and saving 30% of its internal volume 100*d*)
(For example:
In order to fold a prior-art crate, its top panel and its front and rear panels have to be bent up respectively in the directions of arrows 127 and 128
(see FIG. 3C), and
have to be folded atop one another.
In contrast, the top panel of the current invention can simply be snapped off and stored inside tray 107 at the bottom of the crate
(see FIG. 2B);
b) Can be used as an anchor when attached to a seat, headrest or ceiling of an automobile
to provide immobilization of the pet crate while traveling
(FIG. 4E illustrates removable top panel 103*a* anchored to a headrest immobilizing the pet crate from moving during travel)
(see FIG. 19A, FIG. 19B, FIG. 19C, FIG. 19D, FIG. 19E, FIG. 19F, and FIG. 19G);
c) Can quickly and easily attach top panel 103*a* to be a crumple zone when attached to a seat or headrest
to absorb collision and provide safety to pets in the event of an accident in the direction of arrows 129*a* and 129*b*
(see FIG. 19K, FIG. 19 L, FIG. 19M, and FIG. 19N);
d) Can have top panel 103*a* quickly and easily detached from the pet crate to convert the fully enclosed pet crate into an open-top pet playpen
(see FIG. 15, FIG. 16, FIG. 17, FIG. 18A, FIG. 18B, FIG. 21A, FIG. 21B, FIG. 21C, FIG. 22, FIG. 23, FIG. 24, FIG. 25, FIG. 26, FIG. 27, FIG. 28, FIG. 29, FIG. 30, FIG. 31, FIG. 32A illustrating multiple new pet crates right side up, and FIG. 32B and FIG. 32C illustrating multiple new pet crates upside down);
e) Can have top panel 103*a* quickly and easily removed to create one or multiple pet playpens or pet runs
(see FIG. 15, FIG. 16, FIG. 17, FIG. 18A, FIG. 18B, FIG. 21A, FIG. 21B, FIG. 21C, FIG. 22, FIG. 23, FIG. 24, FIG. 25, FIG. 26, FIG. 27, FIG. 28, FIG. 29, FIG. 30, FIG. 31, FIG. 32A illustrating multiple new pet crates right side up, and FIG. 32B and FIG. 32C illustrating multiple new pet crates upside down); and
f) Can have top panel 103*a* quickly and easily secured in variable positions and orientations, respectively, by using removable crumple-zone multi-function locking double clips 118,
to allow top panel 103*a* to function as:
a roof,
a ramp,
a balcony,
an awning, and
a partition
(see FIG. 22, FIG. 23, FIG. 24, FIG. 25, FIG. 26, FIG. 27, FIG. 28, FIG. 29).
3) It is another object of the new invention to provide a fourteen-device-in-one crumplable-seatbeltable-rampable-leggable-top-panel pet crate, having
Crumplable-seatbeltable-rampable-leggable top panel 103*a*,
removable crumple-zone multi-function locking clamps 117, and
removable crumple-zone multi-function locking double clips 118.
Therefore, the fourteen-device-in-one crumplable-seatbeltable-rampable-leggable-top-panel pet crate:
a) Can have top panel 103*a* quickly and easily removed
to create an open-top crate,
to make it easily accessible for pets,
to create a non-confining environment for pets,
to create headroom for a tall pet,
to create a way for pets to climb out of the pet crate, or to jump out on adjacent playing or resting ramp, balcony, and patio,
to create multiple different configurations of pet runs, to allow pets to sit, stand, play, rest, sleep, and climb upon
(see FIG. 15, FIG. 16, FIG. 17, FIG. 18A, FIG. 18B, FIG. 21A, FIG. 21B, FIG. 21C, FIG. 22, FIG. 23, FIG. 24, FIG. 25, FIG. 26, FIG. 27, FIG. 28, FIG. 29, FIG. 30, FIG. 31, FIG. 32A illustrating multiple new pet crates right side up, and FIG. 32B and FIG. 32C illustrating multiple new pet crates upside down);

b) Can have top panel 103a function as a suspended top panel at different elevations
(see FIG. 23, FIG. 24, FIG. 25, FIG. 26, FIG. 27, FIG. 28, and FIG. 29); and c) Can have top panel 103a function as a multi-pet divider and partition,
to accommodate two or more pets in side-by-side compartments.

4) It is another object of the new invention to provide a fourteen-device-in-one crumplable-seatbeltable-rampable-leggable-top-panel pet crate, having
Crumplable-seatbeltable-rampable-leggable top panel 103a,
removable crumple-zone multi-function locking clamps 117, and
removable crumple-zone multi-function locking double clips 118.
Therefore, the fourteen-device-in-one crumplable-seatbeltable-rampable-leggable-top-panel pet crate:
a) Can have top panel 103a quickly and easily secured angledly in conjunction with a removable multi-function roof-ramp-balcony-awning-partition mezzanine 104
to allow top panel 103a to function as adjustable-depth pet toy storages (see FIG. 24);

b) Can have top panel 103a quickly and easily secured
to allow top panel 103a to function as a vertically-adjustable-height ceiling;

c) Can have top panel 103a function as a multi-story floor
to accommodate two or more pets in separate compartments stacked vertically
(see FIG. 29);

d) Can have top panel 103a function as an angled ceiling-divider,
to separate multiple pets, within crumplable-seatbeltable-rampable-leggable top panel 103a, and/or in conjunction with removable multi-function roof-ramp-balcony-awning-partition mezzanine 104;

e) Can have top panel 103a function as a bridge between multiple pet crates,
to provide a dry, above-ground walking surface for pets
(see FIG. 29, FIG. 30, FIG. 31, FIG. 32A illustrating multiple new pet crates right side up, and FIG. 32B and FIG. 32C illustrating multiple new pet crates upside down); and f) Can function as a partial enclosure, with removable multi-function roof-ramp-balcony-awning-partition mezzanine 104 connected vertically inside the pet crate
to provide separate spaces for multiple pets, one space fully enclosed and the other with an open top
(See FIG. 29).

5) It is a further object of the new invention to provide a fourteen-device-in-one crumplable-seatbeltable-rampable-leggable-top-panel pet crate, having
removable crumple-zone multi-function locking clamps 117, and
removable crumple-zone multi-function locking double clips 118.
Therefore, the fourteen-device-in-one crumplable-seatbeltable-rampable-leggable-top-panel pet crate:
a) Can quickly and easily, at multiple different elevations,
attach crumplable-seatbeltable-rampable-leggable top panel 103a to bottom, left, right, front, and rear panels 103b, 103c, 103d, 103e, and 103f of the pet crate,
remove crumplable-seatbeltable-rampable-leggable top panel 103a from bottom, left, right, front, and rear panels 103b, 103c, 103d, 103e, and 103f of the pet crate;

b) Can quickly and easily, at multiple different elevations,
attach removable multi-function roof-ramp-balcony-awning-partition mezzanine 104 to top, bottom, left, right, front, and rear panels 103a, 103b, 103c, 103d, 103e, and 103f of the pet crate,
remove removable multi-function roof-ramp-balcony-awning-partition mezzanine 104 from top, bottom, left, right, front, and rear panels 103a, 103b, 103c, 103d, 103e, and 103f of the pet crate;

c) Can quickly and easily snap on top, bottom, left, right, front, and rear panels 103a, 103b, 103c, 103d, 103e, and 103f of the pet crate to reposition crumplable-seatbeltable-rampable-leggable top panel 103a, to reposition removable multi-function roof-ramp-balcony-awning-partition mezzanine 104 without tools;

d) Can quickly and easily connect crumplable-seatbeltable-rampable-leggable top panel 103a and removable multi-function roof-ramp-balcony-awning-partition mezzanine 104 to the interior or exterior of the pet crate,
to provide means to convert crumplable-seatbeltable-rampable-leggable top panel 103a to a partition, divider, patio, bridge, shelf, ramp, auxiliary platform, balcony, porch, floor, toy storage, and angled ceiling divider;

e) Can quickly and easily connect crumplable-seatbeltable-rampable-leggable top panel 103a and removable multi-function roof-ramp-balcony-awning-partition mezzanine 104 to the interior or exterior of the pet crate at multiple heights, respectively,
to provide means to reposition top panel 103a and mezzanine 104 at selective vertical levels; and f) Can quickly and easily attach to a U-shaped locking hook of the tailgate of an automobile to be used as an anchor
to allow top panel 103a to be used as a ramp to enter and exit the rear compartment of the automobile
(see FIG. 19I and FIG. 19J).

6) It is an even further object of the new invention to provide a fourteen-device-in-one crumplable-seatbeltable-rampable-leggable-top-panel pet crate, having
Removable crumple-zone multi-function accessory-hanging ring hook 119.
Therefore, the fourteen-device-in-one crumplable-seatbeltable-rampable-leggable-top-panel pet crate:

a) Can quickly and easily attach top panel 103*a* to be a crumple zone when attached to a seat or headrest to absorb collision and provide safety to pets in the event of an accident in the direction of arrows 129*a* and 129*b*
(see FIG. 19K, FIG. 19 L, FIG. 19M, and FIG. 19N);
b) Can hold towel,
to dry pets
(See FIG. 26);
c) Can hold napkin,
to clean pets
(See FIG. 26);
d) Can hold medicine,
to cure pets
(See FIG. 26 and FIG. 32G); and
e) Can hold toys,
to entertain pets
(See FIG. 26 and FIG. 32G).

7) It is another object of the new invention to provide a fourteen-device-in-one crumplable-seatbeltable-rampable-leggable-top-panel pet crate, having
removable multi-function roof-ramp-balcony-awning-partition mezzanine 104,
removable crumple-zone multi-function locking clamps 117, and
removable crumple-zone multi-function locking double clips 118.
Therefore, the fourteen-device-in-one crumplable-seatbeltable-rampable-leggable-top-panel pet crate:
a) Can create multiple pet-containing compartments,
to accommodate two or more pets
(see FIG. 15, FIG. 16, FIG. 17, FIG. 23, FIG. 24, FIG. 25, FIG. 26, FIG. 27, FIG. 28, and FIG. 29);
b) Can create multiple sized pet-containing compartments,
to accommodate pet growth from puppy to adult stage;
c) Can create multiple sized pet-containing compartments,
to accommodate large and small pets simultaneously;
d) Can separate multiple pets,
to allow multiple pets to sleep, rest and play simultaneously therein
(For example:
Pets can climb or jump to different elevations in the directions of arrows 130 and 131
(see FIG. 21A, FIG. 22, FIG. 23, FIG. 24, and FIG. 25);
e) Can provide vertical separating means within the pet crate,
to confine multiple pets in independent compartments side by side,
to function as a partition,
to function as a divide;
f) Can provide horizontal separating means within the pet crate,
to confine multiple pets in independent compartments above and below one another;
g) Can provide means to create a horizontal platform within the pet crate,
to function as a pet mezzanine,
to function as a pet shelf,
to function as a pet step,
to function as a pet floor,
to function as a pet ceiling;
h) Can provide means to attach to the interior or exterior of the pet crate,
to function as a pet bridge,
to function as a pet step,
to function swingingly as a gate,
to function as a support to crumplable-seatbeltable-rampable-leggable top panel 103*a*; and
i) Can provide means to connect between multiple pet crates as a common exterior vertical panel.
to function as a wall, and
to function as a floor.

8) It is yet another object of the new invention to provide a fourteen-device-in-one crumplable-seatbeltable-rampable-leggable-top-panel pet crate, having
top quick-panel-locking-and-releasing stoppers 110 and
top quick-panel-locking-and-releasing hooks 111.
Therefore, the fourteen-device-in-one crumplable-seatbeltable-rampable-leggable-top-panel pet crate:
a) Can quickly and easily snap-lock front and rear panels 103*e* and 103*f* past
top quick-panel-locking-and-releasing stoppers 110 into
top quick-panel-locking-and-releasing hooks 111
while eliminating the needs for forcefully bending upward crumplable-seatbeltable-rampable-leggable top panel 103*a*
to eliminate personal injuries
(See FIGS. 3C (PRIOR ART) and 3E);
b) Can resist the warping forces exerted on top, bottom, left, right, front, and rear panels 103*a*, 103*b*, 103*c*, 103*d*, 103*e*, and 103*f* of the pet crate;
c) Can resist the twisting forces exerted on top, bottom, left, right, front, and rear panels 103*a*, 103*b*, 103*c*, 103*d*, 103*e*, and 103*f* of the pet crate;
d) Can resist the bending forces exerted on top, bottom, left, right, front, and rear panels 103*a*, 103*b*, 103*c*, 103*d*, 103*e*, and 103*f* of the pet crate;
e) Can resist the wobbling forces exerted on top, bottom, left, right, front, and rear panels 103*a*, 103*b*, 103*c*, 103*d*, 103*e*, and 103*f* of the pet crate; and
f) Can resist the folding forces exerted on top, bottom, left, right, front, and rear panels 103*a*, 103*b*, 103*c*, 103*d*, 103*e*, and 103*f* of the pet crate.

9) It is still yet another object of the new invention to provide a fourteen-device-in-one crumplable-seatbeltable-rampable-leggable-top-panel pet crate, having
side quick-panel-locking-and-releasing stoppers 114 and
side quick-panel-locking-and-releasing hooks 115.
Therefore, the fourteen-device-in-one crumplable-seatbeltable-rampable-leggable-top-panel pet crate:
a) Can quickly and easily snap-lock front and rear panels 103*e* and 103*f* past
side quick-panel-locking-and-releasing stoppers 114 into
side quick-panel-locking-and-releasing hooks 115
while eliminating the needs for forcefully bending upward crumplable-seatbeltable-rampable-leggable top panel 103*a*
to eliminate personal injuries
(See FIGS. 3C (PRIOR ART) and 3E);
b) Can resist the warping forces exerted on top, bottom, left, right, front, and rear panels 103*a*, 103*b*, 103*c*, 103*d*, 103*e*, and 103*f* of the pet crate;
c) Can resist the twisting forces exerted on top, bottom, left, right, front, and rear panels 103*a*, 103*b*, 103*c*, 103*d*, 103*e*, and 103*f* of the pet crate;

d) Can resist the bending forces exerted on top, bottom, left, right, front, and rear panels 103a, 103b, 103c, 103d, 103e, and 103f of the pet crate;
e) Can resist the wobbling forces exerted on top, bottom, left, right, front, and rear panels 103a, 103b, 103c, 103d, 103e, and 103f of the pet crate; and
f) Can resist the folding forces exerted on top, bottom, left, right, front, and rear panels 103a, 103b, 103c, 103d, 103e, and 103f of the pet crate.

Other objects and advantages of the present invention will become apparent from a consideration of the accompanying drawings and ensuing description.

BRIEF SUMMARY OF THE INVENTION

A fourteen-device-in-one crumplable-seatbeltable-rampable-leggable-top-panel pet crate comprises crumplable-seatbeltable-rampable-leggable top, bottom, left, right, front, and rear panels attached to one another, removable multi-function mezzanine, removable crumple-zone multi-function locking double clips, removable crumple-zone multi-function accessory-hanging ring hooks for holding towels and accessories, left door, front door, top quick-panel-locking-and-releasing stoppers and hooks for safely and releasably locking the front and rear panels to the top panel, and side quick-panel-locking-and-releasing stoppers and hooks for safely and releasably locking the front and rear panels to the left and right panels.

The removable crumple-zone multi-function locking double clips enable the crumplable-seatbeltable-rampable-leggable top panel to be removed and stored inside the tray at the bottom of the pet crate to reduce 30% of the thickness of the NON-removable-top-panel pet crate when the pet crate is folded for storage and transportation.

The removable crumple-zone multi-function locking double clips enable the crumplable-seatbeltable-rampable-leggable top panel to function as a hanger, an arm, a lid, a convertor, a car-seat fastener, a spike, a leg, a ladder, a ramp, and a crumple zone when attached to a seat or headrest to absorb collision to protect pets in an accident.

The removable crumple-zone multi-function locking double clips also enable the crumplable-seatbeltable-rampable-leggable top panel and the removable multi-function mezzanine to divide the pet crate into multiple compartments and stories for multiple pets, and to function as removable roof, floor, ramp, balcony, awning, partition, ceiling, angled divider, pet toy storage, patio.

BRIEF DESCRIPTION OF THE DRAWINGS

FIG. 1A illustrate perspective views of removable crumple-zone multi-function locking clamps 117 and crumplable-seatbeltable-rampable-leggable top panel 103a.

FIG. 1D, FIG. 1E, FIG. 1F, and FIG. 1G illustrate side views of how crumplable-seatbeltable-rampable-leggable top panel 103a functions as a hanger.

FIG. 1M, FIG. 1N, and FIG. 1O illustrate perspective views of how crumplable-seatbeltable-rampable-leggable top panel 103a functions as a ramp, which is clamped on the pet crate or clamped on the U-shaped locking hook of the tailgate of an automobile.

FIG. 1P (PRIOR ART), FIG. 1Q, FIG. 2A (PRIOR ART), FIG. 2B, FIG. 2C (PRIOR ART), FIG. 2D, FIG. 3A (PRIOR ART), and FIG. 3B illustrate perspective and front views of the advantage of reducing 30% of the thickness of the fourteen-device-in-one crumplable-seatbeltable-rampable-leggable-top-panel pet crate by having its crumplable-seatbeltable-rampable-leggable top panel 103a stored in its urine-waste-catching tray 107 when folded for storage and transportation, compared to a prior-art pet crate.

FIG. 4E illustrates a side view of how crumplable-seatbeltable-rampable-leggable top panel 103a can be used as an anchor when attached to a headrest or seat of an automobile.

FIG. 5 illustrates crumplable-seatbeltable-rampable-leggable top panel 103a.

FIG. 6, FIG. 7A, FIG. 7B, FIG. 7C, FIG. 8, FIG. 9, FIG. 10, FIG. 11, FIG. 12, FIG. 13, and FIG. 14 illustrate top, front, and perspective views of crumplable-seatbeltable-rampable-leggable-top-panel system 101, top quick-panel-locking-and-releasing stopper-and-hook systems 108, side quick-panel-locking-and-releasing stopper-and-hook systems 112, and removable multi-function double-clip-and-ring-hook systems 116.

FIG. 15, FIG. 16, FIG. 17, FIG. 18A, and FIG. 18B illustrate top and perspective views of multiple combinations and utilizations at multiple elevations of crumplable-seatbeltable-rampable-leggable top panel 103a and removable multi-function roof-ramp-balcony-awning-partition mezzanine 104.

FIG. 19A, FIG. 19B, FIG. 19C, FIG. 19D, FIG. 19E, FIG. 19F, and FIG. 19G, illustrate side and cross-sectional views of multiple combinations and utilizations of using top panel 103a as an anchor when attached to a seat, headrest, or ceiling of an automobile.

FIG. 19K, FIG. 19L, FIG. 19M, and FIG. 19N illustrate side views of how top panel 103a can be used as a crumple zone when attached to a seat or headrest of an automobile.

FIG. 19O illustrate perspective views of removable crumple-zone multi-function locking clamps 117 and crumplable-seatbeltable-rampable-leggable top panel 103a.

FIG. 20A, FIG. 20B, FIG. 21A, FIG. 21B, FIG. 21C, FIG. 22, FIG. 23, FIG. 24, FIG. 25, FIG. 26, FIG. 27, and FIG. 28 illustrate top and perspective views of multiple combinations and utilizations at multiple elevations of crumplable-seatbeltable-rampable-leggable top panel 103a and removable multi-function roof-ramp-balcony-awning-partition mezzanine 104.

FIG. 29, FIG. 30, and FIG. 31 illustrate perspective views of multiple combinations and utilizations of multiple pet crates, by using removable multi-function double-clip-and-ring-hook systems 116.

FIG. 32A, FIG. 32B, and FIG. 32C illustrate perspective views of multiple combinations and utilizations of multiple right-side-up pet crates and multiple upside-down pet crates, by using removable multi-function double-clip-and-ring-hook systems 116.

DETAILED DESCRIPTION OF THE INVENTION

The fourteen-device-in-one crumplable-seatbeltable-rampable-leggable-top-panel pet crate has:
1) Crumplable-seatbeltable-rampable-leggable-top-panel system,
2) Top quick-panel-locking-and-releasing stopper-and-hook systems,
3) Side quick-panel-locking-and-releasing stopper-and-hook systems, and
4) Removable multi-function double-clip-and-ring-hook systems.

Component

Figure 1A:
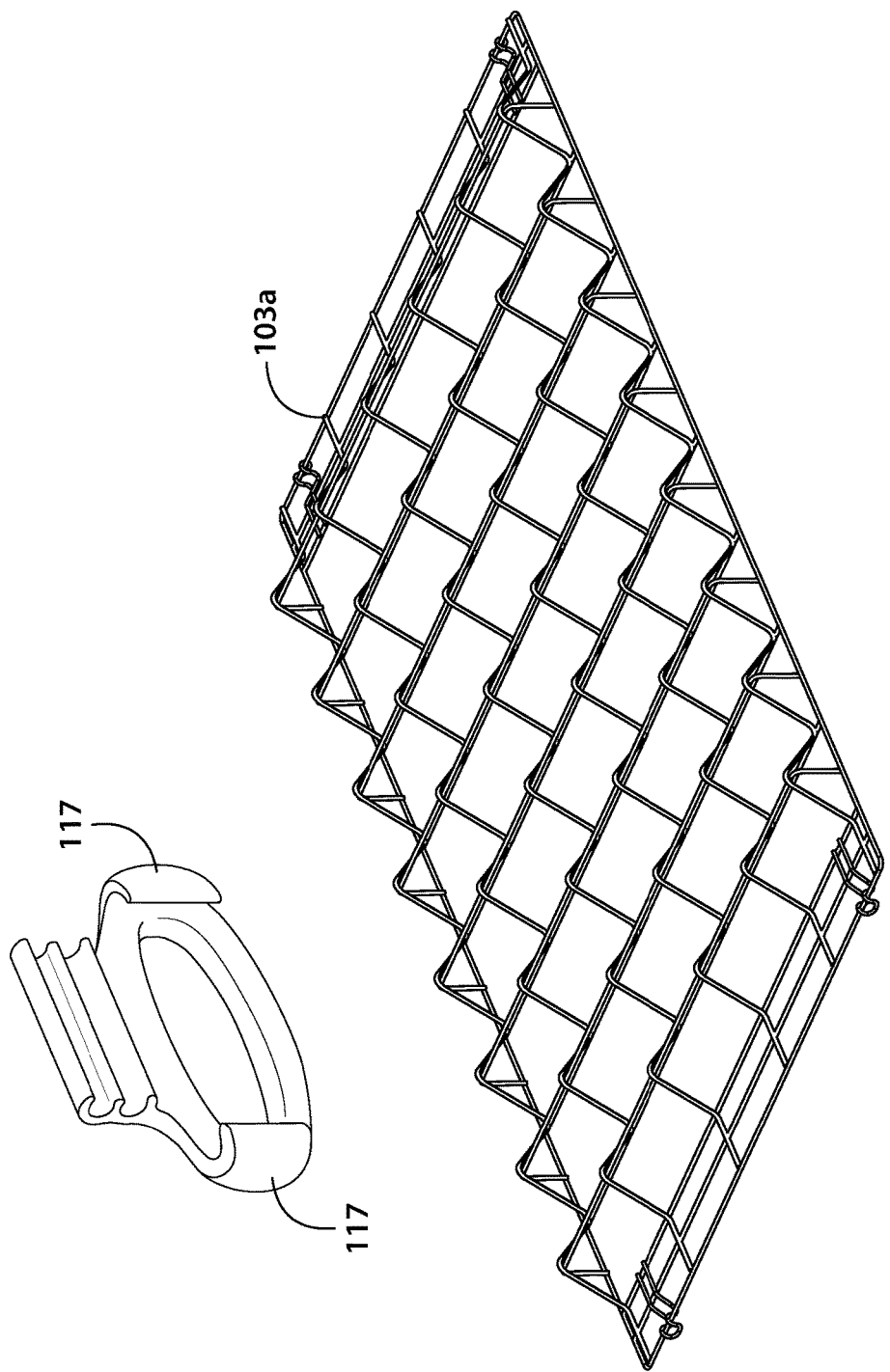
Figure 1B:
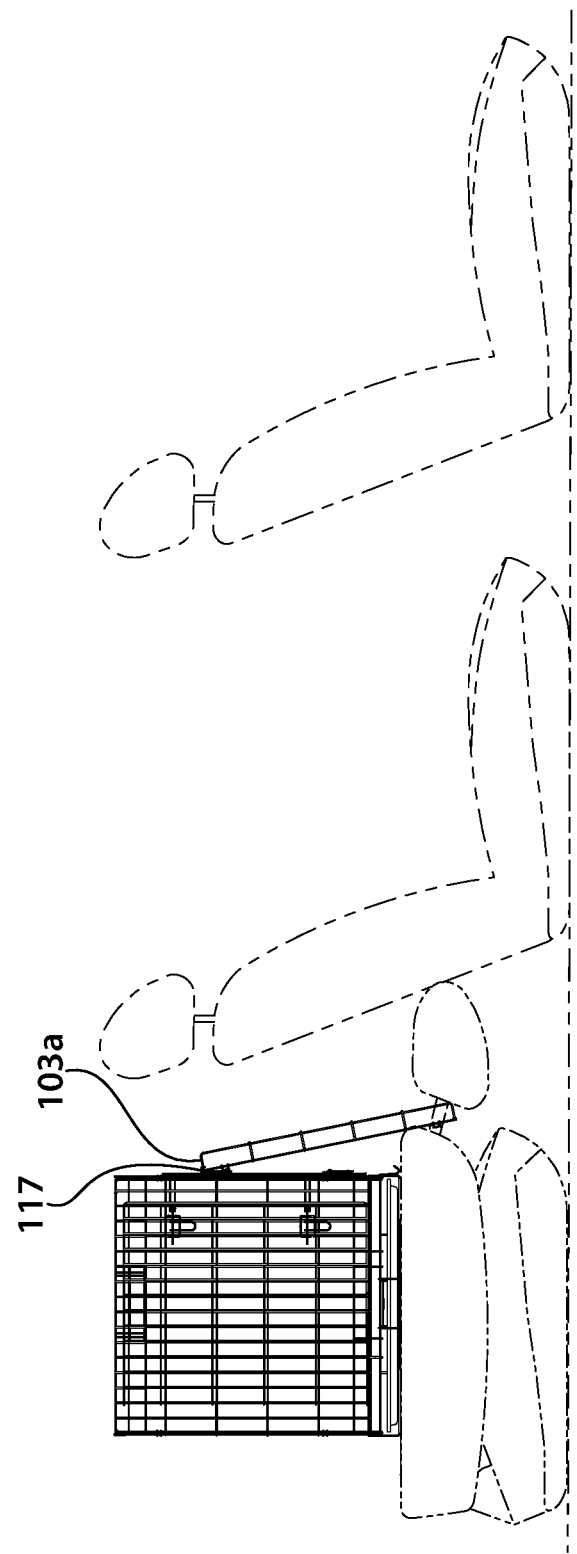
FIG. 1B and FIG. 1C illustrate side views of how crumplable-seatbeltable-rampable-leggable top panel 103a functions as an anchor.
Figure 1C:
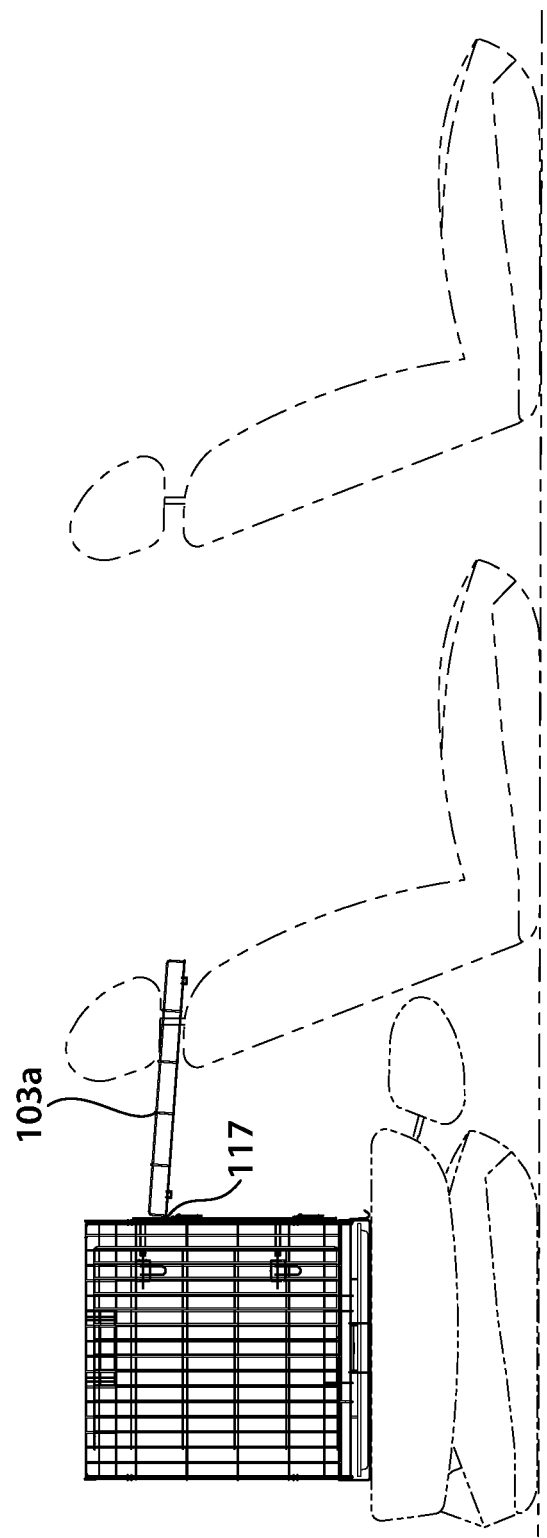
Figure 1D:
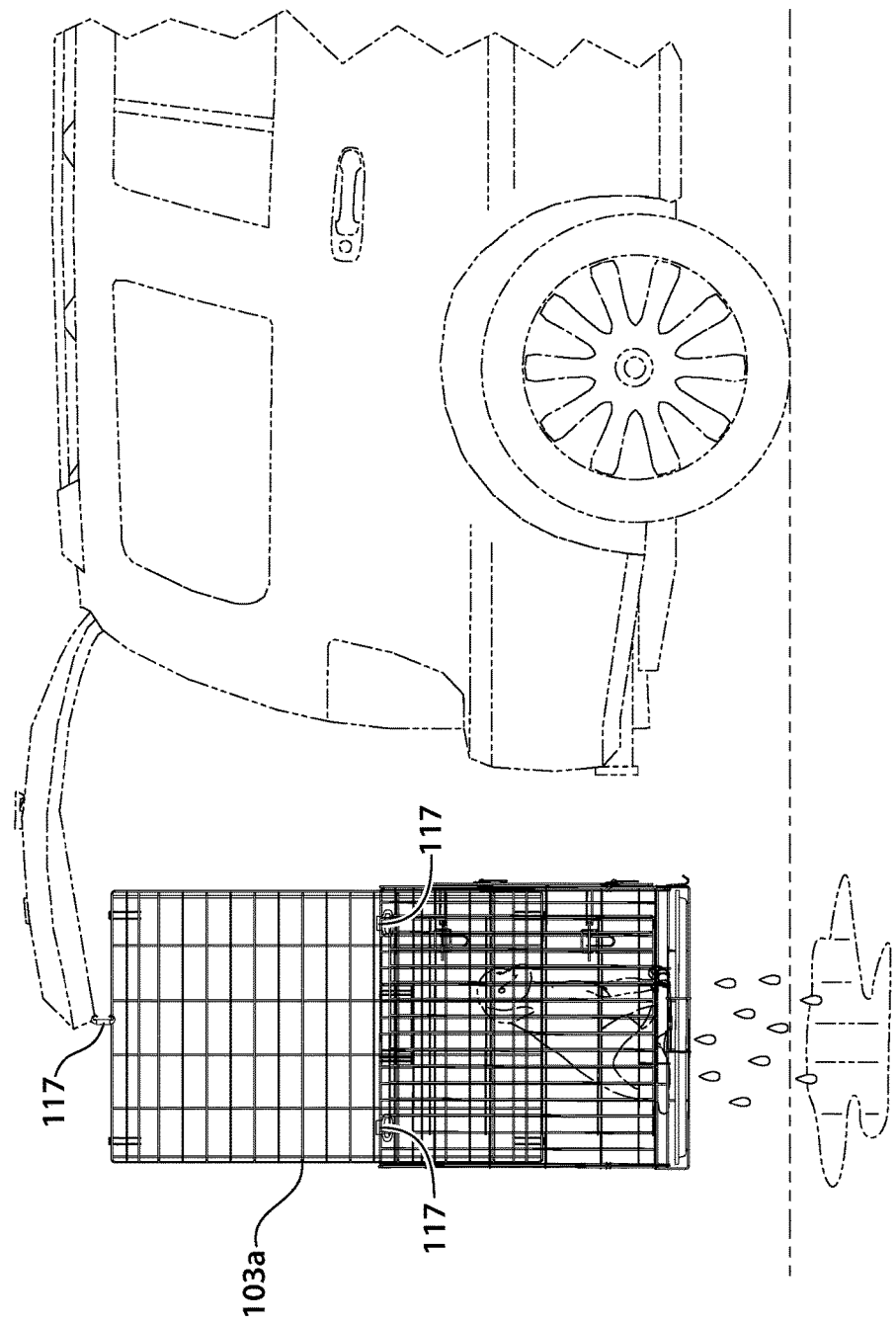
Figure 1E:
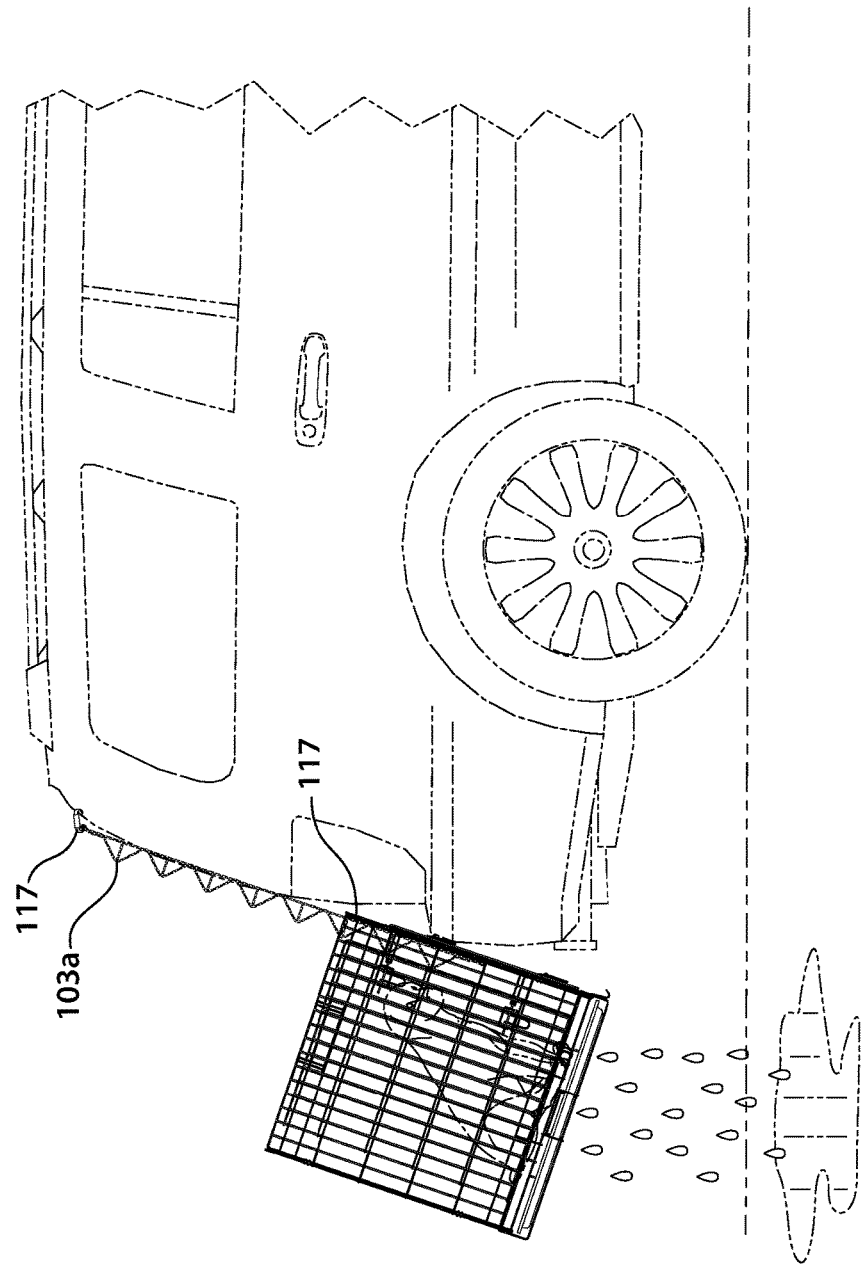
Figure 1F:
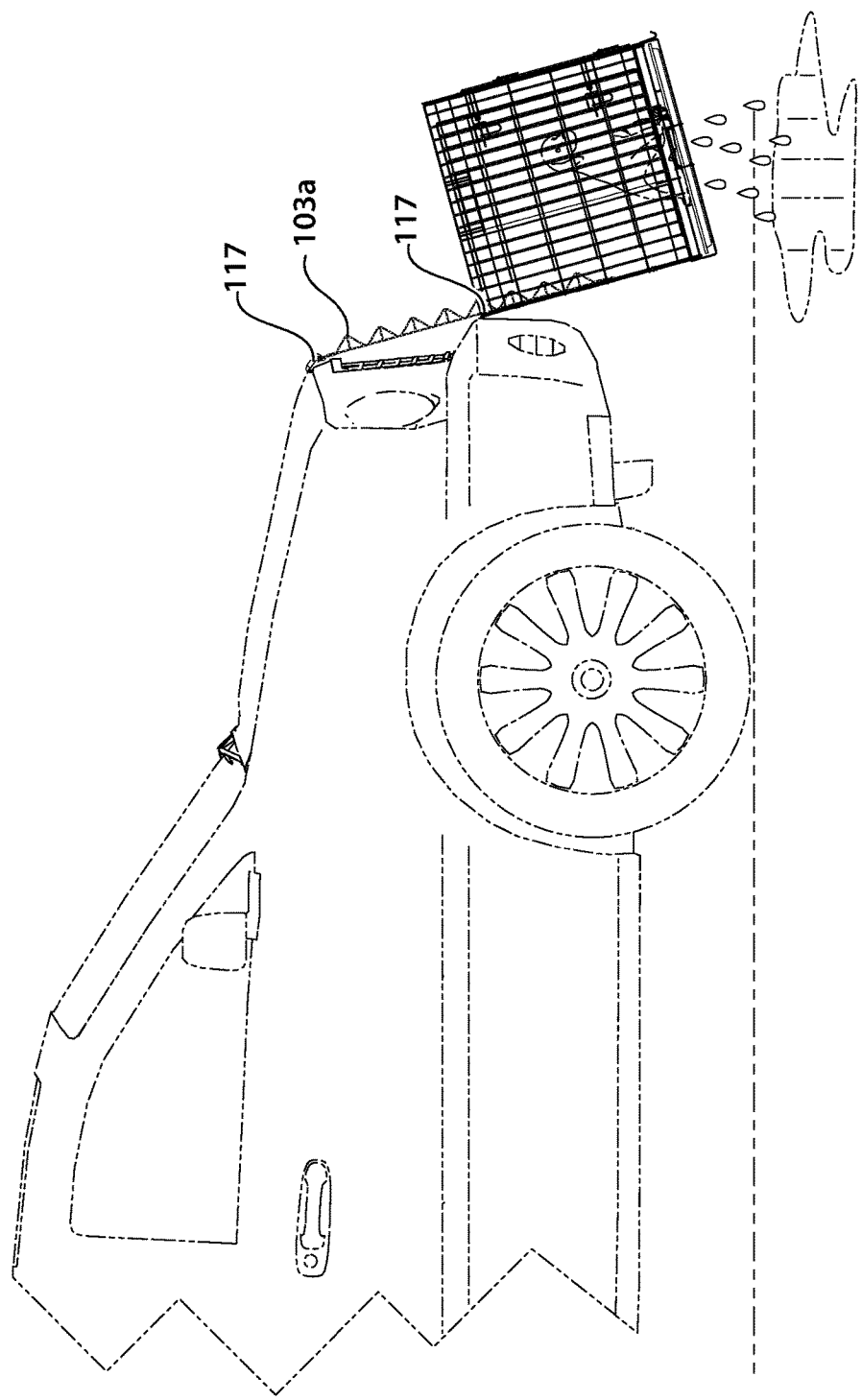
Figure 1H:
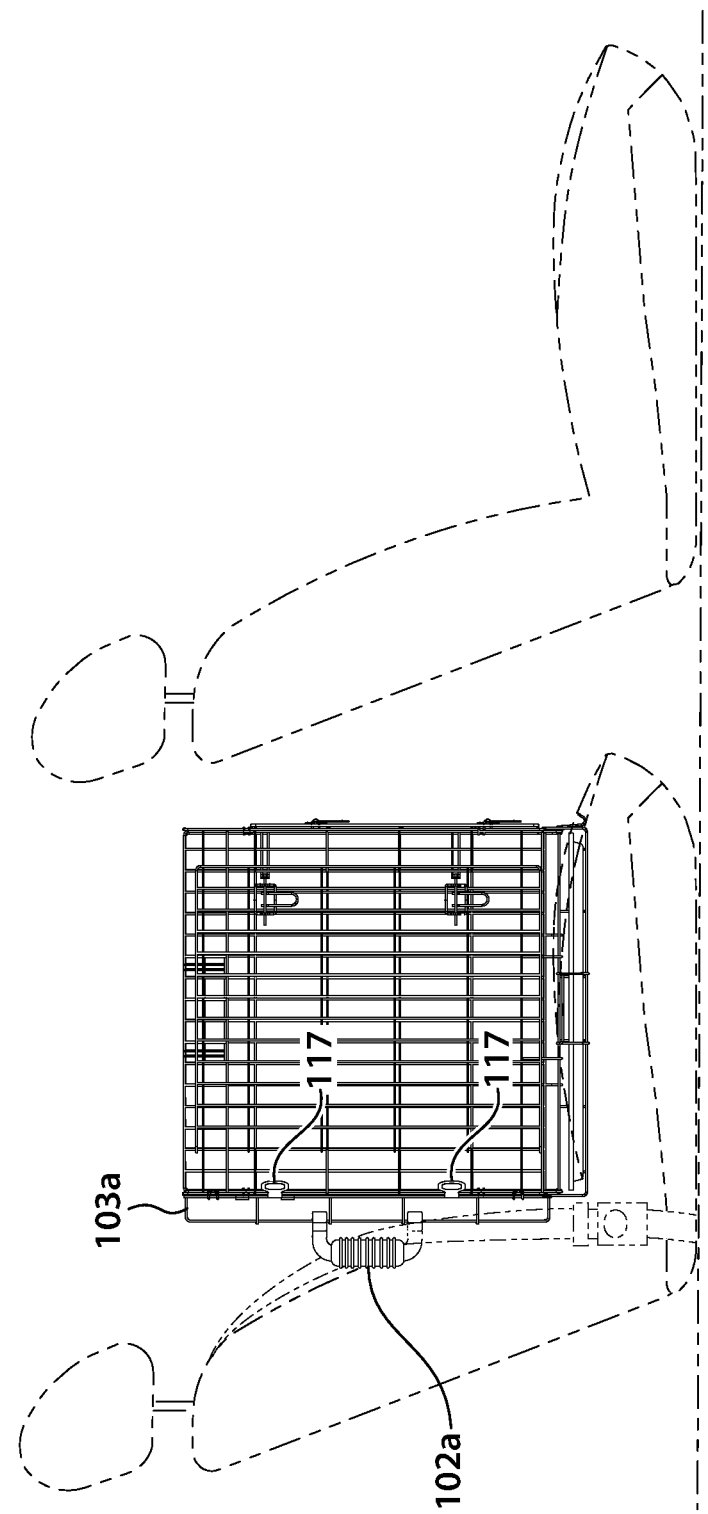
FIG. 1H illustrates a side view of how crumplable-seatbeltable-rampable-leggable top panel 103a functions as a car-seat fastener.
Figure 1I:
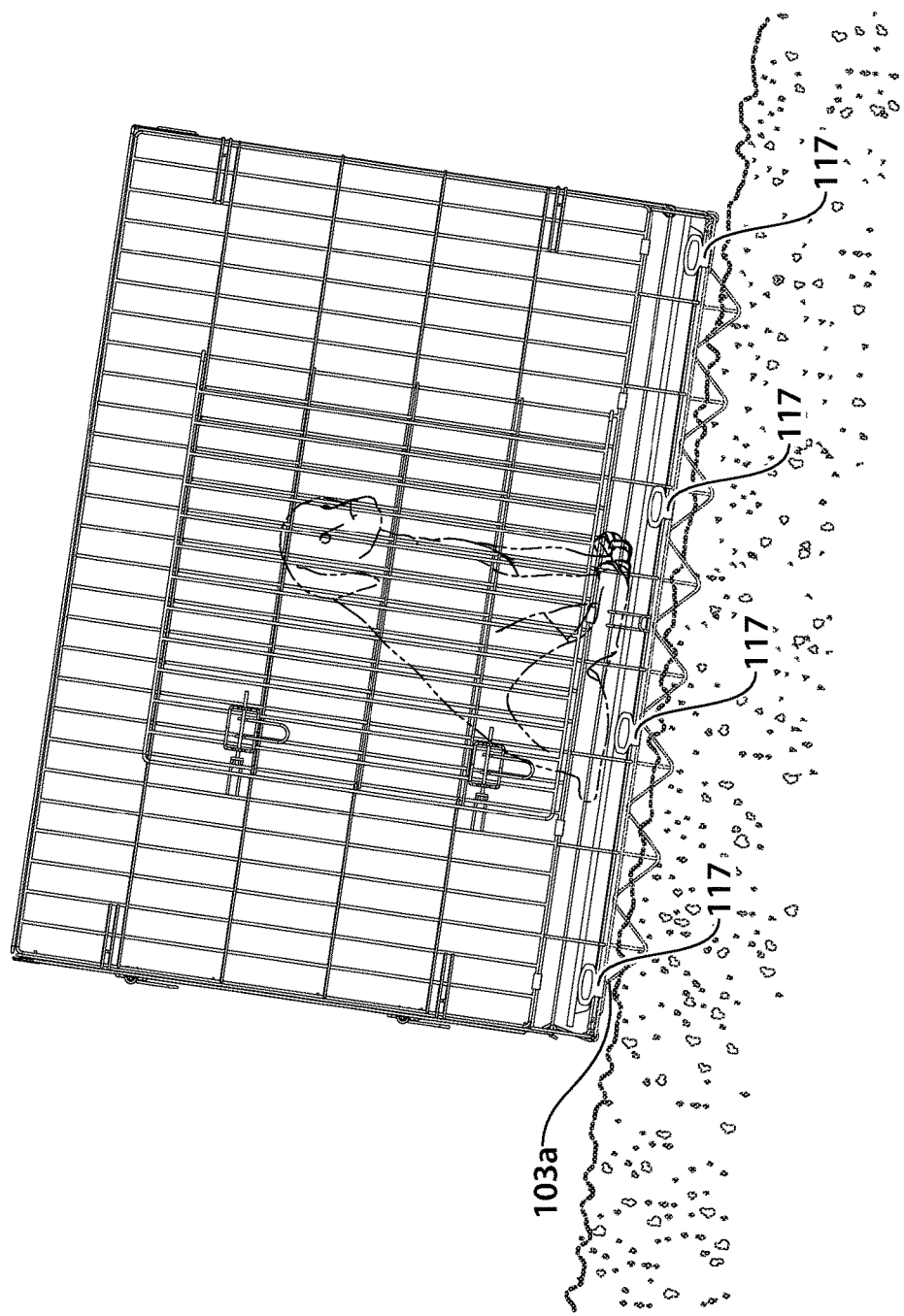
FIG. 1I and FIG. 1J illustrate side views of how crumplable-seatbeltable-rampable-leggable top panel 103a functions as a spike.
Figure 1J:
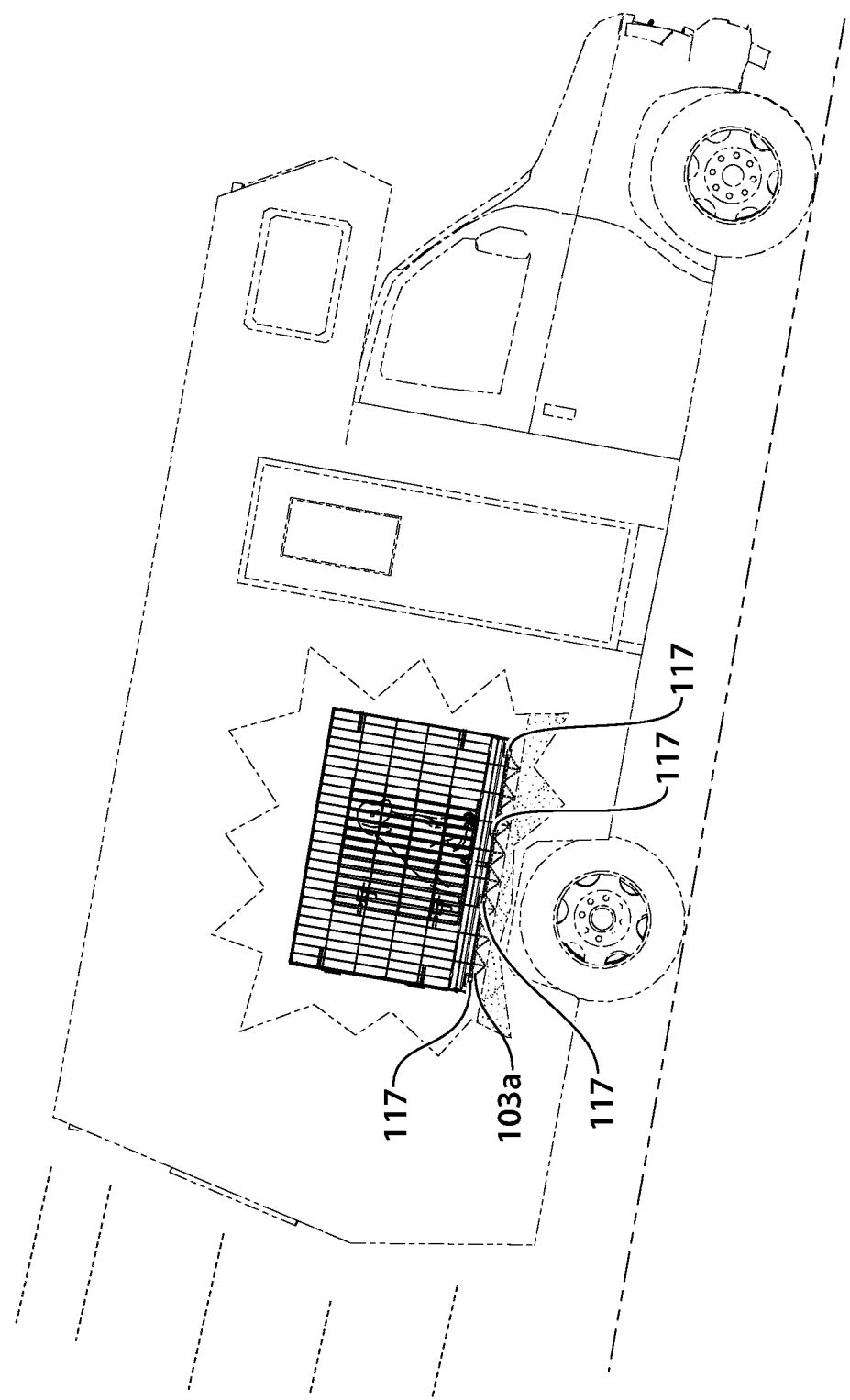
Figure 1K:
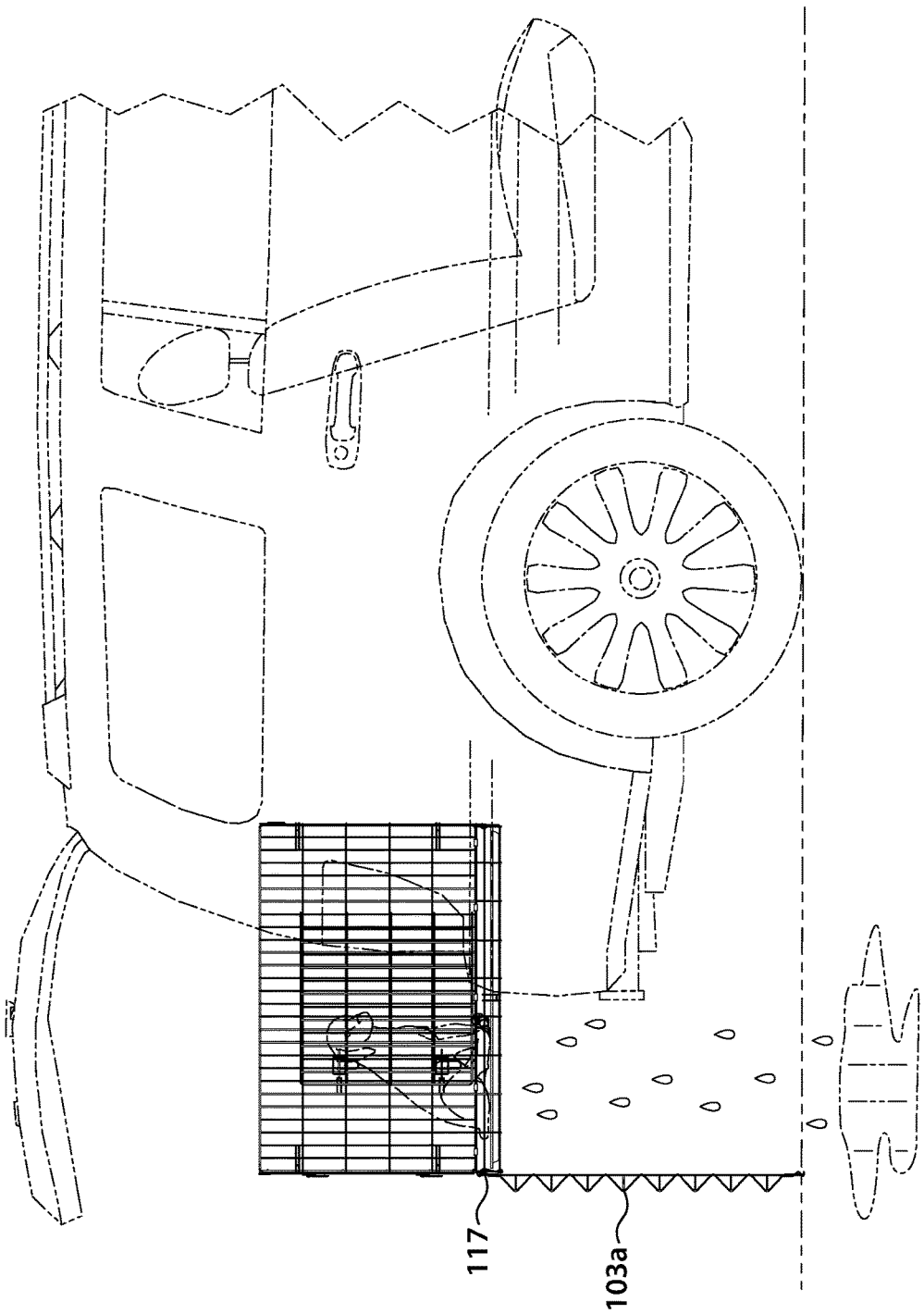
FIG. 1K and FIG. 1L illustrate side views of how crumplable-seatbeltable-rampable-leggable top panel 103a functions as a leg.
Figure 1L:
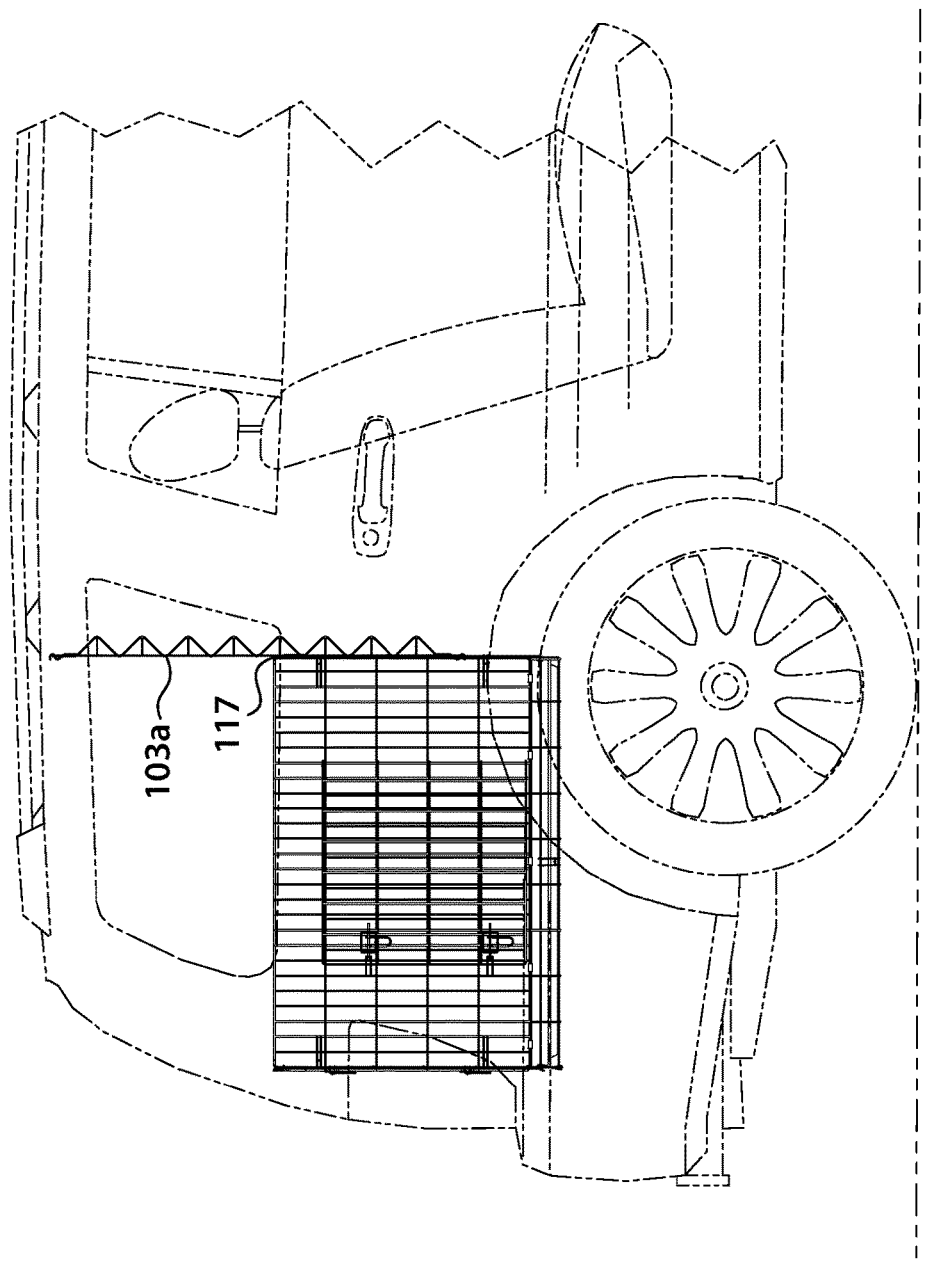
Figure 1M:
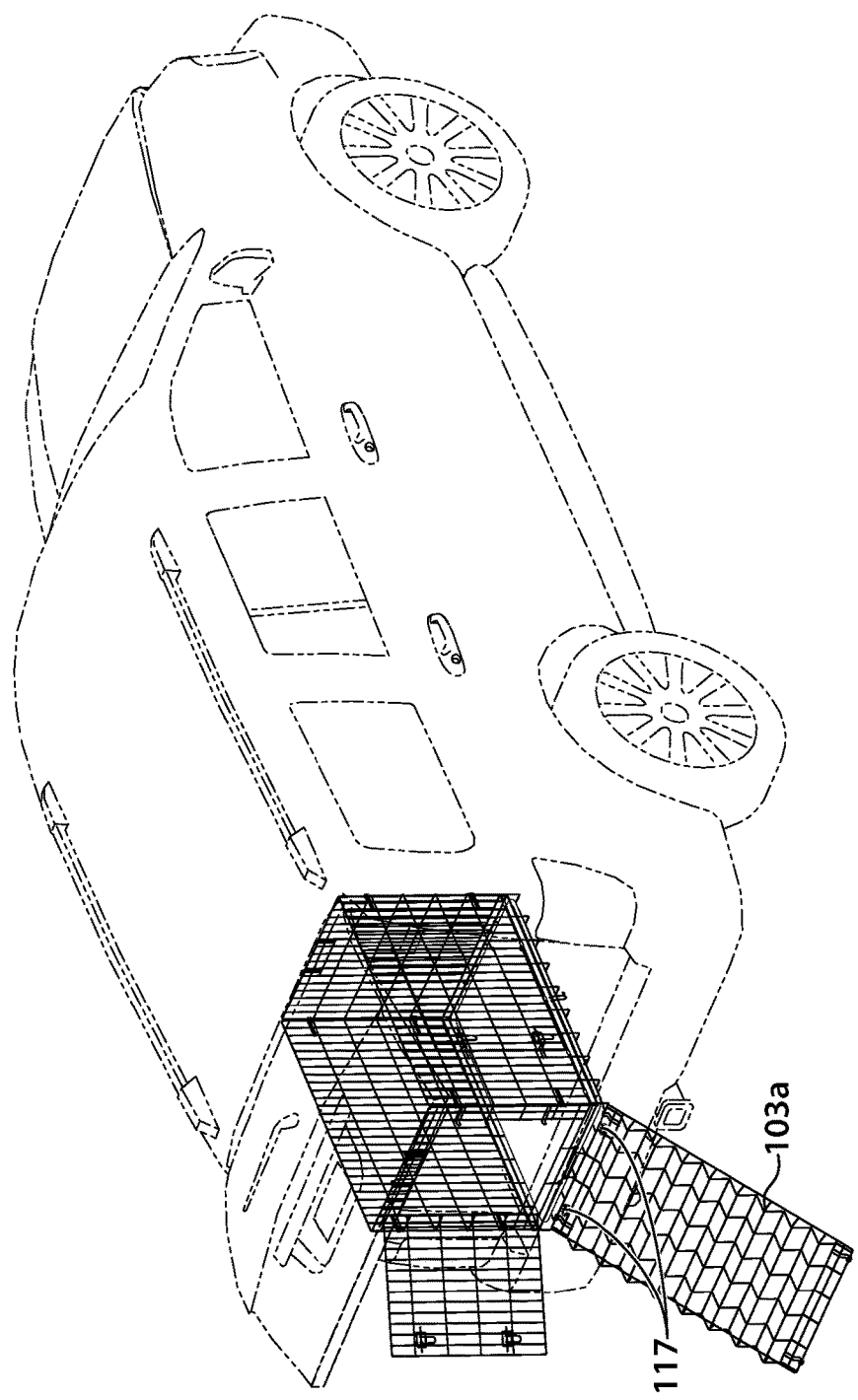
Figure 2A:
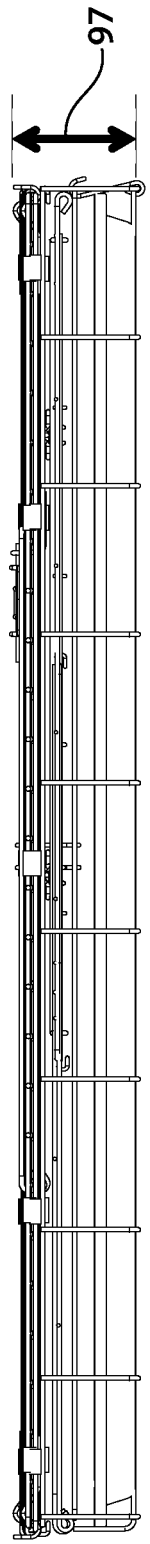
Figure 2B:
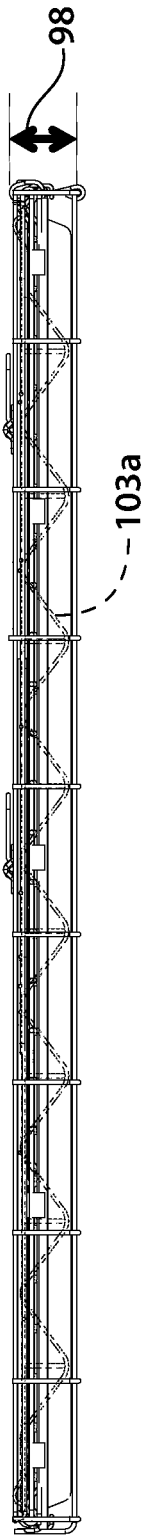
Figure 3G:
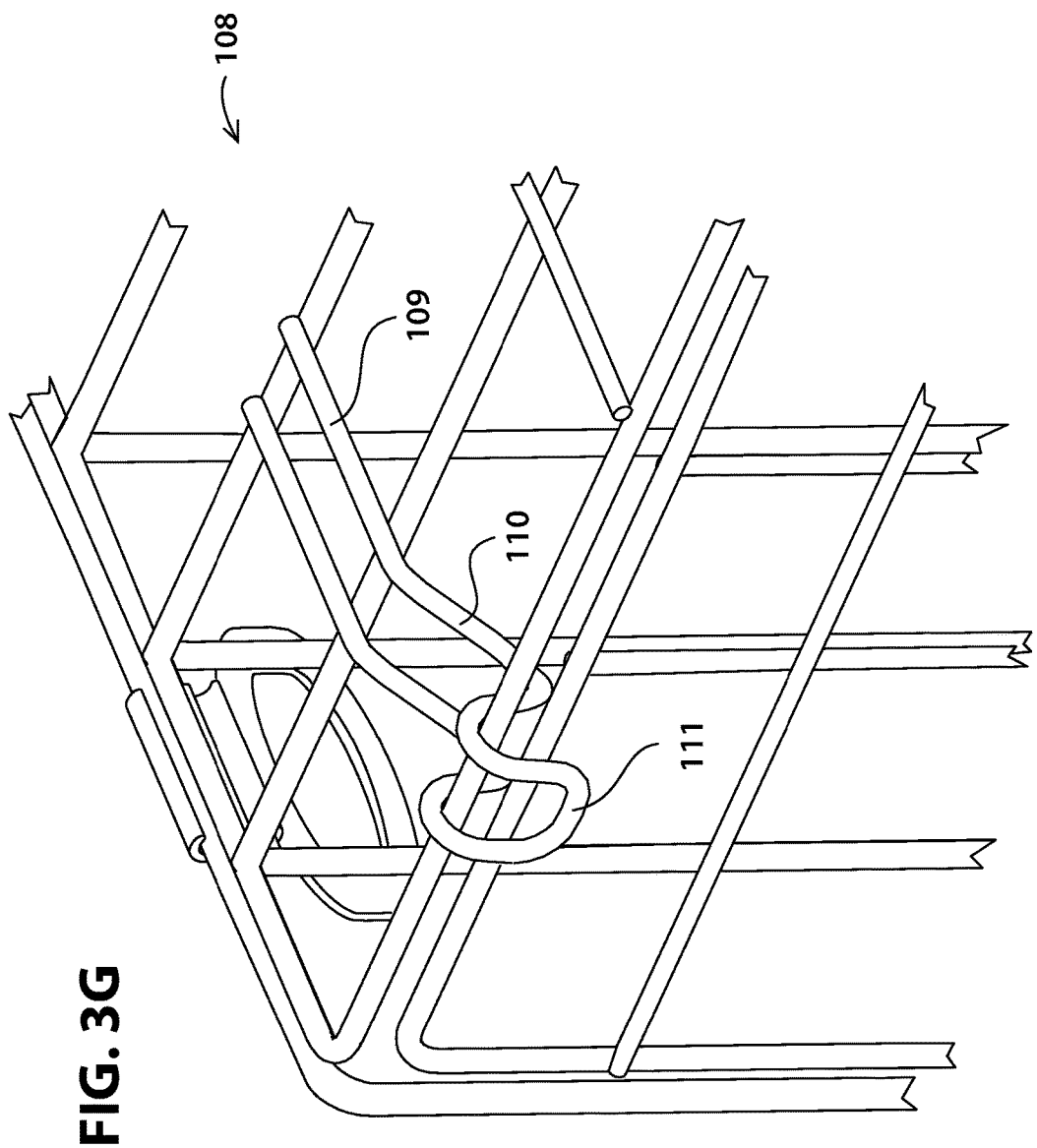
FIG. 3E, FIG. 3F, and FIG. 3G illustrate perspective and cross-sectional views of how crumplable-seatbeltable-rampable-leggable top panel 103a can be quickly and easily removed from the fourteen-device-in-one crumplable-seatbeltable-rampable-leggable-top-panel pet crate, by using top quick-panel-locking-and-releasing stopper-and-hook systems 108.
Figure 3I:
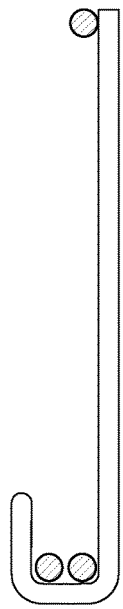
FIG. 3C (PRIOR ART), FIG. 3D (PRIOR ART)
FIG. 3H (PRIOR ART), FIG. 3I (PRIOR ART)
FIG. 3J, FIG. 3K, and FIG. 3L illustrate perspective and cross-sectional views of how front and rear panels 103a and 103f can be quickly and easily removed from the fourteen-device-in-one crumplable-seatbeltable-rampable-leggable-top-panel pet crate, by using side quick-panel-locking-and-releasing stopper-and-hook systems 112.
Figure 3K:
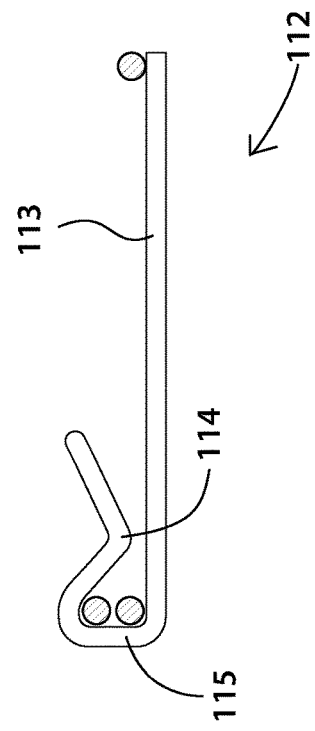
Figure 3H:
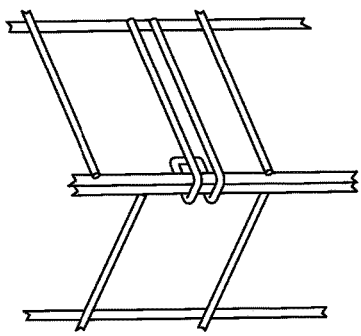
Figure 3J:
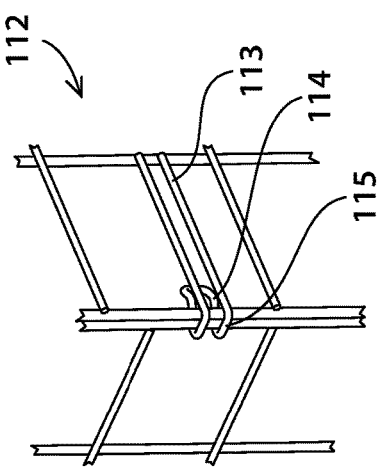
Figure 4A:
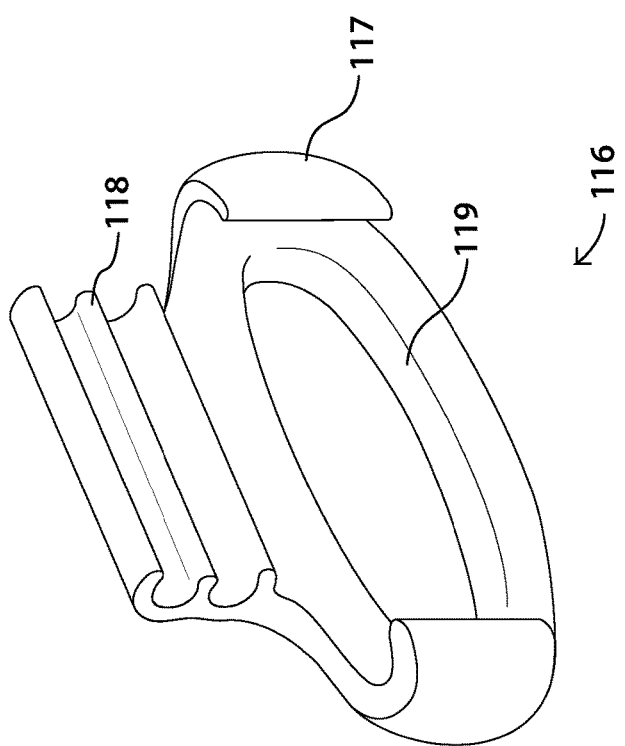
FIG. 4A, FIG. 4B, and FIG. 4C illustrate perspective and cross-sectional views of how crumplable-seatbeltable-rampable-leggable top panel 103a can be quickly and easily removed from the fourteen-device-in-one crumplable-seatbeltable-rampable-leggable-top-panel pet crate, by using removable multi-function double-clip-and-ring-hook systems 116.
Figure 4B:
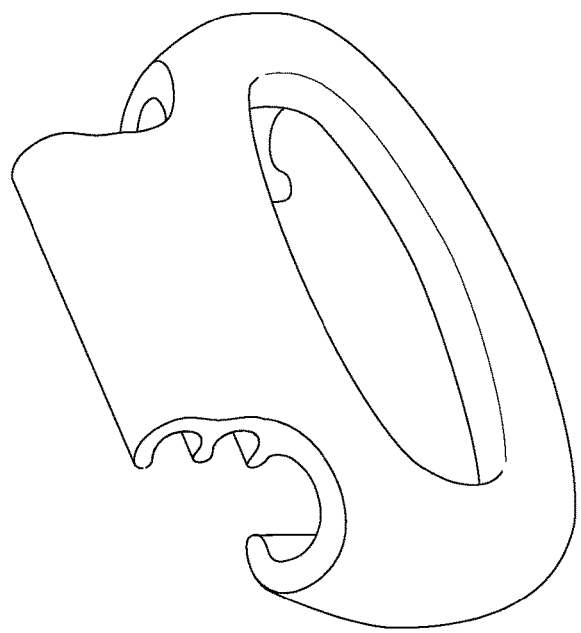
Figure 4C:
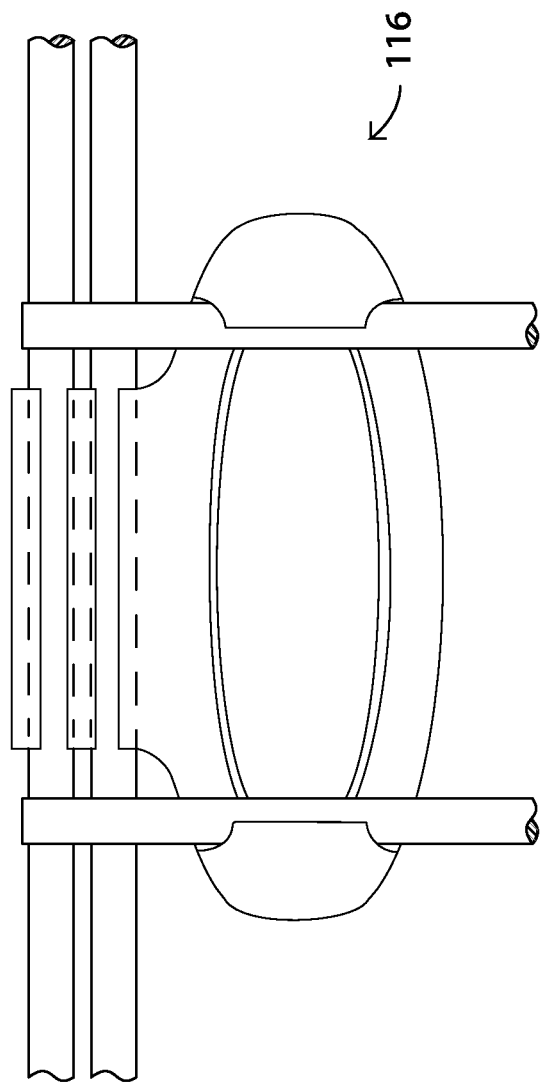
Figure 4D:
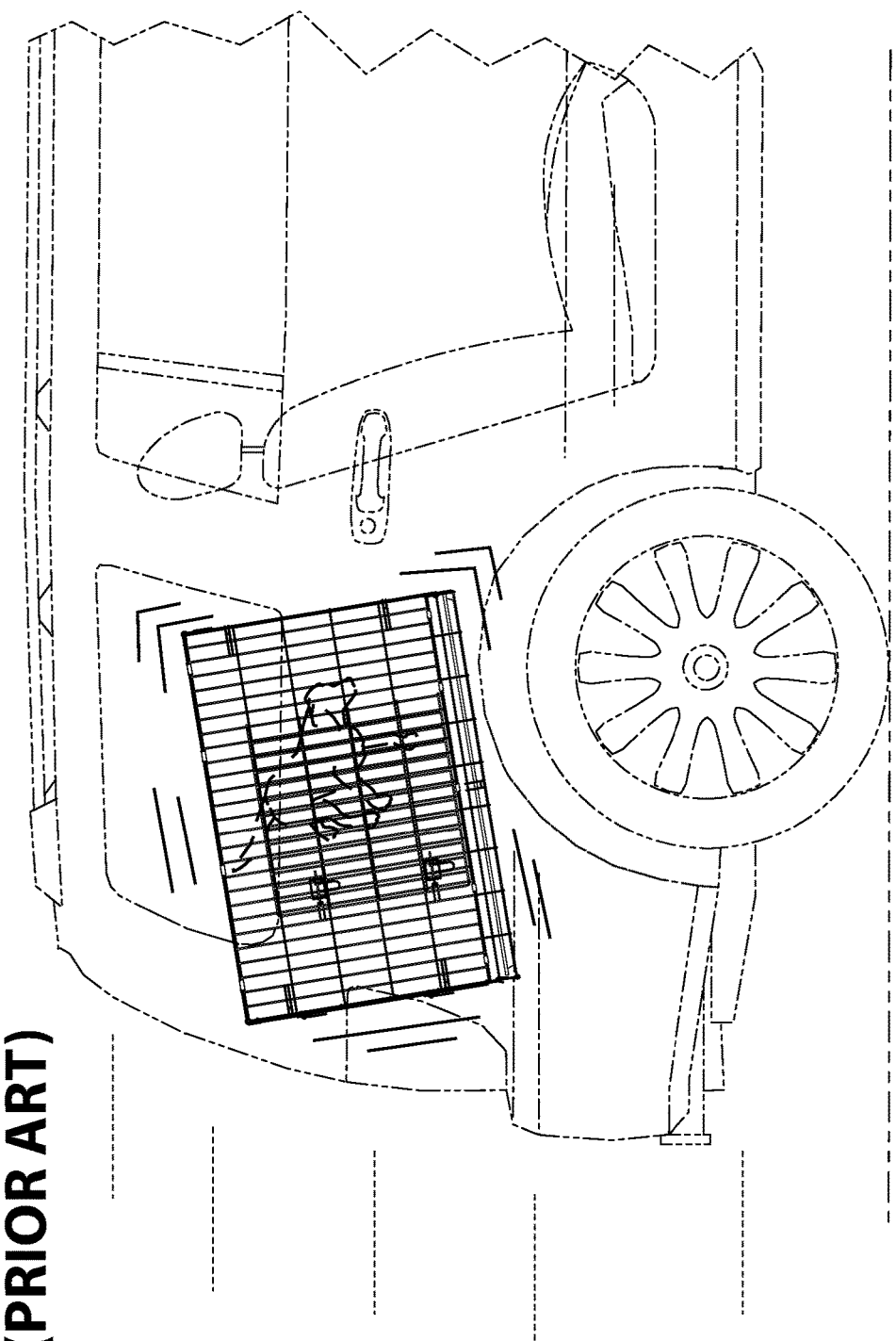
FIG. 4D (PRIOR ART) illustrates a side view of a prior-art pet crate being tossed around in a moving automobile.
Figure 5:
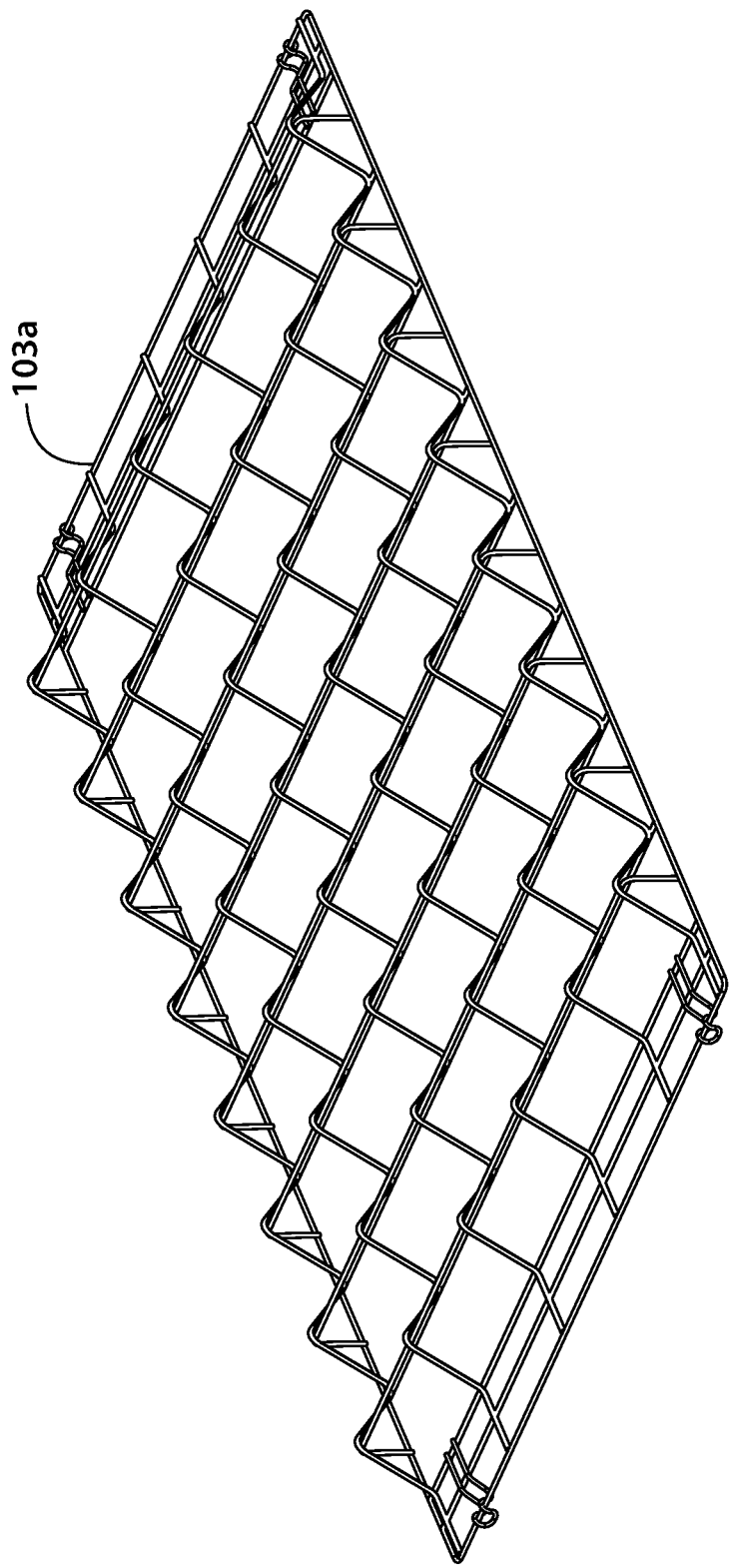
Figure 7A:
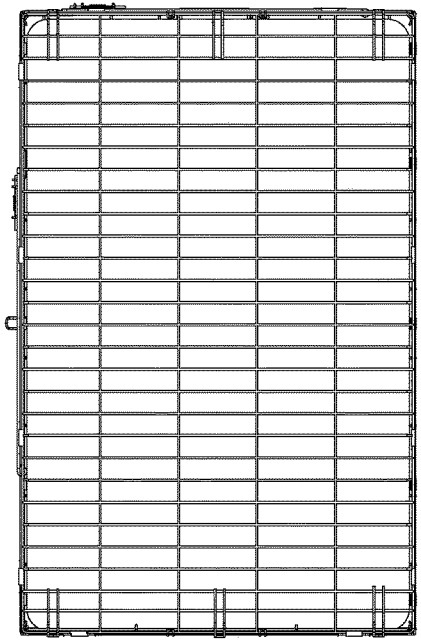
Figure 7C:
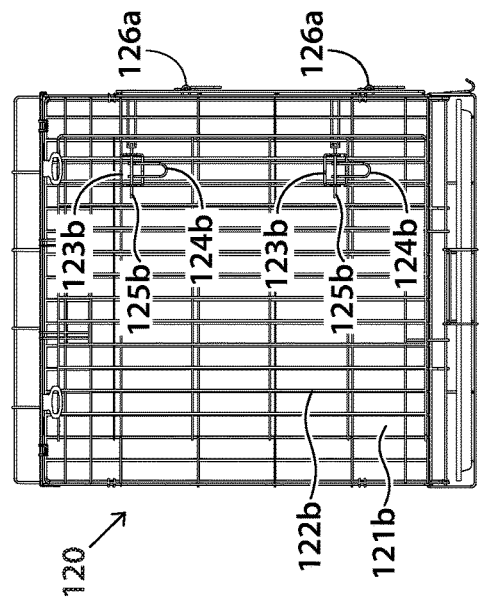
Figure 7B:
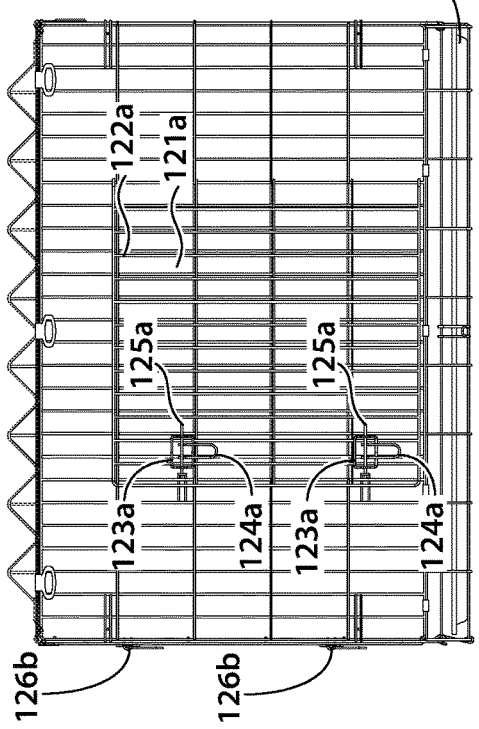
Figure 9:
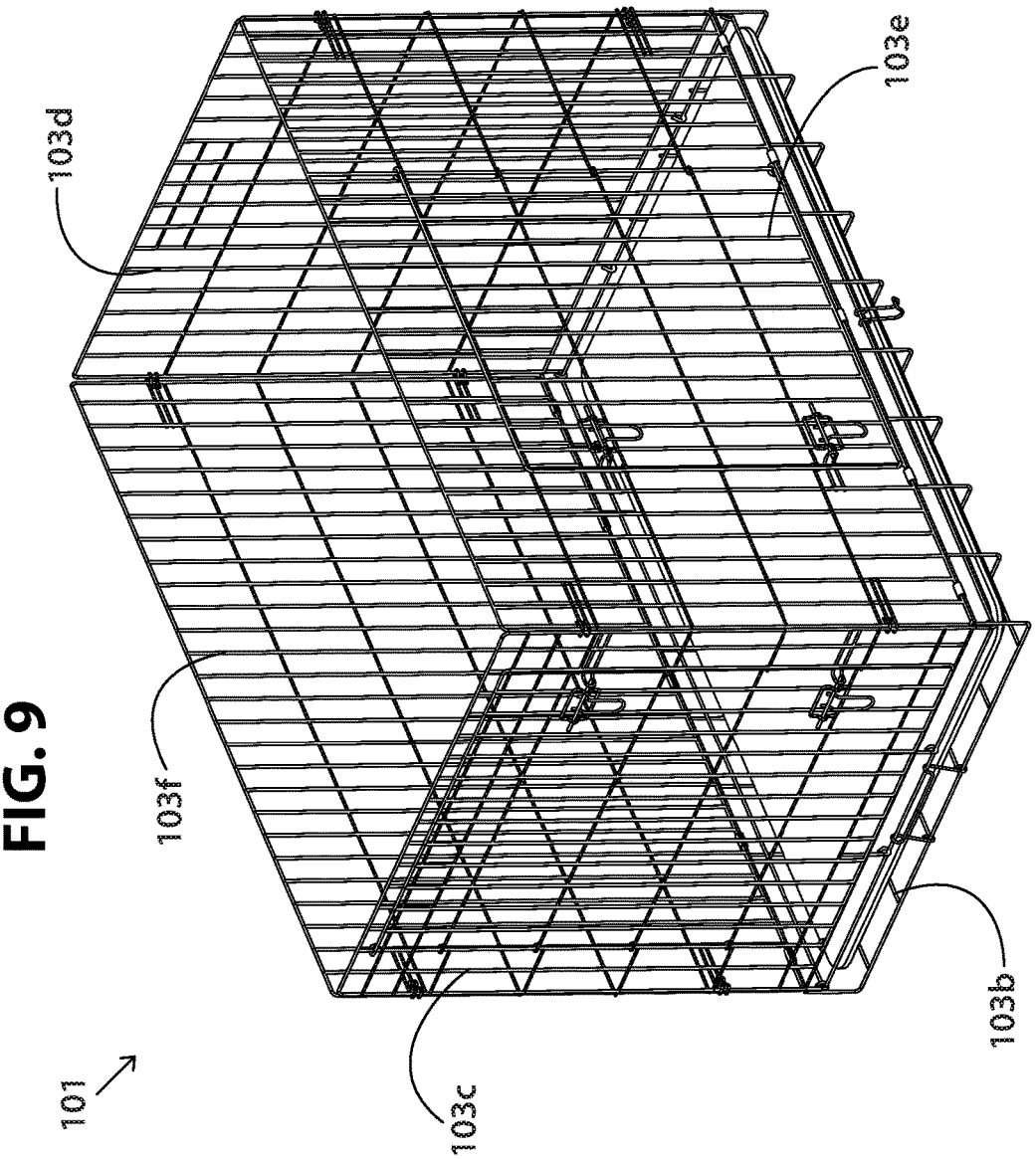
Figure 10:
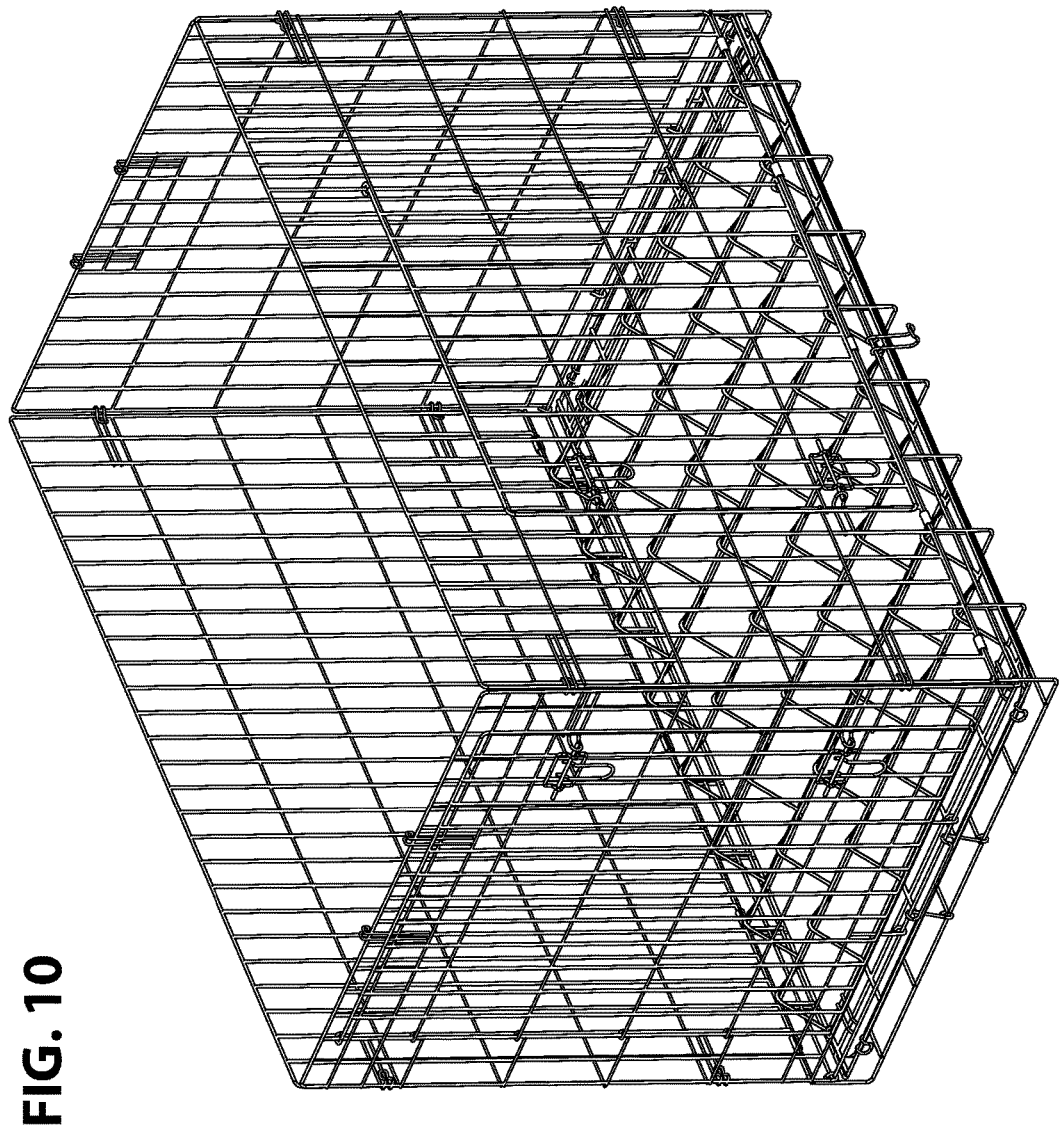
Figure 11:
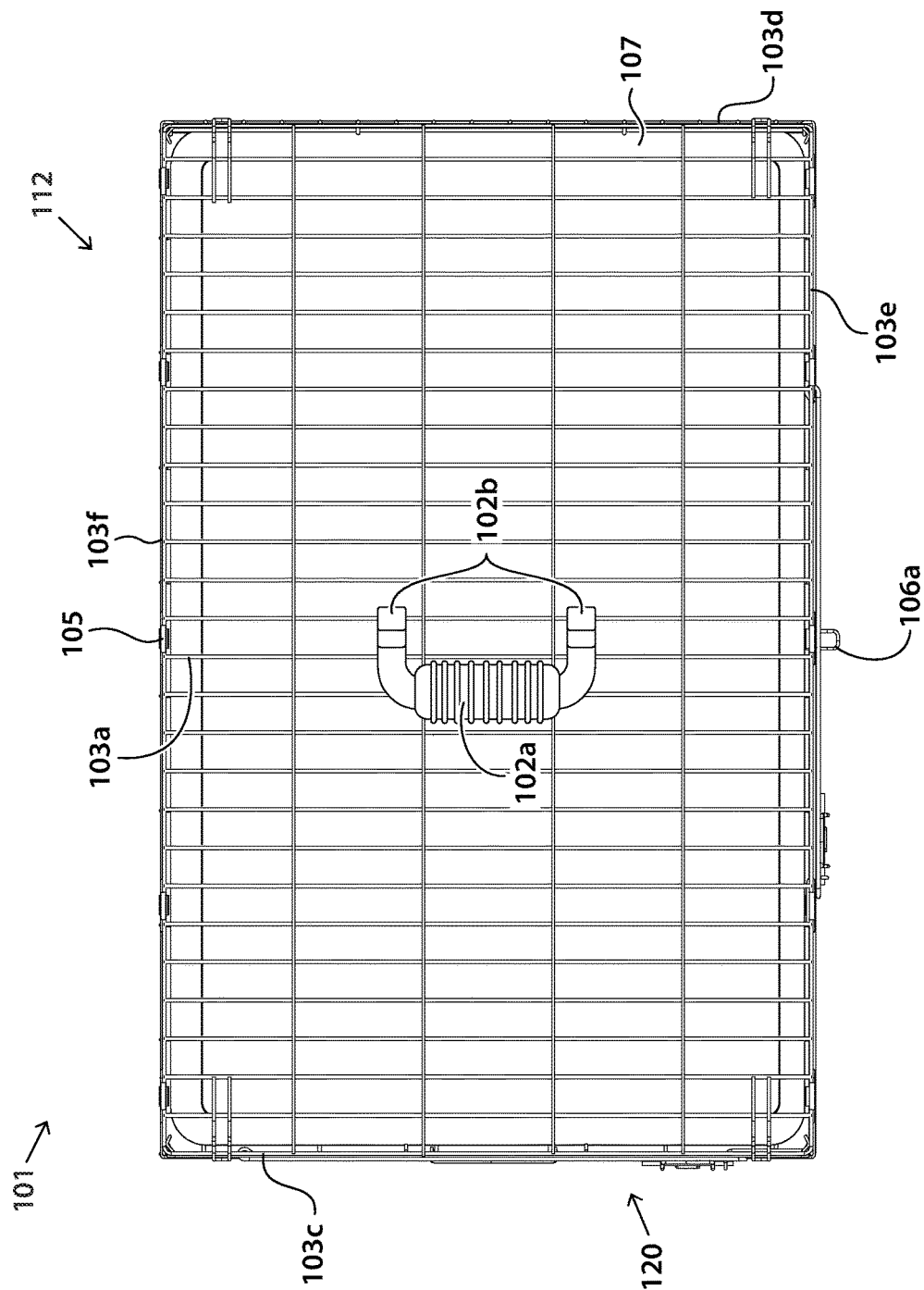
Figure 12:
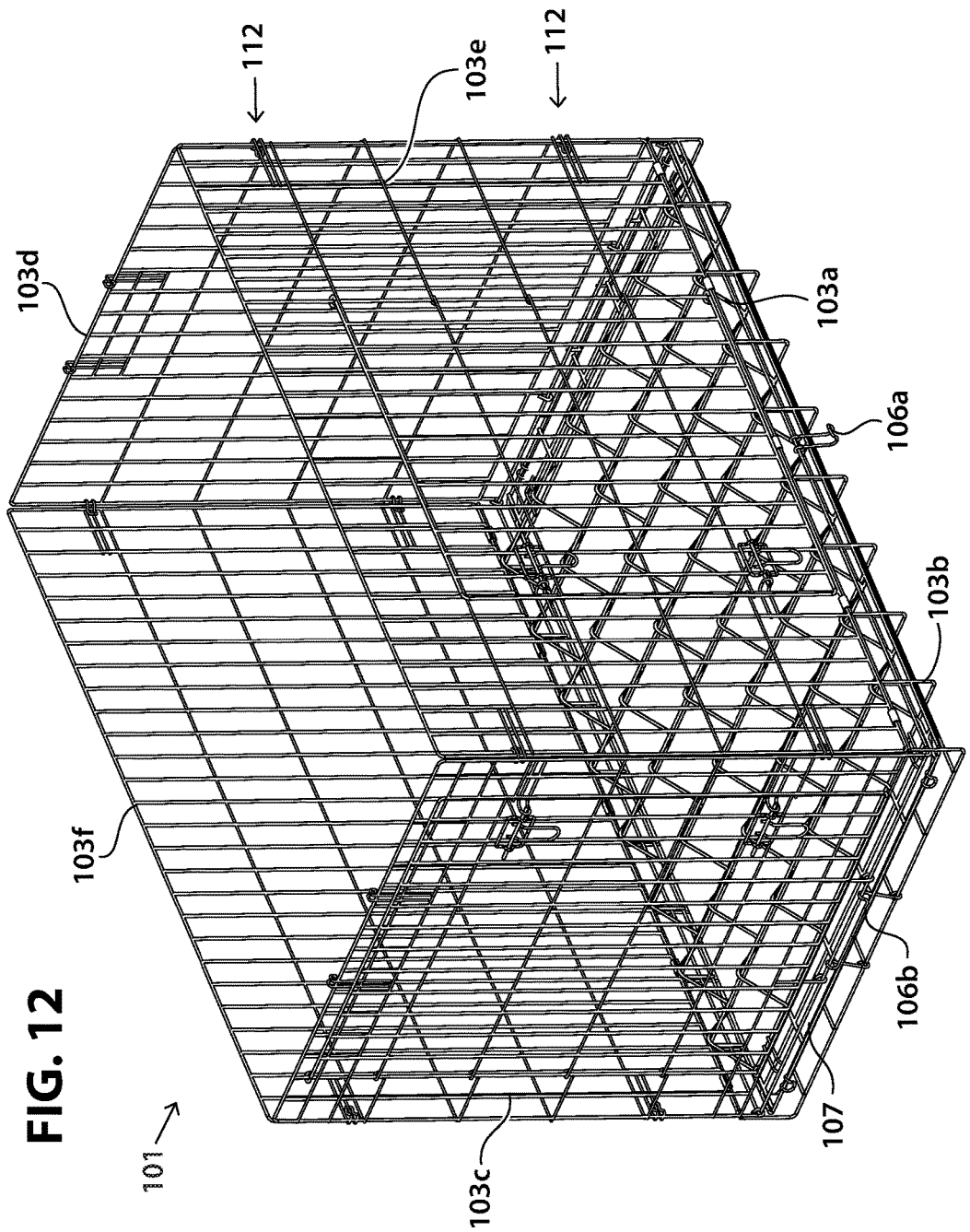
Figure 13:
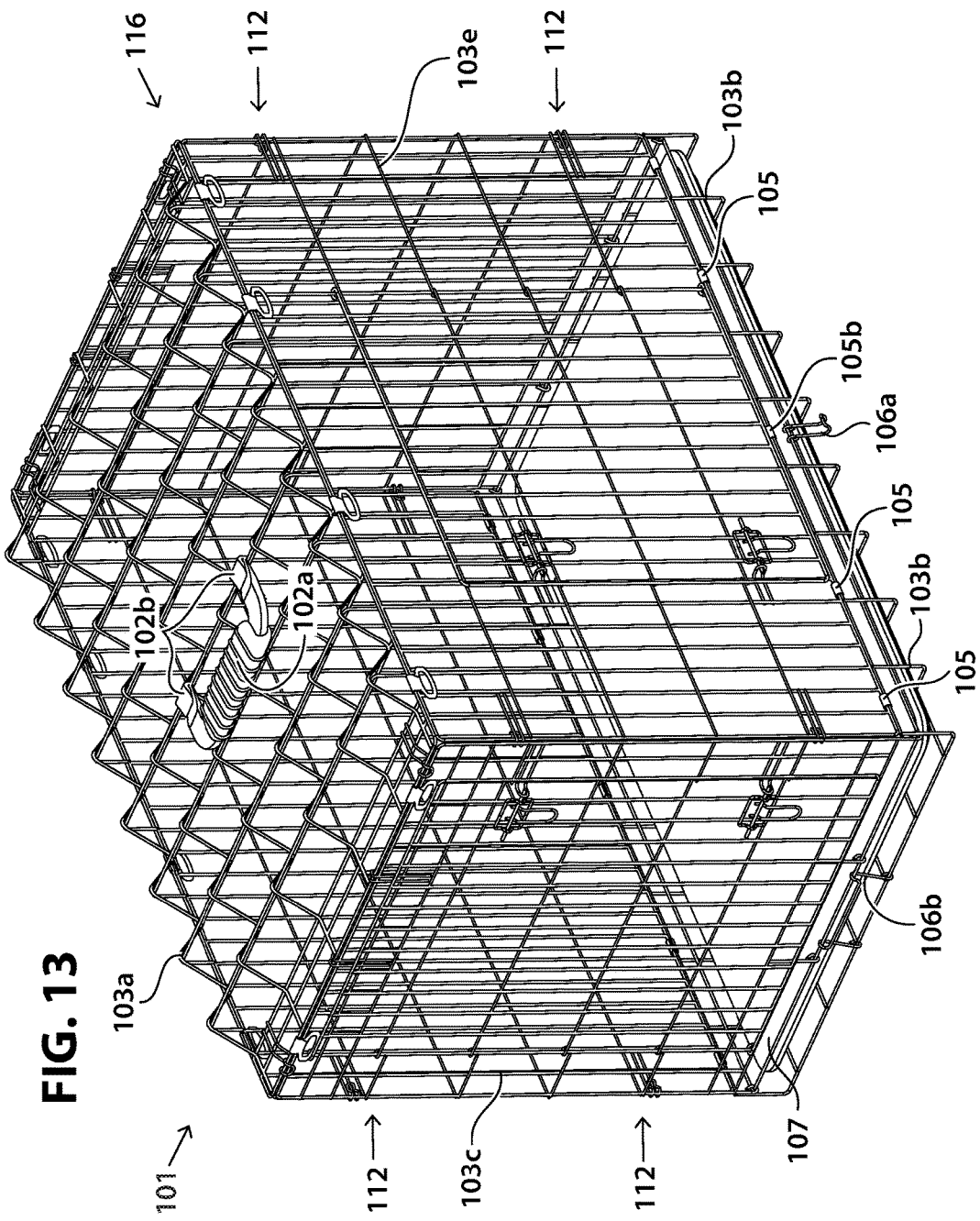
Figure 14:
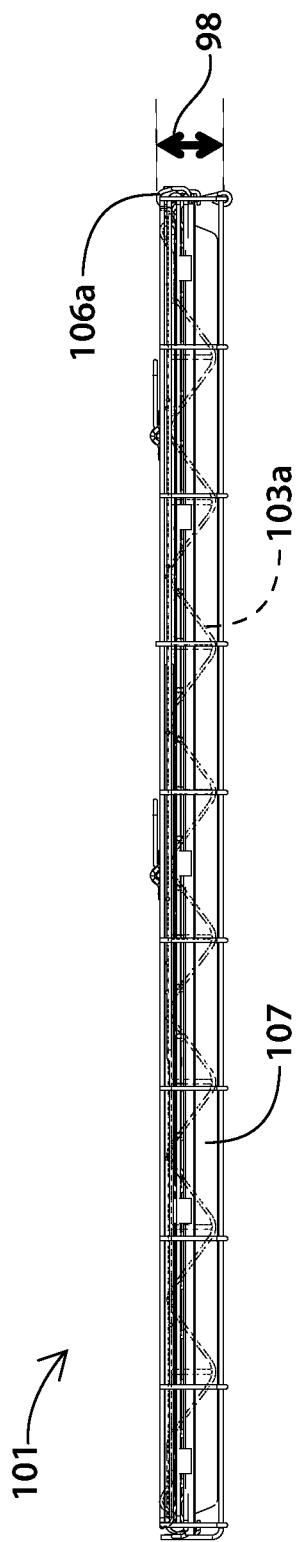
Figure 15:
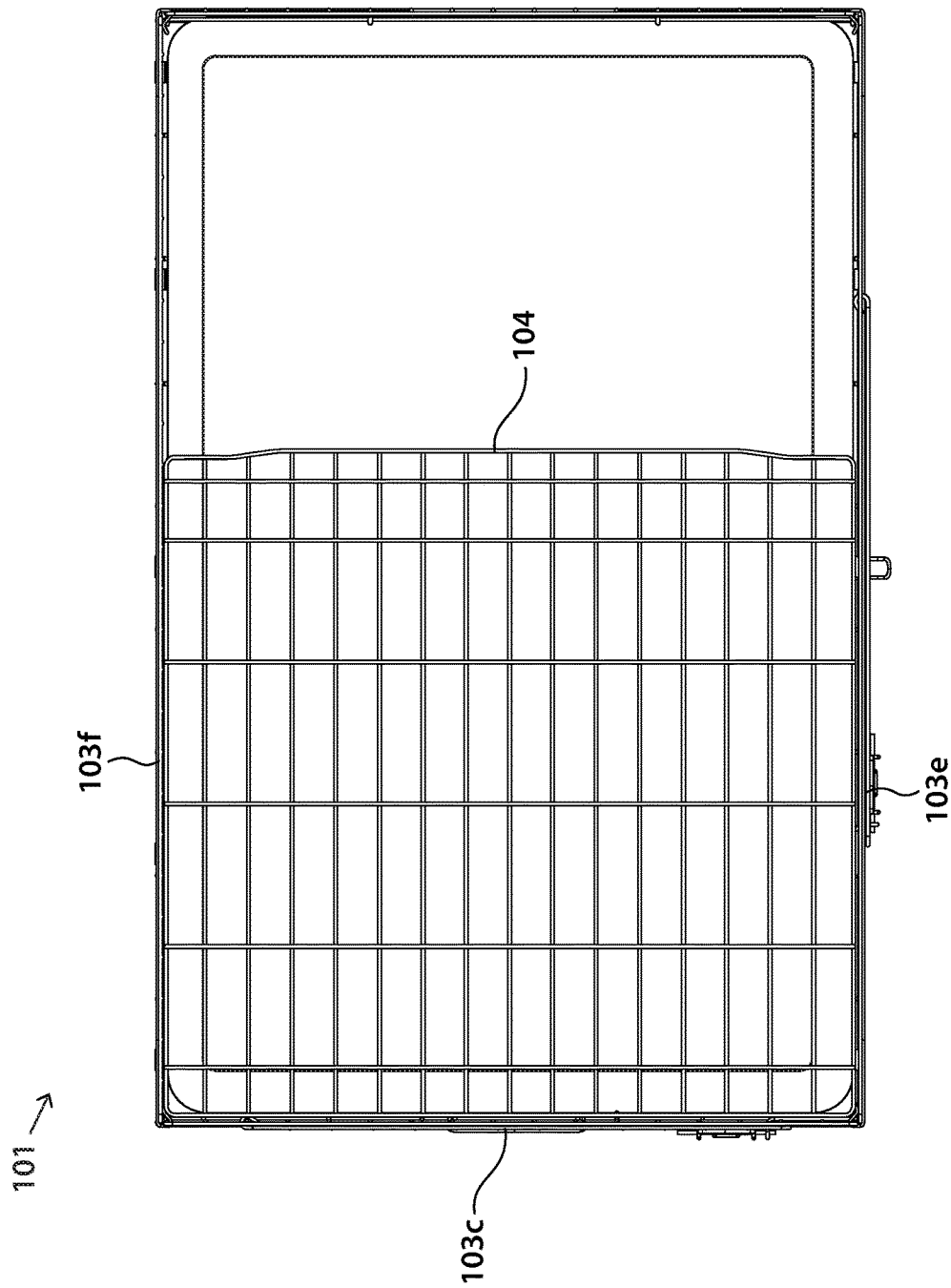
Figure 16:
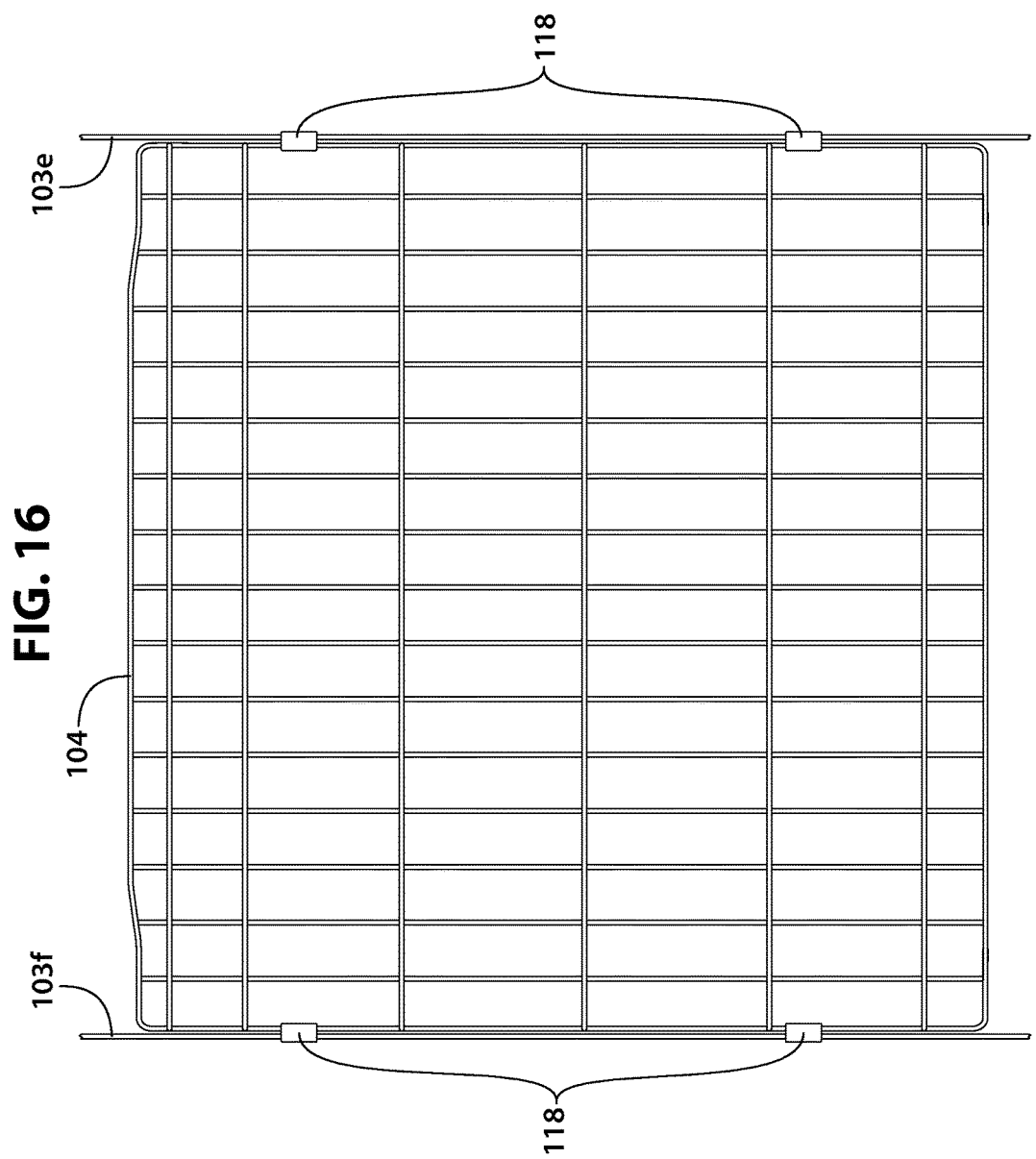
Figure 17:
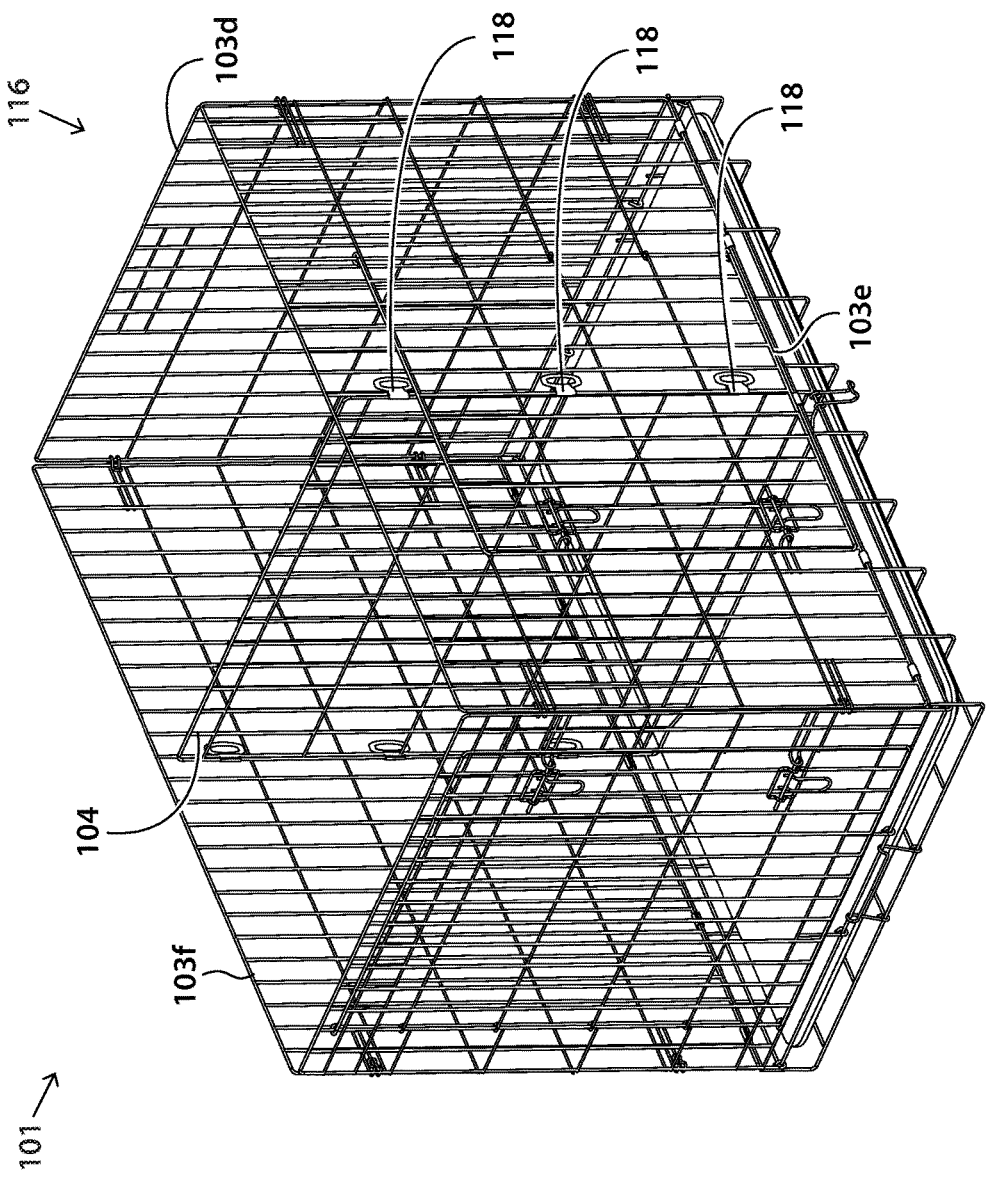

Referring to FIG. 1A, FIG. 1B, FIG. 1C, FIG. 1D, FIG. 1E, FIG. 1F, FIG. 1G, FIG. 1H, FIG. 1I, FIG. 1J, FIG. 1K FIG. 1L, FIG. 1M, FIG. 1N, FIG. 1O, FIG. 1P (PRIOR ART), FIG. 1Q, FIG. 2A (PRIOR ART), FIG. 2B, FIG. 2C (PRIOR ART), FIG. 2D, FIG. 3A (PRIOR ART), FIG. 3B, FIG. 3C (PRIOR ART), FIG. 3D (PRIOR ART), FIG. 3E, FIG. 3F, FIG. 3G, FIG. 3H (PRIOR ART), FIG. 3I (PRIOR ART), FIG. 3J, FIG. 3K, FIG. 3L, FIG. 4A, FIG. 4B, FIG. 4C, FIG. 4D, FIG. 4E, FIG. 5, FIG. 6, FIG. 7A, FIG. 7B, FIG. 7C, FIG. 8, FIG. 9, FIG. 10, FIG. 11, FIG. 12, FIG. 13, and FIG. 14, the fourteen-device-in-one crumplable-seatbeltable-rampable-leggable-top-panel pet crate comprises:
1) Crumplable-seatbeltable-rampable-leggable-top-panel system 101, comprising:
2) Handle and handle hooks 102a and 102B,
3) Crumplable-seatbeltable-rampable-leggable top panel 103a,
Bottom, left, right, front, and rear panels 103b, 103c, 103d, 103e, and 103f,
4) Removable multi-function roof-ramp-balcony-awning-partition mezzanine 104,
5) Panel-coupling clips 105,
6) Panel-folding clamp 106a,
Tray-locking clamp 106b, and
7) Urine-waste-catching tray 107;
8) Top quick-panel-locking-and-releasing stopper-and-hook systems 108, each comprising:
9) Top quick-panel-locking-and-releasing arms 109,
10) Top quick-panel-locking-and-releasing stoppers 110, and
11) Top quick-panel-locking-and-releasing hooks 111;
12) Side quick-panel-locking-and-releasing stopper-and-hook systems 112, each comprising:
13) Side quick-panel-locking-and-releasing arms 113,
14) Side quick-panel-locking-and-releasing stoppers 114, and
15) Side quick-panel-locking-and-releasing hooks 115;
16) Removable multi-function double-clip-and-ring-hook systems 116, each comprising:
17) Removable crumple-zone multi-function locking clamps 117,
18) Removable crumple-zone multi-function locking double clips 118, and
19) Removable crumple-zone multi-function accessory-hanging ring hook 119;
20) Multi-pet multi-entrance door system 120, comprising:
21) First and second door openings 121a and 121b,
22) First and second doors 122a and 122b,
23) First and second push-rod hinges 123a and 123b,
24) First and second push-rod levers 124a and 124b,
25) First and second push-rods 125a and 125b, and
26) First and second push-rod-locking rings 126a and 126b.

Material

Referring to FIG. 1A, FIG. 1B, FIG. 1C, FIG. 1D, FIG. 1E, FIG. 1F, FIG. 1G, FIG. 1H, FIG. 1I, FIG. 1J, FIG. 1K FIG. 1L, FIG. 1M, FIG. 1N, FIG. 1O, FIG. 1P (PRIOR ART), FIG. 1Q, FIG. 2A (PRIOR ART), FIG. 2B, FIG. 2C (PRIOR ART), FIG. 2D, FIG. 3A (PRIOR ART), FIG. 3B, FIG. 3C (PRIOR ART), FIG. 3D (PRIOR ART), FIG. 3E, FIG. 3F, FIG. 3G, FIG. 3H (PRIOR ART), FIG. 3I (PRIOR ART), FIG. 3J, FIG. 3K, FIG. 3L, FIG. 4A, FIG. 4B, FIG. 4C, FIG. 4D, FIG. 4E, FIG. 5, FIG. 6, FIG. 7A, FIG. 7B, FIG. 7C, FIG. 8, FIG. 9, FIG. 10, FIG. 11, FIG. 12, FIG. 13, and FIG. 14:

1) Crumplable-seatbeltable-rampable-leggable-top-panel system 101 is made of the combined materials of its components.
2) Handle and handle hooks 102a and 102B each are made of plastic material.
3) Crumplable-seatbeltable-rampable-leggable top panel 103a each are made of metallic material.
   Bottom, left, right, front, and rear panels 103b, 103c, 103d, 103e, and 103f each are made of metallic material.
4) Removable multi-function roof-ramp-balcony-awning-partition mezzanine 104 is made of metallic material.
5) Panel-coupling clips 105 each are made of metallic material.
6) Panel-folding clamp 106a is made of metallic material. Tray-locking clamp 106b is made of metallic material.
7) Urine-waste-catching tray 107 is made of metallic material.
8) Top quick-panel-locking-and-releasing stopper-and-hook systems 108 each are made of the combined materials of its components.
9) Top quick-panel-locking-and-releasing arms 109 each are made of plastic or metallic material.
10) Top quick-panel-locking-and-releasing stoppers 110 each are made of plastic or metallic material.
11) Top quick-panel-locking-and-releasing hooks 111 each are made of plastic or metallic material.
12) Side quick-panel-locking-and-releasing stopper-and-hook systems 112 each are made of the combined materials of its components.
13) Side quick-panel-locking-and-releasing arms 113 each are made of plastic or metallic material.
14) Side quick-panel-locking-and-releasing stoppers 114 each are made of plastic or metallic material.
15) Side quick-panel-locking-and-releasing hooks 115 each are made of plastic or metallic material.
16) Removable multi-function double-clip-and-ring-hook systems 116 each are made of the combined materials of its components.
17) Removable crumple-zone multi-function locking clamps 117 each are made of plastic material.
18) Removable crumple-zone multi-function locking double clips 118 each are made of plastic material.
19) Removable crumple-zone multi-function accessory-hanging ring hook 119 is made of plastic material.
20) Multi-pet multi-entrance door system 120 is made of the combined materials of its components
21) First and second door openings 121a and 121b each are made of metallic material.
22) First and second doors 122a and 122b each are made of empty space.
23) First and second push-rod hinges 123a and 123b each are made of metallic material.
24) First and second push-rod levers 124a and 124b each are made of metallic material.
25) First and second push-rods 125a and 125b each are made of metallic material.
26) First and second push-rod-locking rings 126a and 126b each are made of metallic material.

Shape

Referring to FIG. 1A, FIG. 1B, FIG. 1C, FIG. 1D, FIG. 1E, FIG. 1F, FIG. 1G, FIG. 1H, FIG. 1I, FIG. 1J, FIG. 1K FIG. 1L, FIG. 1M, FIG. 1N, FIG. 1O, FIG. 1P (PRIOR ART), FIG. 1Q, FIG. 2A (PRIOR ART), FIG. 2B, FIG. 2C (PRIOR ART), FIG. 2D, FIG. 3A (PRIOR ART), FIG. 3B, FIG. 3C (PRIOR ART), FIG. 3D (PRIOR ART), FIG. 3E, FIG. 3F, FIG. 3G, FIG. 3H (PRIOR ART), FIG. 3I (PRIOR ART), FIG. 3J, FIG. 3K, FIG. 3L, FIG. 4A, FIG. 4B, FIG. 4C, FIG. 4D, FIG. 4E, FIG. 5, FIG. 6, FIG. 7A, FIG. 7B, FIG. 7C, FIG. 8, FIG. 9, FIG. 10, FIG. 11, FIG. 12, FIG. 13, and FIG. 14:

1) Crumplable-seatbeltable-rampable-leggable-top-panel system 101 is formed into the combined shapes of its components.
2) Handle and handle hooks 102a and 102B each are formed into a C shape.
3) Crumplable-seatbeltable-rampable-leggable top panel 103a each are formed into a ladder-step rectangular shape.
   Bottom, left, right, front, and rear panels 103b, 103c, 103d, 103e, and 103f each are formed into a rectangular shape.
4) Removable multi-function roof-ramp-balcony-awning-partition mezzanine 104 is formed into a rectangular shape.
5) Panel-coupling clips 105 each are formed into a C shape.
6) Panel-folding clamp 106a is formed into a C shape. Tray-locking clamp 106b is formed into a J shape.
7) Urine-waste-catching tray 107 is formed into a rectangular shape.
8) Top quick-panel-locking-and-releasing stopper-and-hook systems 108 each are formed into the combined shapes of its components.
9) Top quick-panel-locking-and-releasing arms 109 each are formed into a two-parallel-I shape.
10) Top quick-panel-locking-and-releasing stoppers 110 each are formed into a two-parallel-C shape.
11) Top quick-panel-locking-and-releasing hooks 111 each are formed into a two-parallel-C shape.
12) Side quick-panel-locking-and-releasing stopper-and-hook systems 112 each are formed into the combined shapes of its components.
13) Side quick-panel-locking-and-releasing arms 113 each are formed into a two-parallel-I shape.
14) Side quick-panel-locking-and-releasing stoppers 114 each are formed into a two-parallel-C shape.
15) Side quick-panel-locking-and-releasing hooks 115 each are formed into a two-parallel-C shape.
16) Removable multi-function double-clip-and-ring-hook systems 116 each are formed into the combined shapes of its components.
17) Removable crumple-zone multi-function locking clamps 117 each are formed into a ring shape.
18) Removable crumple-zone multi-function locking double clips 118 each are formed into a two-tandem-C shape.
19) Removable crumple-zone multi-function accessory-hanging ring hook 119 is formed into a ring shape.
20) Multi-pet multi-entrance door system 120 is formed into the combined shapes of its components.
21) First and second door openings 121a and 121b each are formed into a rectangular shape.
22) First and second doors 122a and 122b each are formed into a rectangular shape.
23) First and second push-rod hinges 123a and 123b each are formed into an O shape.
24) First and second push-rod levers 124a and 124b each are formed into an elongated U shape.
25) First and second push-rods 125a and 125b each are formed into an I shape.
26) First and second push-rod-locking rings 126a and 126b; each are formed into a ring shape.

Connection

Referring to FIG. 1A, FIG. 1B, FIG. 1C, FIG. 1D, FIG. 1E, FIG. 1F, FIG. 1G, FIG. 1H, FIG. 1I, FIG. 1J, FIG. 1K FIG. 1L, FIG. 1M, FIG. 1N, FIG. 1O, FIG. 1P (PRIOR ART), FIG. 1Q, FIG. 2A (PRIOR ART), FIG. 2B, FIG. 2C (PRIOR ART), FIG. 2D, FIG. 3A (PRIOR ART), FIG. 3B, FIG. 3C (PRIOR ART), FIG. 3D (PRIOR ART), FIG. 3E, FIG. 3F, FIG. 3G, FIG. 3H (PRIOR ART), FIG. 3I (PRIOR ART), FIG. 3J, FIG. 3K, FIG. 3L, FIG. 4A, FIG. 4B, FIG. 4C, FIG. 4D, FIG. 4E, FIG. 5, FIG. 6, FIG. 7A, FIG. 7B, FIG. 7C, FIG. 8, FIG. 9, FIG. 10, FIG. 11, FIG. 12, FIG. 13, and FIG. 14:

1) Crumplable-seatbeltable-rampable-leggable-top-panel system 101 has the combined connections of its components.
2) Handle and handle hooks 102a and 102B respectively are molded to each other and hooked on top panel 103a.
3) Crumplable-seatbeltable-rampable-leggable top panel 103a is coupled to left, right, front, and rear panels 103c, 103d, 103e, and/or 103f by removable crumple-zone multi-function locking double clips 118.
    Bottom, left, right, front, and rear panels 103b, 103c, 103d, 103e, and 103f respectively are coupled together by panel-coupling clips 105.
4) Removable multi-function roof-ramp-balcony-awning-partition mezzanine 104 is disposed between and coupled to top, bottom, left, right, front, and/or rear panels 103a, 103b, 103c, 103d, 103e, and 103f.
5) Panel-coupling clips 105 respectively are clamped on bottom, left, right, front, and rear panels 103b, 103c, 103d, 103e, and 103f.
6) Panel-folding clamp 106a is foldably hinged to bottom panel 103b.
    Tray-locking clamp 106b is foldably hinged to bottom panel 103b.
7) Urine-waste-catching tray 107 is disposed on bottom panel 103b.
8) Top quick-panel-locking-and-releasing stopper-and-hook systems 108 each have the combined connections of its components.
9) Top quick-panel-locking-and-releasing arms 109 respectively are welded to top panel 103a.
10) Top quick-panel-locking-and-releasing stoppers 110 respectively are molded to top quick-panel-locking-and-releasing arms 109.
11) Top quick-panel-locking-and-releasing hooks 111 respectively are molded to top quick-panel-locking-and-releasing stoppers 110.
12) Side quick-panel-locking-and-releasing stopper-and-hook systems 112 each have the combined connections of its components.
13) Side quick-panel-locking-and-releasing arms 113 respectively are welded to left and right panels 103c and 103d.
14) Side quick-panel-locking-and-releasing stoppers 114 respectively are molded to side quick-panel-locking-and-releasing hooks 115.
15) Side quick-panel-locking-and-releasing hooks 115 respectively are molded to side quick-panel-locking-and-releasing arms 113.
16) Removable multi-function double-clip-and-ring-hook systems 116 each have the combined connections of its components.
17) Removable crumple-zone multi-function locking clamps 117 respectively are molded to removable crumple-zone multi-function locking double clips 118.
18) Removable crumple-zone multi-function locking double clips 118 respectively are molded to removable crumple-zone multi-function locking clamps 117.
19) Removable crumple-zone multi-function accessory-hanging ring hook 119 is molded to removable crumple-zone multi-function locking clamps 117.
20) Multi-pet multi-entrance door system 120 has the combined connections of its components.
21) First and second multi-pet door openings 121a and 121b respectively are formed inside left and front panels 103c and 103e.
22) First and second doors 122a and 122b respectively are hinged on left and front panels 103c, and 103e.
23) First and second push-rod hinges 123a and 123b respectively are welded to first and second doors 122a and 122b.
24) First and second push-rod levers 124a and 124b respectively are welded to first and second push-rods 125a and 125b.
25) First and second push-rods 125a and 125b respectively and rotatably are attached to first and second push-rod hinges 123a and 123b.
26) First and second push-rod-locking rings 126a and 126b respectively are welded to left and front panels 103c and 103e.

Function

Figure 29:
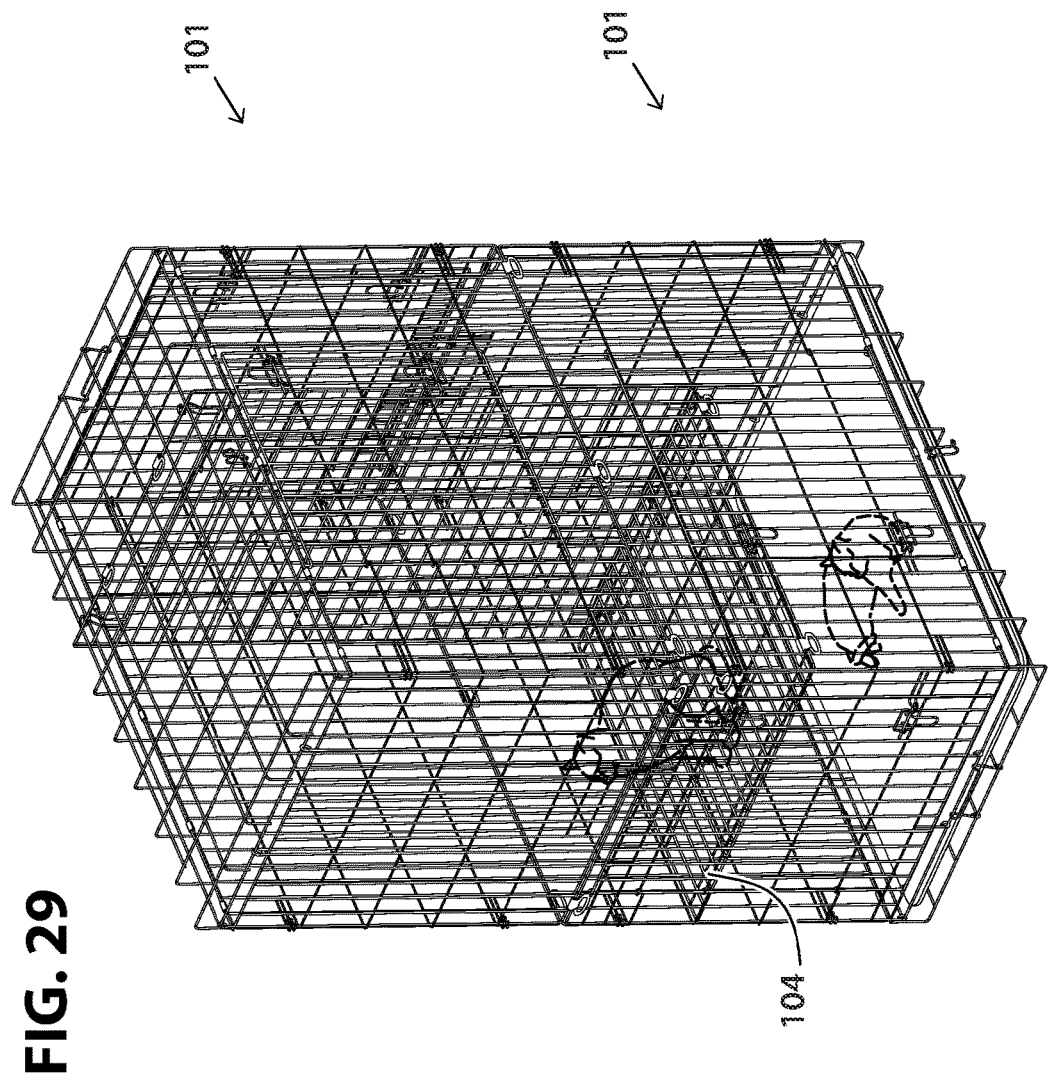
Figure 30:
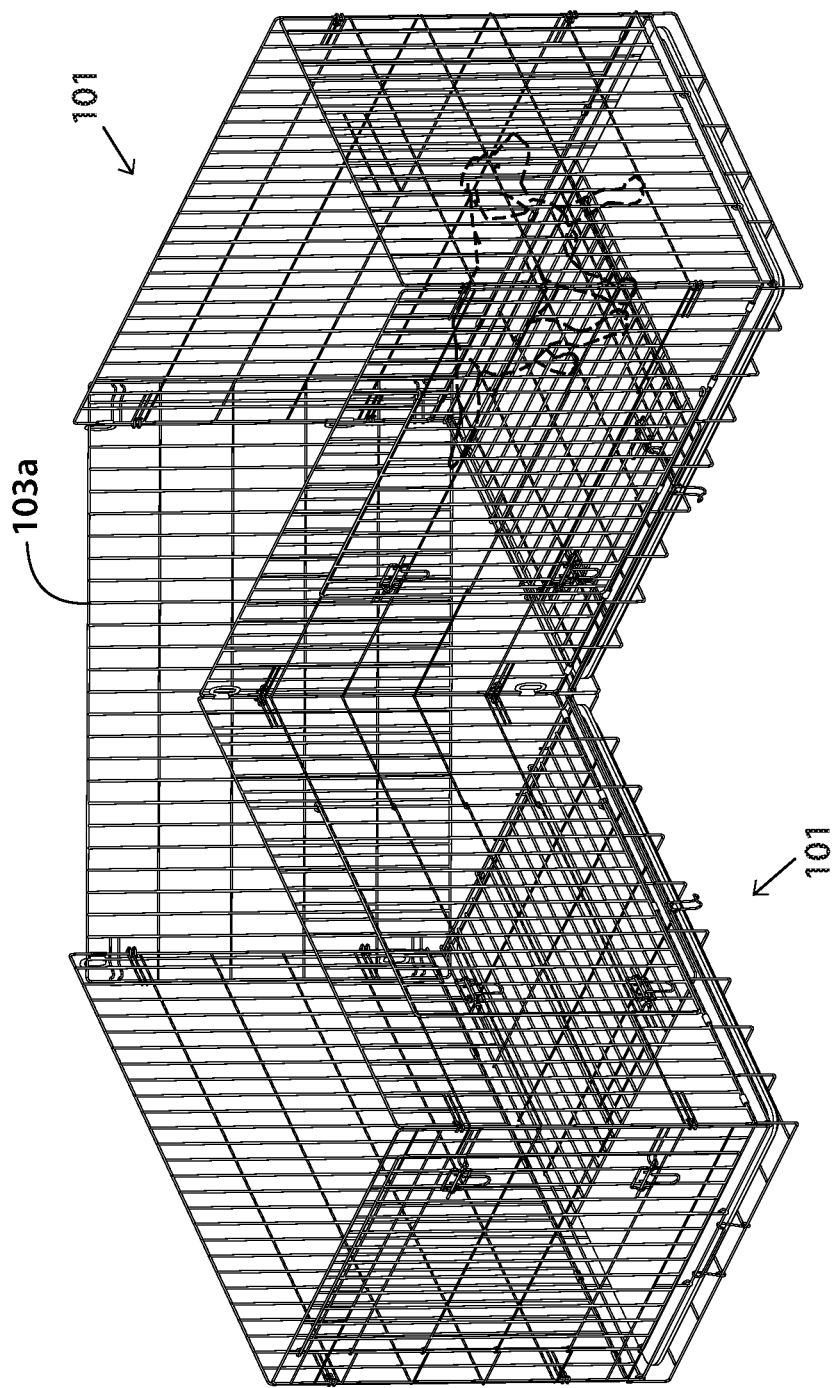

Referring to FIG. 15, FIG. 16, FIG. 17, FIG. 18A, FIG. 18B, FIG. 19A, FIG. 19B, FIG. 19C, FIG. 19D, FIG. 19E, FIG. 19F, FIG. 19G, FIG. 19H, FIG. 19I, FIG. 19J, FIG. 19K, FIG. 19L, FIG. 19M, FIG. 19N, FIG. 19O, FIG. 19P, FIG. 19Q, FIG. 19R, FIG. 19S, FIG. 19T, FIG. 19U, FIG. 19V, FIG. 19W, FIG. 20A, FIG. 20B, FIG. 21A, FIG. 21B, FIG. 21C, FIG. 22, FIG. 23, FIG. 24, FIG. 25, FIG. 26, FIG. 27, FIG. 28, FIG. 29, FIG. 30, FIG. 31, FIG. 32A, FIG. 32B, and FIG. 32C:

1) Crumplable-seatbeltable-rampable-leggable-top-panel system 101 is for performing the combined functions of its components.
2) Handle and handle hooks 102a and 102b respectively are for:
    Being held on to carry the fourteen-device-in-one crumplable-seatbeltable-rampable-leggable-top-panel pet crate, and detachably connecting to crumplable-seatbeltable-rampable-leggable top panel 103a.
3) Crumplable-seatbeltable-rampable-leggable top panel 103a is for:
    a) Functioning as a hanger to hang the pet crate on the latch of an open tailgate of an SUV
        to allow, for example, pool or river water to drip down from pets to dry the pets
        (see FIG. 1D and FIG. 19P);
    b) Functioning as an arm to attach the pet crate to the top edge of a closed tailgate of an SUV
        to allow, for example, pool or river water to drip down from pets to dry the pets
        (see FIG. 1E and FIG. 19Q);
    c) Functioning as a lid to hook the pet crate on the latch of an engine hood of an SUV
        to allow, for example, pool or river water to drip down from pets to dry the pets
        (see FIG. 1F and FIG. 19R);
    d) Functioning as a convertor to clamp the pet crate to the top edge of an open door of an SUV
        to allow, for example, pool or river water to drip down from pets to dry the pets
        (see FIG. 1G and FIG. 19S);

e) Functioning as a car-seat fastener (by inserting a seatbelt through handle 102*a* on top panel 103*a* of the pet crate and securing top panel 103*a* to left panel 103*c* of the pet crate,
   to fasten the pet crate to the car seat.
   (see FIG. 1H and FIG. 19T);
f) Functioning as a spike (by parallelly securing top panel 103*a* to bottom panel 103*b* of the pet crate)
   to dig into a slanted sandy or soil beach or
   to dig into a slanted carpeted floor of an RV going downhill
   to prevent the pet crate from sliding downwards
   (See FIG. 1I, FIG. 1J, FIG. 19U, and FIG. 19V);
g) Functioning as a leg (by vertically securing top panel 103*a* to bottom panel 103*b* of the pet crate)
   to support bottom panel 103*b* of the pet crate
   (See FIG. 1K and FIG. 19W);
h) Functioning as a ladder (by angledly securing top panel 103*a* to the pet crate)
   to allow a pet to walk up to or to walk down from the back of an SUV
   (See FIG. 1M, FIG. 1N, FIG. 1O, FIG. 19H, FIG. 19I, and FIG. 19J);
i) Functioning as a ramp (by angledly securing top panel 103*a* to the latch of an SUV)
   to allow a pet to walk up to or to walk down from the back of an SUV
   (See FIG. 1M, FIG. 1N, FIG. 1O, FIG. 19H, FIG. 19I, and FIG. 19J);
j) Being quickly and easily removed and stored inside a urine-waste-catching tray
   to reduce 30% of the thickness of NON-removable-top-panel pet crate when the removable-top-panel pet crate is folded,
   to reduce 30% of the space needed in each shipping container,
   to reduce significantly the shipping cost of the pet crate
   (FIG. 1P (PRIOR ART illustrates a fixed top panel)
   (FIG. 1Q illustrates removable top panel 103*a* stored in tray 107)
   (FIG. 2A (PRIOR ART) illustrates a larger thickness 97 of the pet crate)
   (FIG. 2B illustrates a smaller thickness 98 of the new pet crate with removable top panel 103*a* stored in tray 107)
   (FIG. 2C (PRIOR ART) illustrates a larger thickness 97 of the pet crate)
   (FIG. 2D illustrates a smaller thickness 98 of the new pet crate with removable top panel 103*a* stored in tray 107)
   (FIG. 3A (PRIOR ART) illustrates a shipping container 99*a* has 100 pet crates 99*b* filling up all its internal volume 99*c*)
   (FIG. 3B illustrates a shipping container 100*a* has 100 pet crates 100*b* filling up only 70% of its internal volume 100*c* and saving 30% of its internal volume 100*d*)
   (For example:
   In order to fold a prior-art crate, its top panel and its front and rear panels have to be bent up respectively in the directions of arrows 127 and 128
   (see FIG. 3C), and
   have to be folded atop one another.
   In contrast, the top panel of the current invention can simply be snapped off and stored inside the tray at the bottom of the crate
   (see FIG. 2B);
k) Being used as an anchor when attached to a seat, headrest or ceiling of an automobile
   to provide immobilization of the pet crate while traveling
   (FIG. 4E illustrates removable top panel 103*a* anchored to a headrest immobilizing the pet crate from moving during travel)
   (see FIG. 19A, FIG. 19B, FIG. 19C, FIG. 19D, FIG. 19E, FIG. 19F, and FIG. 19G);
l) Being a crumple zone when attached to a seat or headrest to provide safety to pets in the event of a crash in the direction of arrows 129*a* and 129*b*
   (see FIG. 19K, FIG. 19 L, FIG. 19M, and FIG. 19N);
m) Being quickly and easily detached from the pet crate
   to convert the fully enclosed pet crate into an open-top pet playpen
   (see FIG. 15, FIG. 16, FIG. 17, FIG. 18A, FIG. 18B, FIG. 21A, FIG. 21B, FIG. 21C, FIG. 22, FIG. 23, FIG. 24, FIG. 25, FIG. 26, FIG. 27, FIG. 28, FIG. 29, FIG. 30, FIG. 31, FIG. 32A illustrating multiple new pet crates right side up, and FIG. 32B and FIG. 32C illustrating multiple new pet crates upside down);
n) Being quickly and easily removed
   to create one or multiple pet playpens or pet runs
   (see FIG. 15, FIG. 16, FIG. 17, FIG. 18A, FIG. 18B, FIG. 21A, FIG. 21B, FIG. 21C, FIG. 22, FIG. 23, FIG. 24, FIG. 25, FIG. 26, FIG. 27, FIG. 28, FIG. 29, FIG. 30, FIG. 31, FIG. 32A illustrating multiple new pet crates right side up, and FIG. 32B and FIG. 32C illustrating multiple new pet crates upside down);
o) Being quickly and easily secured in variable positions and orientations, respectively, by using removable crumple-zone multi-function locking double clips 118,
   to allow top panel 103*a* to function as:
   a roof,
   a ramp,
   a balcony,
   an awning, and
   a partition
   (see FIG. 22, FIG. 23, FIG. 24, FIG. 25, FIG. 26, FIG. 27, FIG. 28, FIG. 29);
p) Being quickly and easily removed to create an open-top crate,
   to make it easily accessible for pets,
   to create a non-confining environment for pets,
   to create headroom for a tall pet,
   to create a way for pets to climb out of the pet crate, or
   to jump out on adjacent playing or resting ramp, balcony, and patio,
   to create multiple different configurations of pet runs,
   to allow pets to sit, stand, play, rest, sleep, and climb upon
   (see FIG. 15, FIG. 16, FIG. 17, FIG. 18A, FIG. 18B, FIG. 21A, FIG. 21B, FIG. 21C, FIG. 22, FIG. 23, FIG. 24, FIG. 25, FIG. 26, FIG. 27, FIG. 28, FIG. 29, FIG. 30, FIG. 31, FIG. 32A illustrating multiple new pet crates right side up, and FIG. 32B and FIG. 32C illustrating multiple new pet crates upside down);
q) Functioning as a suspended top panel at different elevations
   (see FIG. 23, FIG. 24, FIG. 25, FIG. 26, FIG. 27, FIG. 28, and FIG. 29);
r) Functioning as a multi-pet divider and partition,
   to accommodate two or more pets in side-by-side compartments;

s) Being quickly and easily secured angledly in conjunction with a removable multi-function roof-ramp-balcony-awning-partition mezzanine 104
   to allow top panel 103a to function as multiple adjustable-depth pet toy storages 129c
   (see FIG. 24);
t) Being quickly and easily secured
   to allow top panel 103a to function as a vertically-adjustable-height ceiling;
u) Functioning as a multi-story floor
   to accommodate two or more pets in separate compartments stacked vertically
   (see FIG. 29);
v) Functioning as an angled ceiling-divider,
   to separate multiple pets, within crumplable-seatbeltable-rampable-leggable top panel 103a, and/or in conjunction with removable multi-function roof-ramp-balcony-awning-partition mezzanine 104;
w) Functioning as a wall or bridge between multiple pet crates,
   to provide a dry, above-ground walking surface for pets
   (see FIG. 29, FIG. 30, FIG. 31, FIG. 32A illustrating multiple new pet crates right side up, and FIG. 32B and FIG. 32C illustrating multiple new pet crates upside down); and
x) Allowing the pet crate to function as a partial enclosure, with removable multi-function roof-ramp-balcony-awning-partition mezzanine 104 connected vertically inside the pet crate
   to provide separate spaces for multiple pets, one space fully enclosed and the other with an open top
   (see FIG. 29).

Bottom, left, right, front, and rear panels 103b, 103c, 103d, 103e, and 103f respectively are for:
   Functioning as walls and a floor,
      to create a mobile pet enclosure.

4) Removable multi-function roof-ramp-balcony-awning-partition mezzanine 104 is for:
   a) Creating multiple pet-containing compartments,
      to accommodate two or more pets
      (see FIG. 15, FIG. 16, FIG. 17, FIG. 23, FIG. 24, FIG. 25, FIG. 26, FIG. 27, FIG. 28, and FIG. 29);
   b) Creating multiple sized pet-containing compartments,
      to accommodate pet growth from puppy to adult stage;
   c) Creating multiple sized pet-containing compartments,
      to accommodate large and small pets simultaneously;
   d) Separating multiple pets,
      to allow multiple pets to sleep, rest and play simultaneously therein
      (For example:
      Pets can climb or jump to different elevations in the directions of arrows 130 and 131
      (see FIG. 21A, FIG. 22, FIG. 23, FIG. 24, and FIG. 25);
   e) Providing vertical separating means within the pet crate,
      to confine multiple pets in independent compartments side by side,
      to function as a partition,
      to function as a divide;
   f) Providing horizontal separating means within the pet crate,
      to confine multiple pets in independent compartments above and below one another;
   g) Providing means to create a horizontal platform within the pet crate,
      to function as a pet mezzanine,
      to function as a pet shelf,
      to function as a pet step,
      to function as a pet floor,
      to function as a pet ceiling;
   h) Providing means to attach to the interior or exterior of the pet crate,
      to function as a pet bridge,
      to function as a pet step,
      to function swingingly as a gate,
      to function as a support to crumplable-seatbeltable-rampable-leggable top panel 103a; and
   i) Providing means to connect between multiple pet crates as an exterior panel,
      to function as a wall, and
      to function as a floor.

5) Panel-coupling clips 105 respectively are for:
   Hingeably coupling bottom, left, right, front, and rear panels 103b, 103c, 103d, 103e, and 103f together.

6) Panel-folding clamp 106a is for:
   Releasably clamping the fourteen-device-in-one crumplable-seatbeltable-rampable-leggable-top-panel pet crate when folded
   to allow convenient storage and transportation.
   Tray-locking clamp 106b is for:
   a) Releasably locking urine-waste-catching tray 107 inside the fourteen-device-in-one crumplable-seatbeltable-rampable-leggable-top-panel pet crate;
      to allow urine-waste-catching tray 1087 to be removed; and
   b) Providing easy access to slide out urine-waste-catching tray 107, to quickly and conveniently clean and sanitize.

7) Urine-waste-catching tray 107 is for:
   a) Catching urine and waste from pets;
   b) Providing a grooming surface when sitting atop crumplable-seatbeltable-rampable-leggable top panel 103a
      to allow pet to stand, sit, or lay on to be groomed upon; and
   c) Providing a receptacle for storage,
      to catch hair, dirt, food, crumbs, urine, and wetness when pets are being groomed, washed, or has an accident.

8) Top quick-panel-locking-and-releasing stopper-and-hook systems 108 each are for performing the combined functions of its components.

9) Top quick-panel-locking-and-releasing arms 109 respectively are for:
   Attaching top quick-panel-locking-and-releasing stoppers 110 and top quick-panel-locking-and-releasing hooks 111 to top panel 103a.

10) Top quick-panel-locking-and-releasing stoppers 110 respectively are for:
   a) Quickly and easily nap-locking front and rear panels 103e and 103f therepast onto top quick-panel-locking-and-releasing hooks 111 while eliminating the needs for forcefully bending upward crumplable-seatbeltable-rampable-leggable top panel 103a
      to eliminate personal injuries
      (See FIGS. 3C (PRIOR ART) and 3E);
   b) Resisting the warping forces exerted on top, bottom, left, right, front, and rear panels 103a, 103b, 103c, 103d, 103e, and 103f of the pet crate;
   c) Resisting the twisting forces exerted on top, bottom, left, right, front, and rear panels 103a, 103b, 103c, 103e, and 103f of the pet crate;
   d) Resisting the bending forces exerted on top, bottom, left, right, front, and rear panels 103a, 103b, 103c, 103d, 103e, and 103f of the pet crate;

e) Resisting the wobbling forces exerted on top, bottom, left, right, front, and rear panels 103a, 103b, 103c, 103d, 103e, and 103f of the pet crate; and f) Resisting the folding forces exerted on top, bottom, left, right, front, and rear panels 103a, 103b, 103c, 103d, 103e, and 103f of the pet crate.

11) Top quick-panel-locking-and-releasing hooks 111 respectively are for:
Securably locking top panel 103a to front and rear panels 103e and 103f.

12) Side quick-panel-locking-and-releasing stopper-and-hook systems 112 each are for performing the combined functions of its components.

13) Side quick-panel-locking-and-releasing arms 113 respectively are for:
Attaching side quick-panel-locking-and-releasing stoppers 114 and side quick-panel-locking-and-releasing hooks 115 to left and right panels 103c and 103d.

14) Side quick-panel-locking-and-releasing stoppers 114 respectively are for:
a) Quickly and easily snap-locking front and rear panels 103e and 103f therepast onto side quick-panel-locking-and-releasing hooks 115 while eliminating the needs for forcefully bending upward crumplable-seat-beltable-rampable-leggable top panel 103a
to eliminate personal injuries
(See FIGS. 3C (PRIOR ART) and 3E);
b) Resisting the warping forces exerted on top, bottom, left, right, front, and rear panels 103a, 103b, 103c, 103d, 103e, and 103f of the pet crate;
c) Resisting the twisting forces exerted on top, bottom, left, right, front, and rear panels 103a, 103b, 103c, 103d, 103e, and 103f of the pet crate;
d) Resisting the bending forces exerted on top, bottom, left, right, front, and rear panels 103a, 103b, 103c, 103d, 103e, and 103f of the pet crate;
e) Resisting the wobbling forces exerted on top, bottom, left, right, front, and rear panels 103a, 103b, 103c, 103d, 103e, and 103f of the pet crate; and
f) Resisting the folding forces exerted on top, bottom, left, right, front, and rear panels 103a, 103b, 103c, 103d, 103e, and 103f of the pet crate.

15) Side quick-panel-locking-and-releasing hooks 115 respectively are for:
Securably locking left and right panels 103c and 103d to front and rear panels 103e and 103f.

16) Removable multi-function double-clip-and-ring-hook systems 116 each are for performing the combined functions of its components.

Figure 19B:
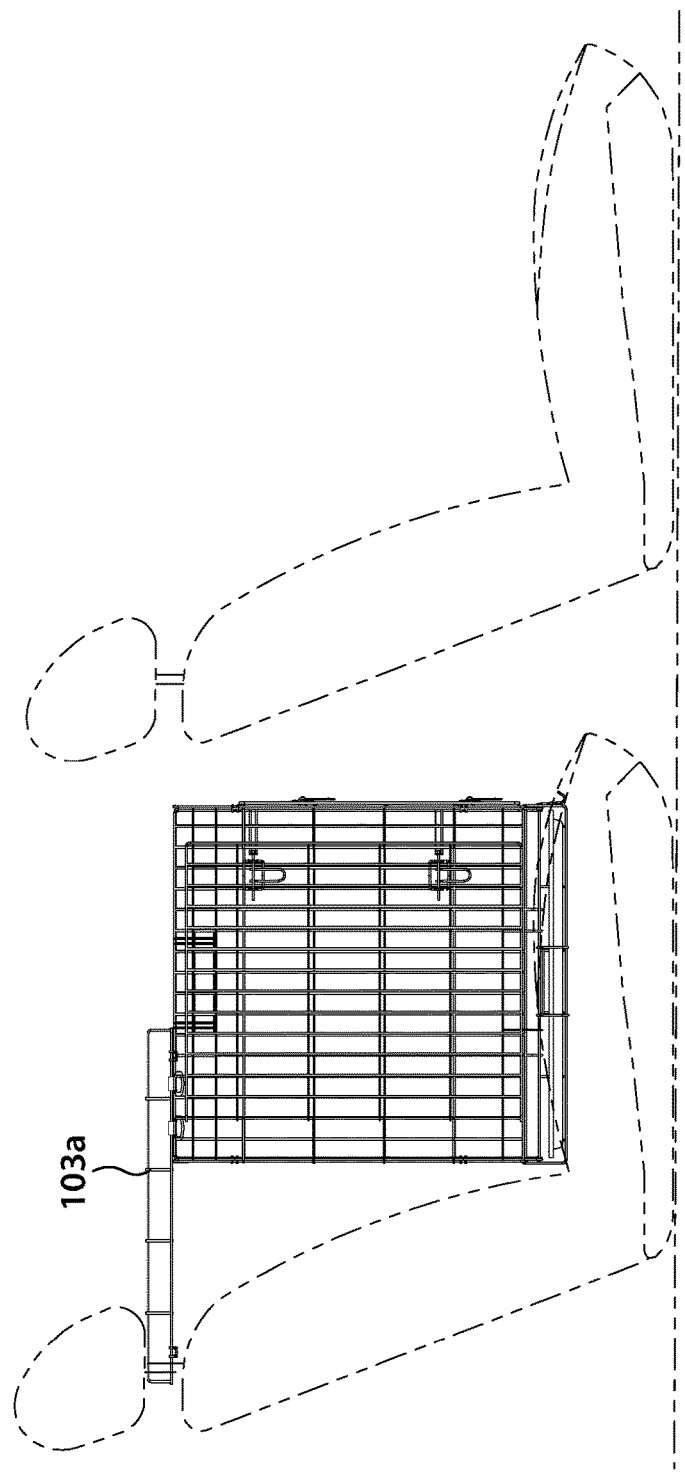
Figure 19C:
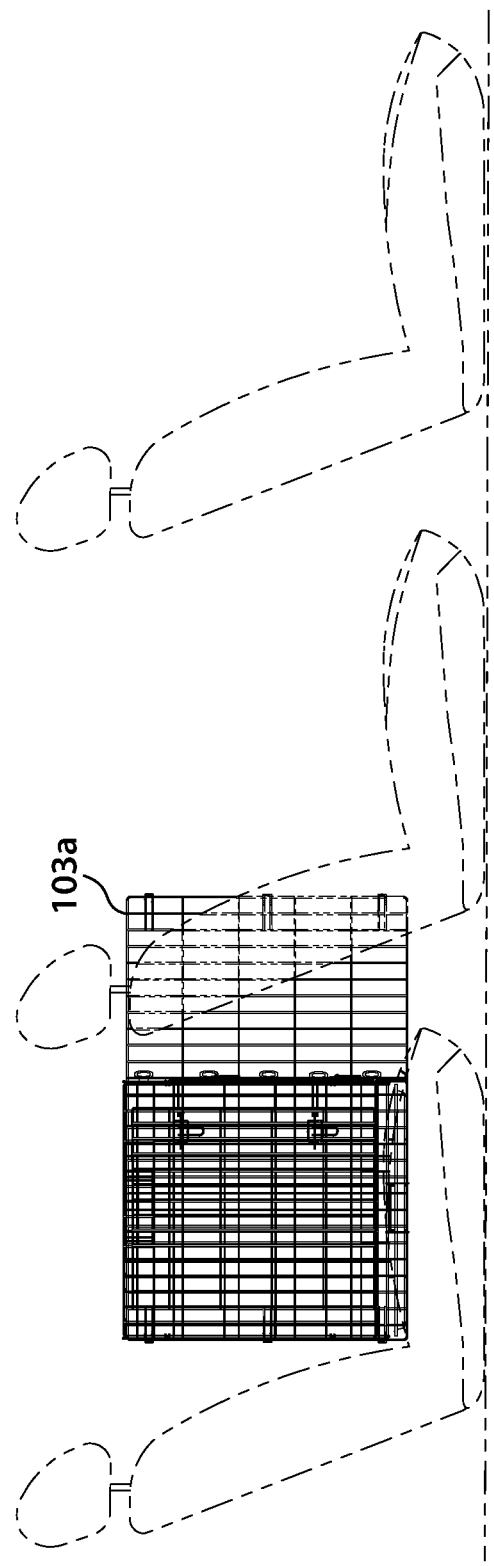
Figure 19D:
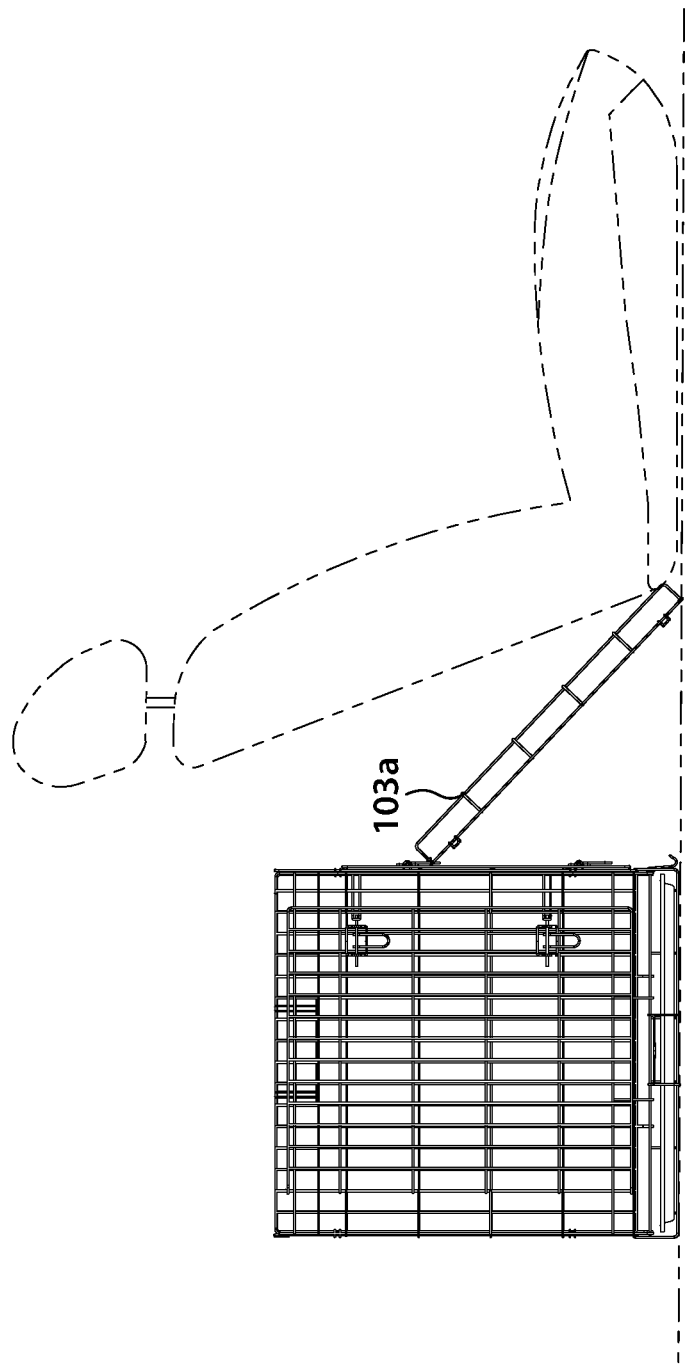
Figure 19E:
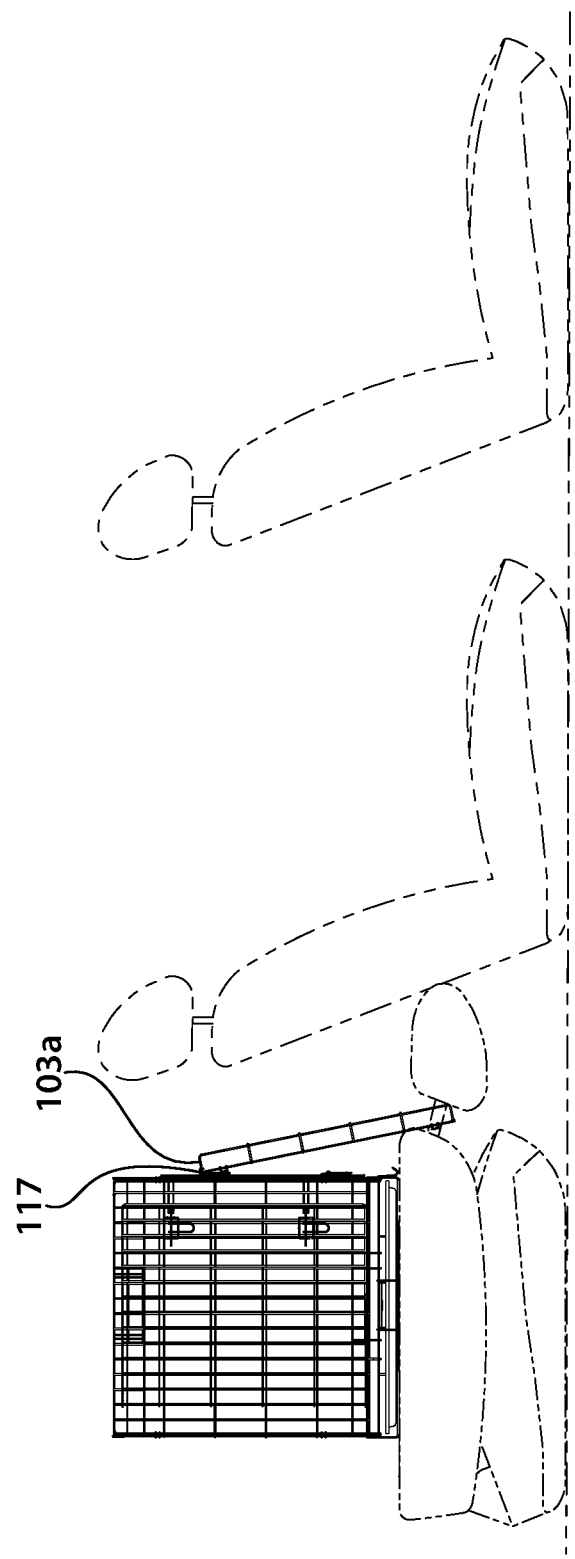
Figure 19H:
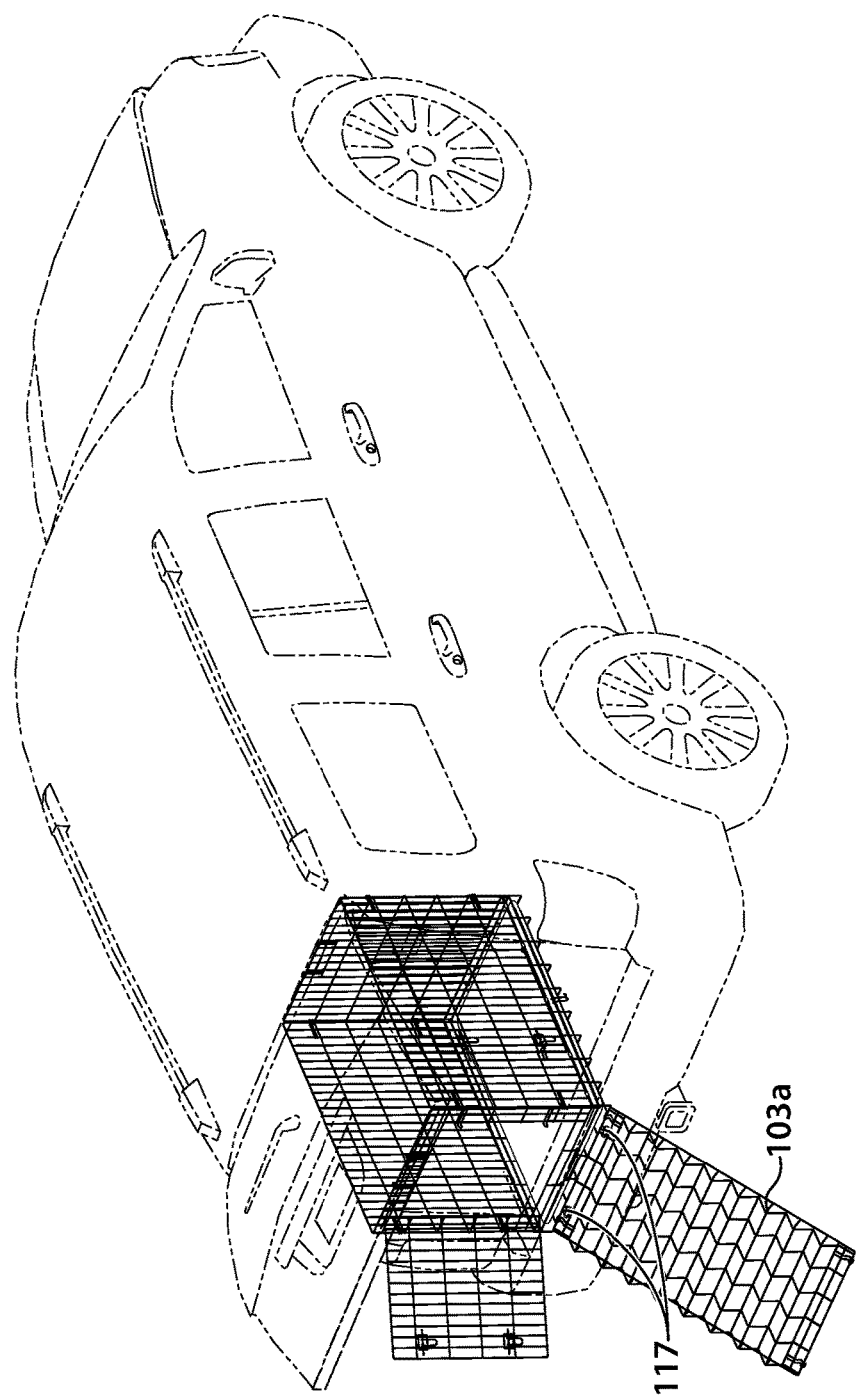
FIG. 19H, illustrates a perspective view of how top panel 103a can be used as a ramp to access the pet crate in the back of an automobile.
Figure 19I:
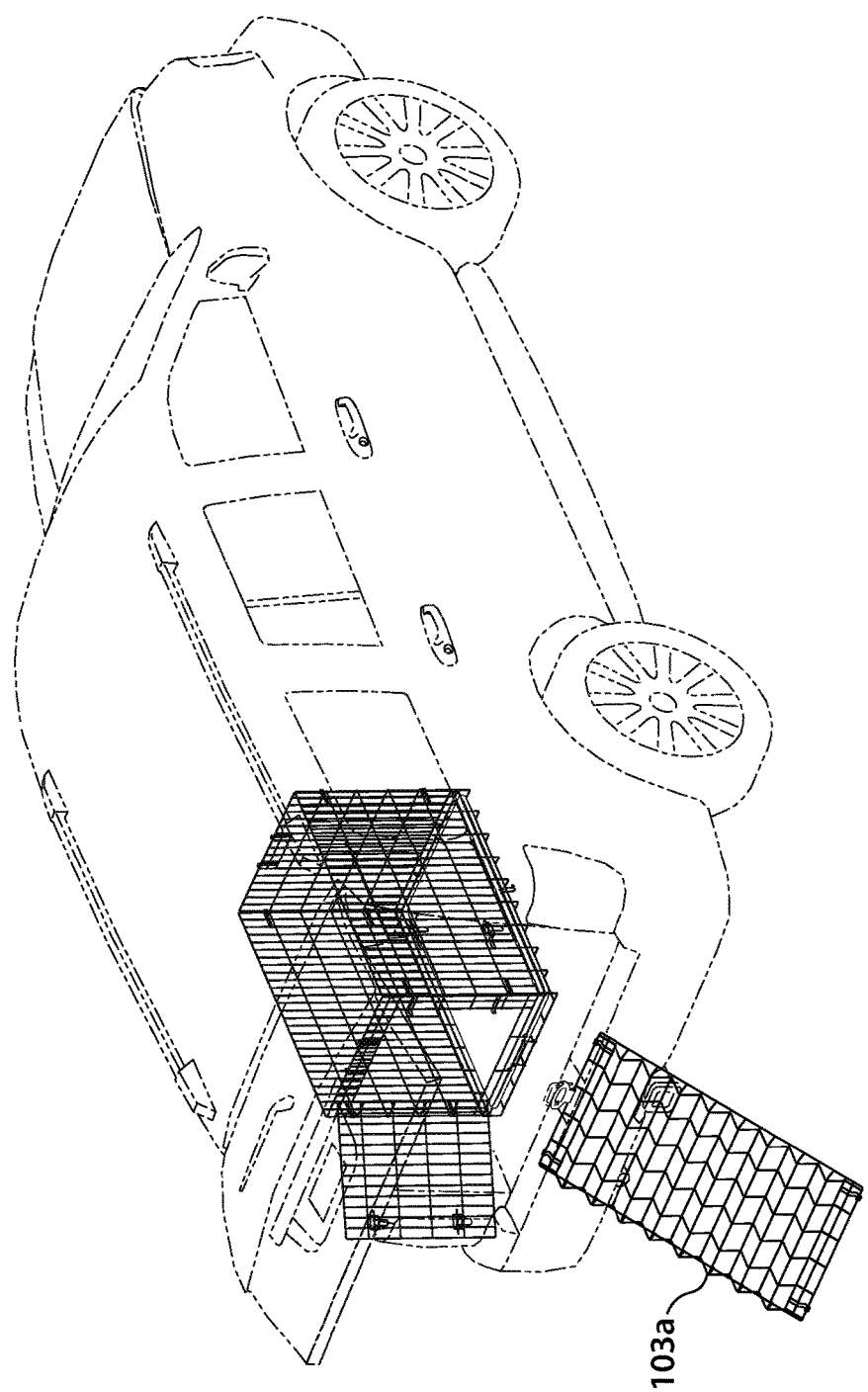
FIG. 19I, and FIG. 19J, illustrate perspective and cross-sectional views of attaching removable multi-purpose locking multi-function clamps 117 to a U-shaped locking hook of the tailgate of an automobile to allow top panel 103a to be used as a ramp to enter and exit the rear compartment of the automobile.
Figure 19J:
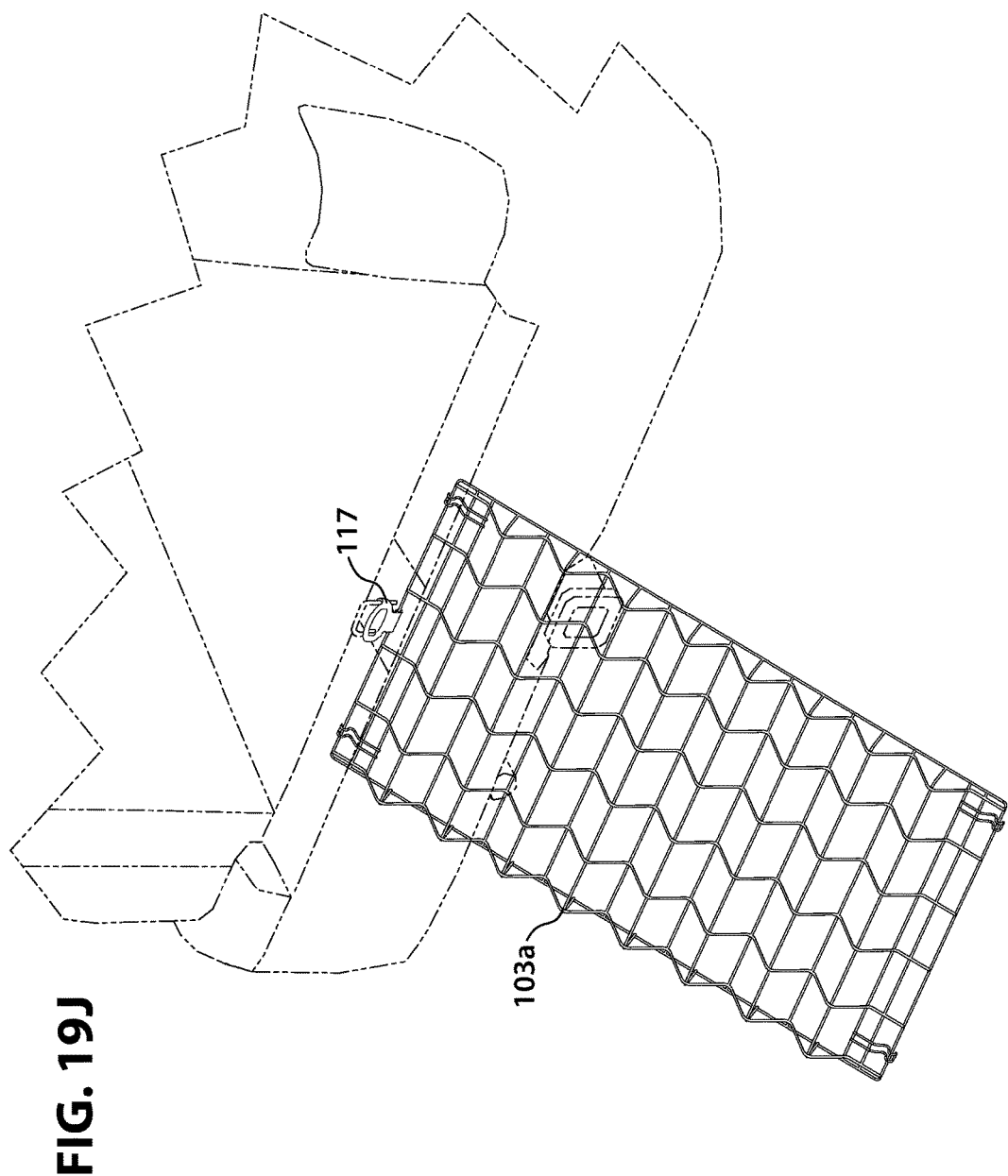

17) Removable crumple-zone multi-function locking clamps 117 respectively are for:
a) Quickly and easily attaching top panel 103a to act as a crumple zone when attached to a seat or headrest
to absorb collision and provide safety to pets in the event of an accident in the direction of arrows 129a and 129b
(see FIG. 19K, FIG. 19 L, FIG. 19M, and FIG. 19N);
b) Holding on to operate removable crumple-zone multi-function locking double clips 118; and
c) Quickly and easily attaching to a U-shaped locking hook of the tailgate of an automobile
to be used as an anchor to allow top panel 103a to be a ramp to enter or exit the rear compartment of the automobile
(see FIG. 19I and FIG. 19J).

Figure 24:
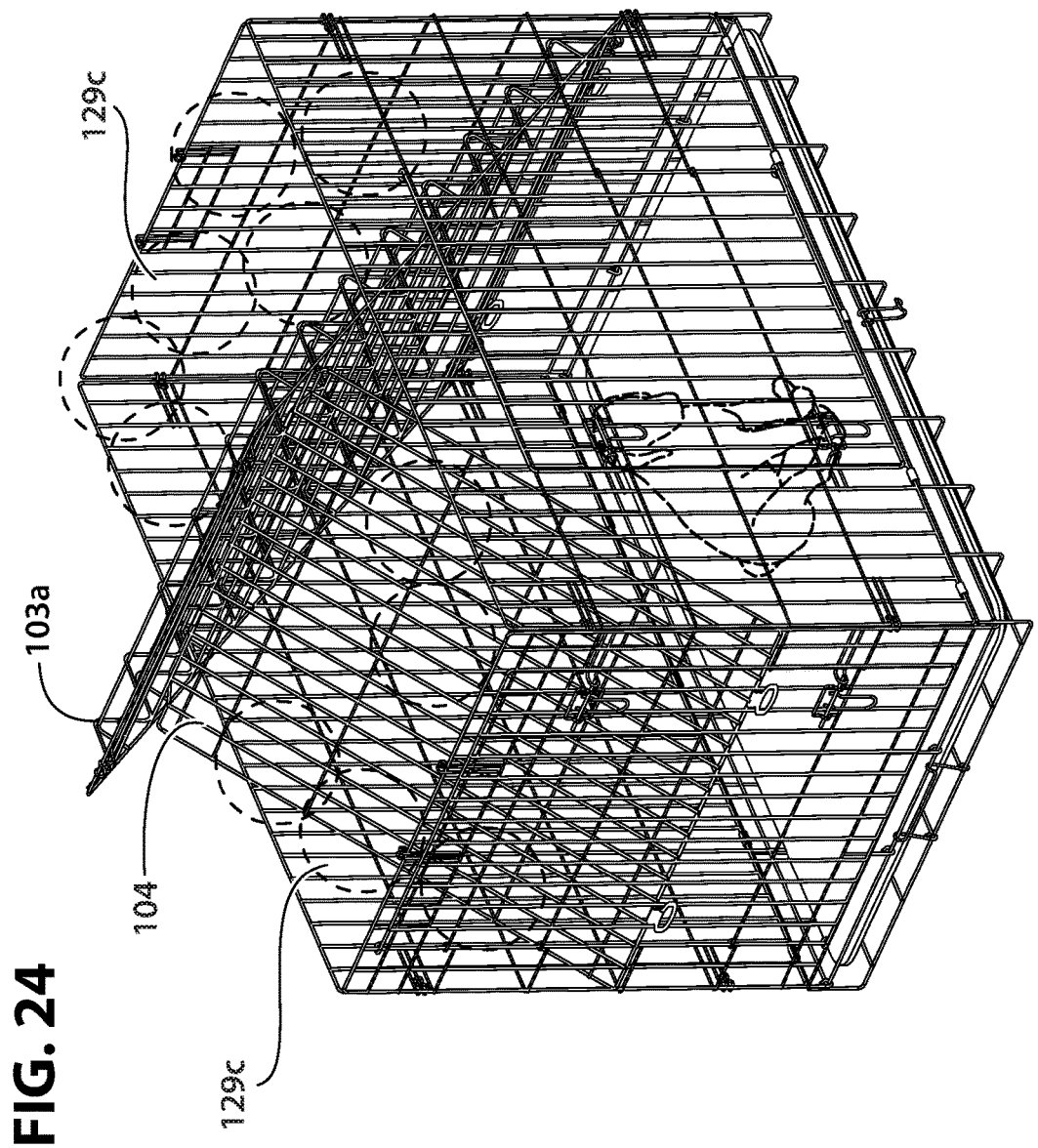
Figure 25:
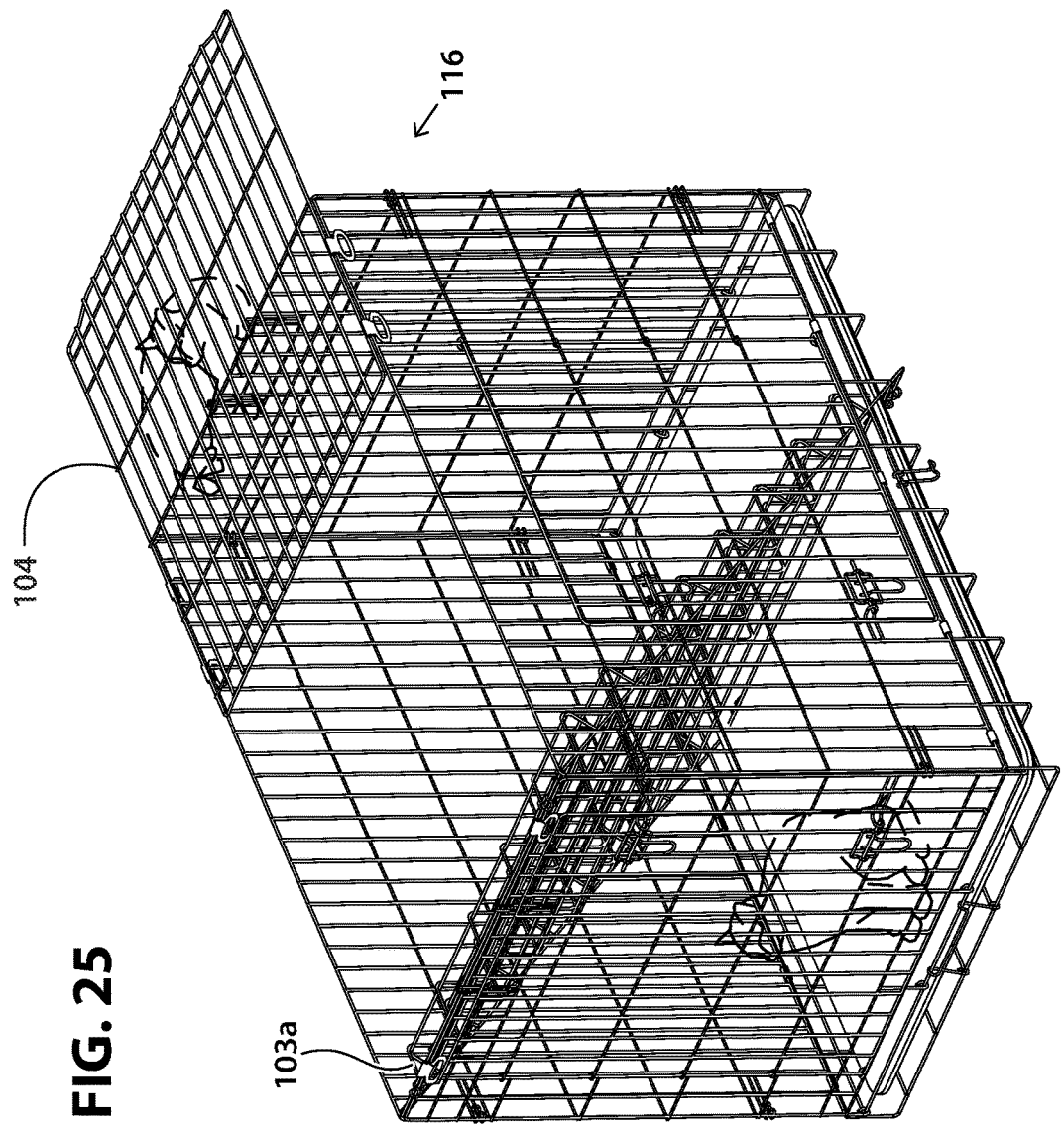
Figure 26:
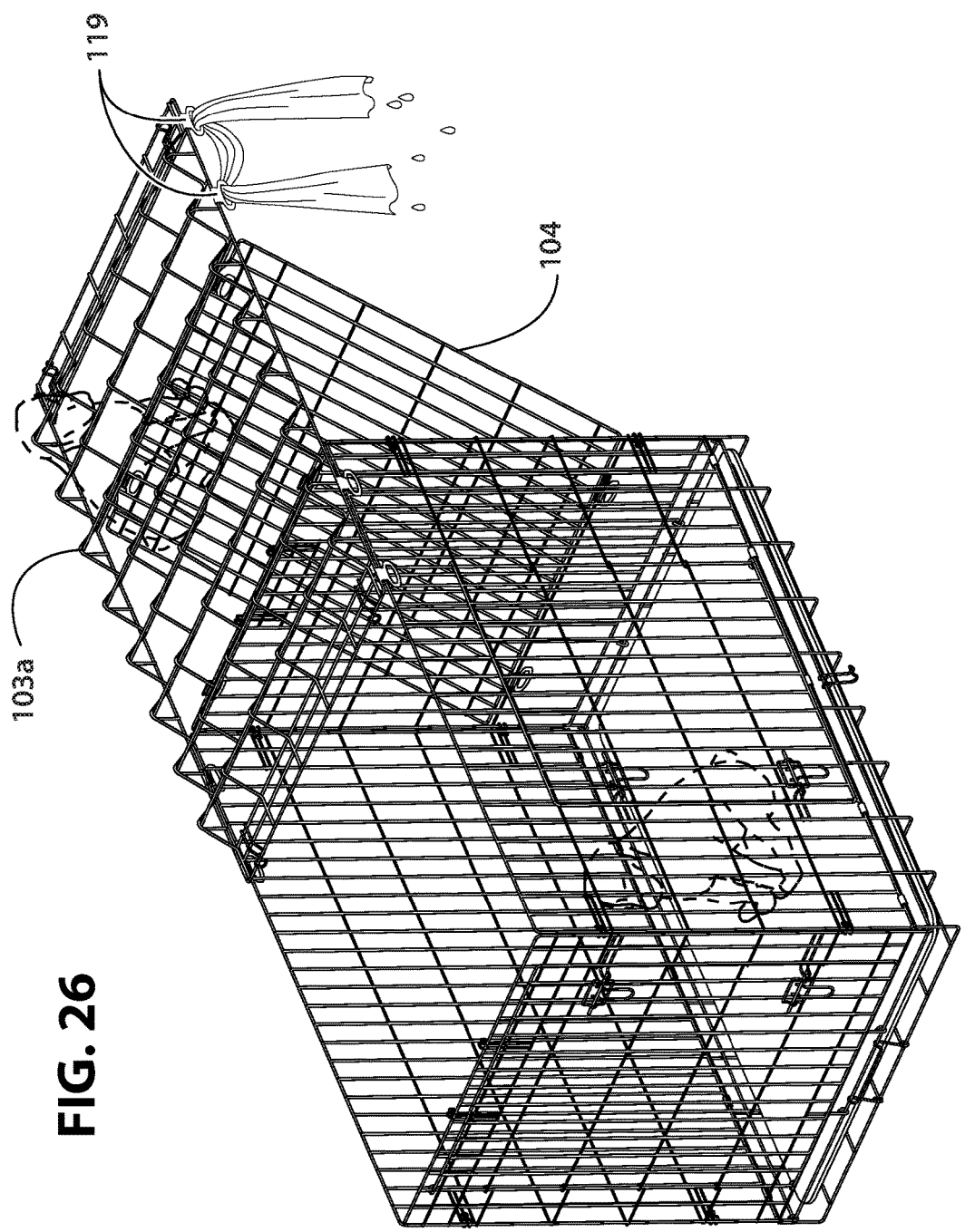
Figure 27:
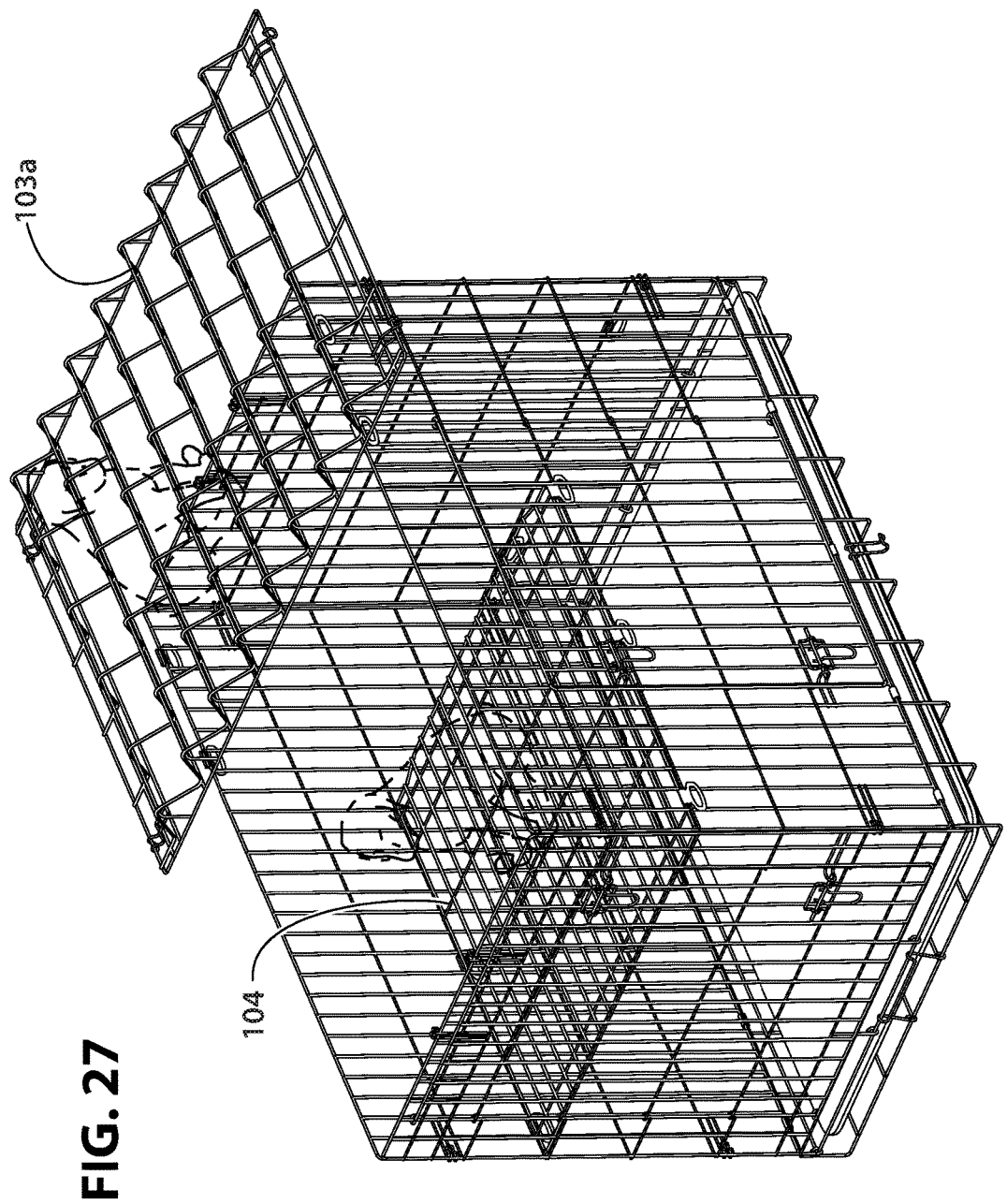
Figure 28:
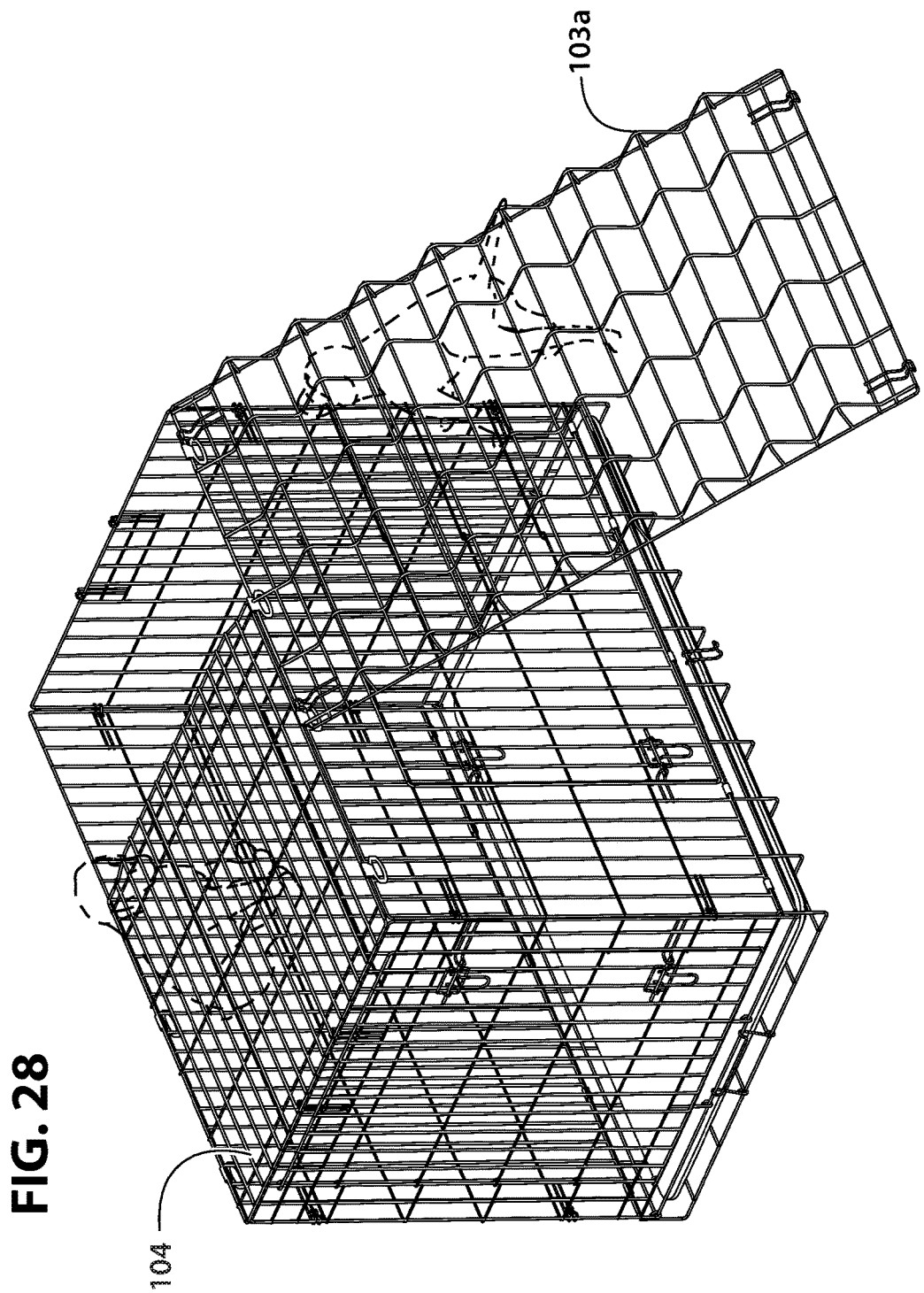

18) Removable crumple-zone multi-function locking double clips 118 respectively are for:
a) Quickly and easily removing and storing top panel 103a inside a urine-waste-catching tray
to reduce 30% of the pet-crate thickness when the pet crate is folded,
to reduce 30% of the space needed in each shipping container,
to reduce significantly the unit cost of the pet crate
(FIG. 1P (PRIOR ART illustrates a fixed top panel)
(FIG. 1Q illustrates removable top panel 103a stored in tray 107)
(FIG. 2A (PRIOR ART) illustrates a larger thickness 97 of the pet crate)
(FIG. 2B illustrates a smaller thickness 98 of the new pet crate with removable top panel 103a stored in tray 107)
(FIG. 2C (PRIOR ART) illustrates a larger thickness 97 of the pet crate)
(FIG. 2D illustrates a smaller thickness 98 of the new pet crate with removable top panel 103a stored in tray 107)
(FIG. 3A (PRIOR ART) illustrates a shipping container 99a has 100 pet crates 99b filling up all its internal volume 99c)
(FIG. 3B illustrates a shipping container 100a has 100 pet crates 100b filling up only 70% of its internal volume 100c and saving 30% of its internal volume 100d)
(For example:
In order to fold a prior-art crate, its top panel and its front and rear panels have to be bent up respectively in the directions of arrows 127 and 128
(see FIG. 3C), and
have to be folded atop one another.
In contrast, the top panel of the current invention can simply be snapped off and stored inside the tray at the bottom of the crate
(see FIG. 2B);
b) Quickly and easily attaching top panel 103a to be used as an anchor when attached to a seat, headrest or ceiling of an automobile
to provide immobilization of the pet crate while traveling
(FIG. 4E illustrates removable top panel 103a anchored to a headrest immobilizing the pet crate from moving during travel)
(see FIG. 19A, FIG. 19B, FIG. 19C, FIG. 19D, FIG. 19E, FIG. 19F, and FIG. 19G);
c) Quickly and easily attaching top panel 103a to act as a crumple zone when attached to a seat or headrest of an automobile
to absorb collision and provide safety to pets in the event of an accident in the direction of arrows 129a and 129b
(see FIG. 19K, FIG. 19 L, FIG. 19M, and FIG. 19N);
d) Quickly and easily detaching top panel 103a from the pet crate
to convert the fully enclosed pet crate into an open-top pet playpen
(see FIG. 15, FIG. 16, FIG. 17, FIG. 18A, FIG. 18B, FIG. 21A, FIG. 21B, FIG. 21C, FIG. 22, FIG. 23, FIG. 24, FIG. 25, FIG. 26, FIG. 27, FIG. 28, FIG. 29, FIG. 30, FIG. 31, FIG. 32A illustrating multiple new pet crates right side up, and FIG. 32B and FIG. 32C illustrating multiple new pet crates upside down);

e) Quickly and easily removing and storing top panel 103*a*
   to create one or multiple pet playpens or pet runs
   (see FIG. 15, FIG. 16, FIG. 17, FIG. 18A, FIG. 18B, FIG. 21A, FIG. 21B, FIG. 21C, FIG. 22, FIG. 23, FIG. 24, FIG. 25, FIG. 26, FIG. 27, FIG. 28, FIG. 29, FIG. 30, FIG. 31, FIG. 32A illustrating multiple new pet crates right side up, and FIG. 32B and FIG. 32C illustrating multiple new pet crates upside down);

f) Quickly and easily securing top panel 103*a* in variable positions and orientations, respectively, by using removable crumple-zone multi-function locking double clips 118,
   to allow top panel 103*a* to function as:
   a roof,
   a ramp,
   a balcony,
   an awning, and
   a partition
   (see FIG. 22, FIG. 23, FIG. 24, FIG. 25, FIG. 26, FIG. 27, FIG. 28, FIG. 29);

g) Quickly and easily removing top panel 103*a* to create an open-top crate,
   to make it easily accessible for pets,
   (see FIG. 8A),
   to create a non-confining environment for pets,
   to create headroom for a tall pet,
   to create a way for pets to climb out of the pet crate, or to jump out on
   adjacent playing or resting ramp, balcony, and patio,
   to create multiple different configurations of pet runs,
   to allow pets to sit, stand, play, rest, sleep, and climb upon
   (see FIG. 15, FIG. 16, FIG. 17, FIG. 18A, FIG. 18B, FIG. 21A, FIG. 21B, FIG. 21C, FIG. 22, FIG. 23, FIG. 24, FIG. 25, FIG. 26, FIG. 27, FIG. 28, FIG. 29, FIG. 30, FIG. 31, FIG. 32A illustrating multiple new pet crates right side up, and FIG. 32B and FIG. 32C illustrating multiple new pet crates upside down);

h) Allowing top panel 103*a* to function as a suspended top panel at different elevations
   (see FIG. 23, FIG. 24, FIG. 25, FIG. 26, FIG. 27, FIG. 28, and FIG. 29);

i) Allowing top panel 103*a* to function as a multi-pet divider and partition, to accommodate two or more pets in side-by-side compartments;

j) Quickly and easily securing top panel 103*a* angledly in conjunction with a removable multi-function roof-ramp-balcony-awning-partition mezzanine 104 to left, right, front, and rear panels 103*b*, 103*c*, 103*d*, 103*e*, and 103*f*
   to allow top panel 103*a* to function adjustable-depth pet toy storages (see FIG. 24);

k) Quickly and easily securing top panel 103*a* to left, right, front, and rear panels 103*b*, 103*c*, 103*d*, 103*e*, and 103*f*
   to allow top panel 103*a* to function as a vertically-adjustable-height ceiling;

l) Allowing top panel 103*a* to function as a multi-story floor
   to accommodate two or more pets in separate compartments stacked vertically
   (see FIG. 29);

m) Allowing top panel 103*a* to function as an angled ceiling-divider,
   to separate multiple pets, within crumplable-seatbeltable-rampable-leggable top panel 103*a*, and/or in conjunction with removable multi-function roof-ramp-balcony-awning-partition mezzanine 104;

n) Allowing top panel 103*a* to function as a bridge between multiple pet crates,
   to provide a dry, above-ground walking surface for pets
   (see FIG. 29, FIG. 30, FIG. 31, FIG. 32A illustrating multiple new pet crates right side up, and FIG. 32B and FIG. 32C illustrating multiple new pet crates upside down);

o) Allowing the pet crate to function as a partial enclosure, with removable multi-function roof-ramp-balcony-awning-partition mezzanine 104 connected vertically inside the pet crate
   to provide separate spaces for multiple pets, one space fully enclosed and
   the other with an open top
   (See FIG. 29);

p) Quickly and easily, at multiple different elevations, attaching crumplable-seatbeltable-rampable-leggable top panel 103*a* to the bottom, left, right, front, and rear panels of the pet crate,
   removing crumplable-seatbeltable-rampable-leggable top panel 103*a* from the bottom, left, right, front, and rear panels of the pet crate
   (See FIGS. 23, 24, 26, and 29);

q) Quickly and easily, at multiple different elevations, attaching removable multi-function roof-ramp-balcony-awning-partition mezzanine 104 to the top, bottom, left, right, front, and rear panels of the pet crate,
   removing removable multi-function roof-ramp-balcony-awning-partition mezzanine 104 from top, bottom, left, right, front, and rear panels of the pet crate;

r) Quickly and easily snapping on the top, bottom, left, right, front, and rear panels of the pet crate
   to reposition crumplable-seatbeltable-rampable-leggable top panel 103*a*,
   to reposition removable multi-function roof-ramp-balcony-awning-partition mezzanine 104 without tool;

s) Quickly and easily connecting crumplable-seatbeltable-rampable-leggable top panel 103*a* and removable multi-function roof-ramp-balcony-awning-partition mezzanine 104 to the interior or exterior of the pet crate,
   to provide means to convert crumplable-seatbeltable-rampable-leggable top panel 103*a* to a partition, divider, patio, bridge, shelf, ramp, auxiliary platform, balcony, porch, floor, toy storage, and angled ceiling divider; and t) Quickly and easily connecting crumplable-seatbeltable-rampable-leggable top panel 103*a* and removable multi-function roof-ramp-balcony-awning-partition mezzanine 104 to the interior or exterior of the pet crate at multiple heights, respectively,
   to provide means to reposition top panel 103*a* and mezzanine 104 at selective vertical levels
   (See FIGS. 26 and 29).

Figure 19K:
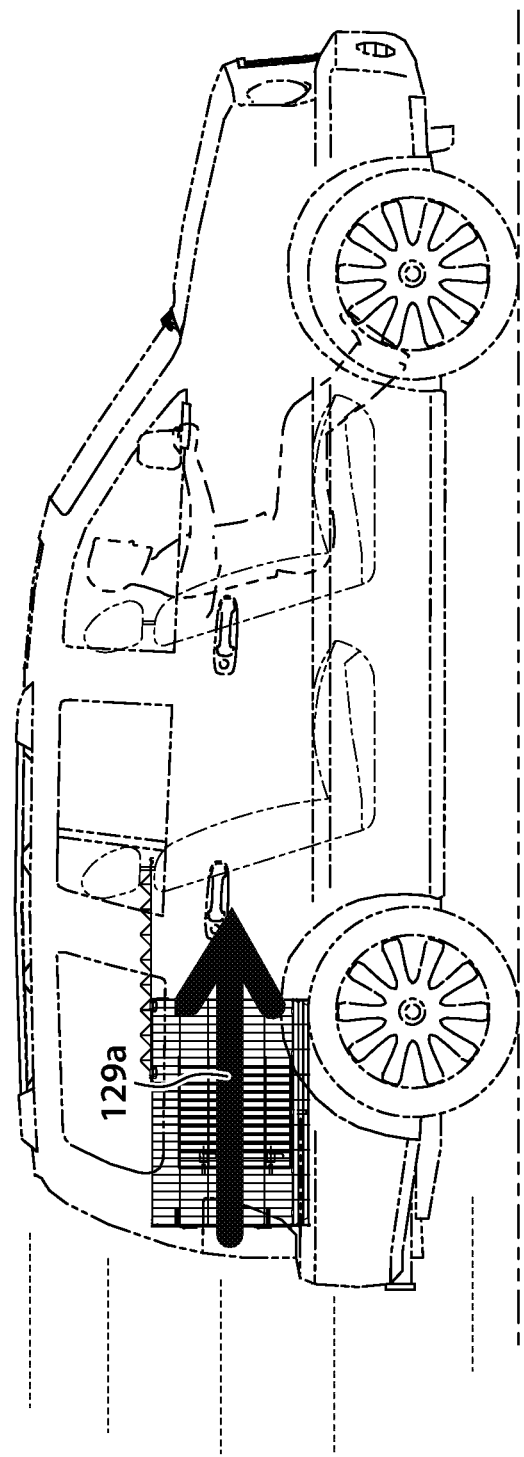
Figure 19L:
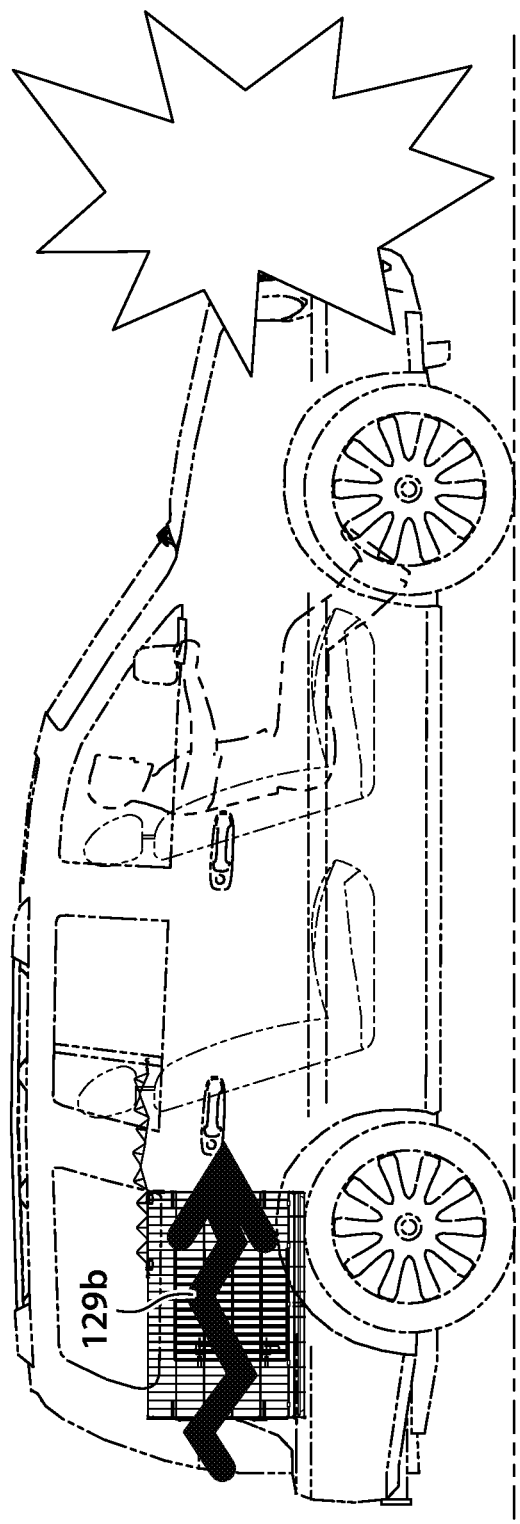
Figure 19O:
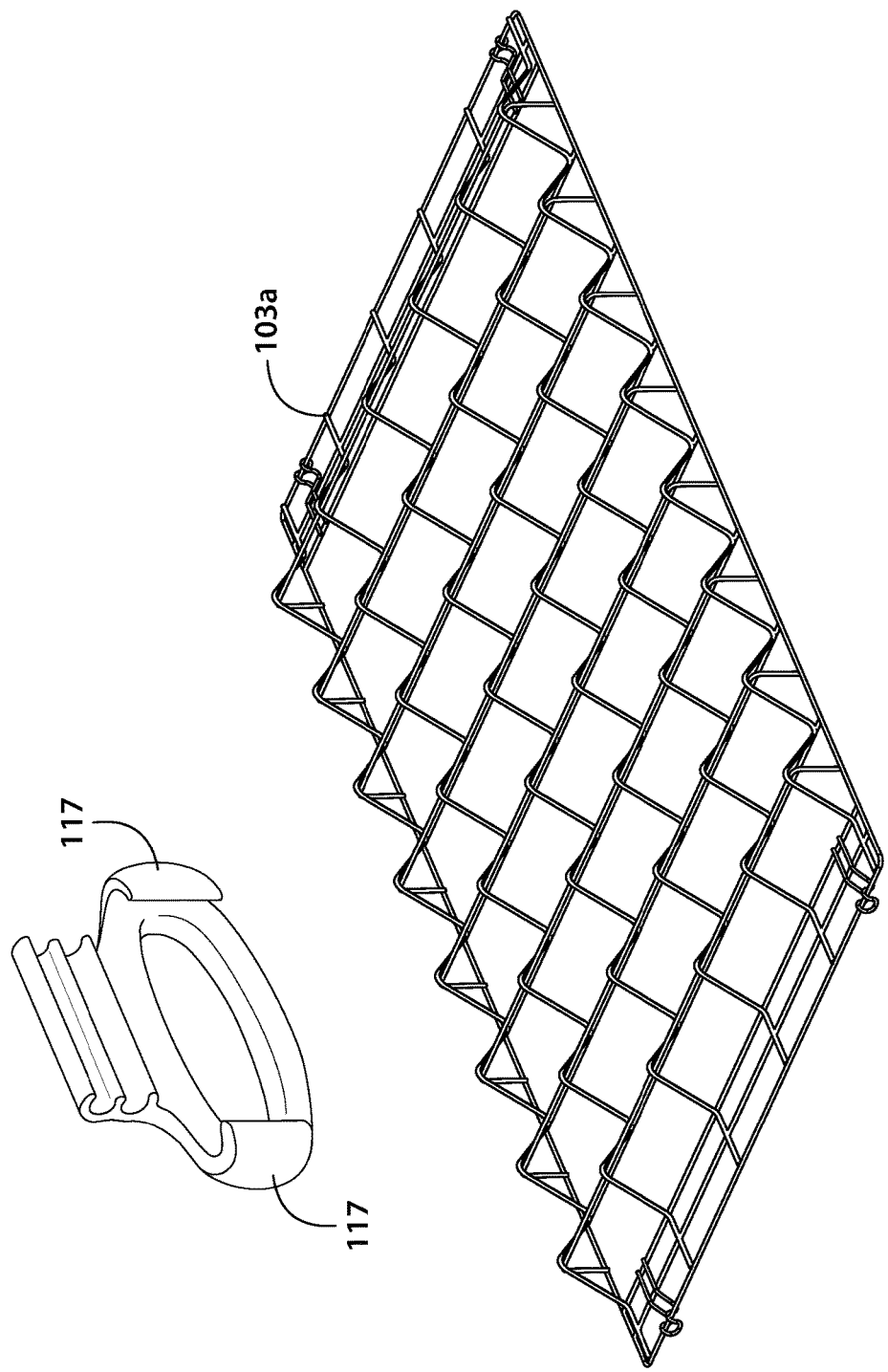
Figure 19P:
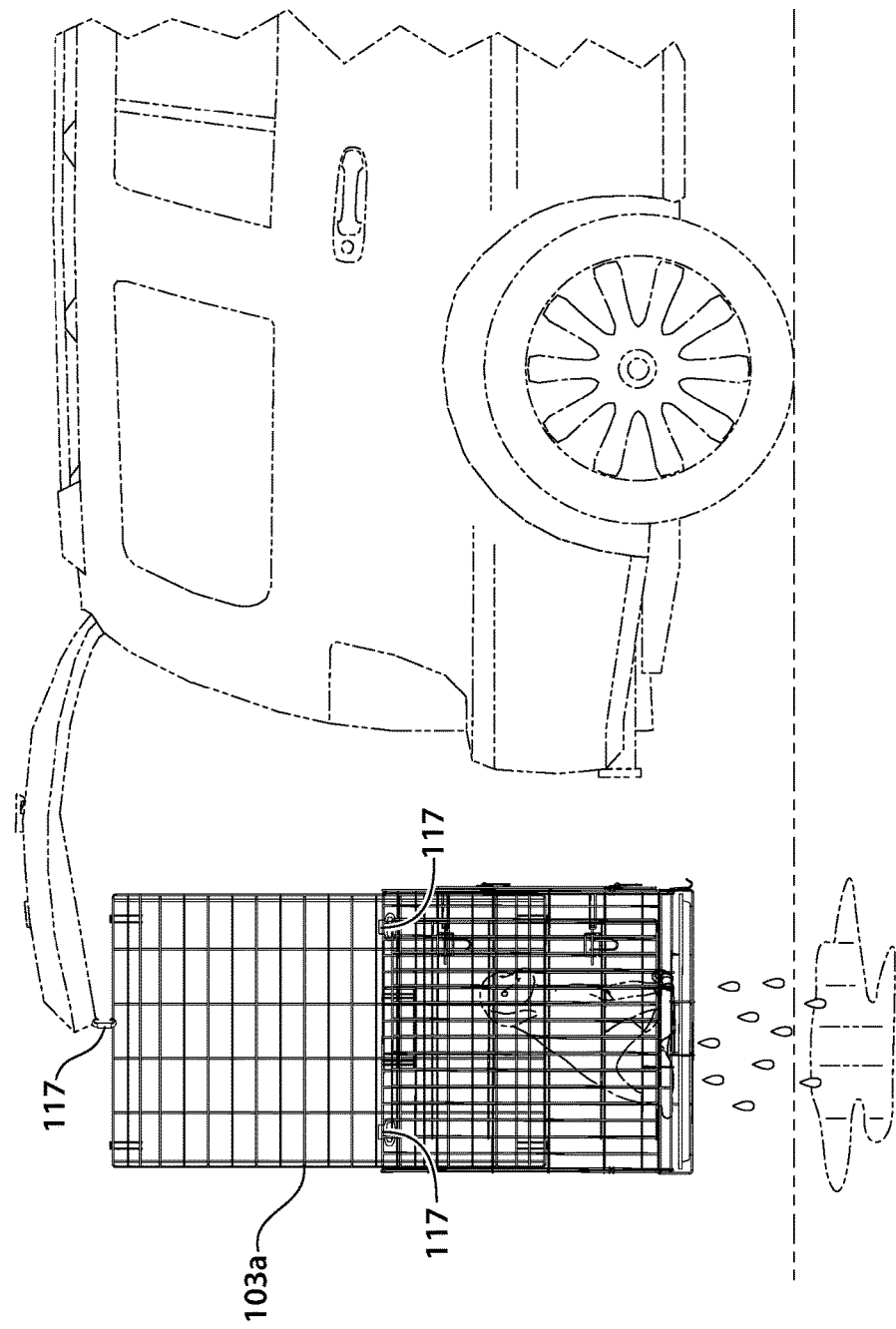
FIG. 19P, FIG. 19Q, FIG. 19R, and FIG. 19S illustrate side views of how crumplable-seatbeltable-rampable-leggable top panel 103a functions as a hanger.
Figure 19Q:
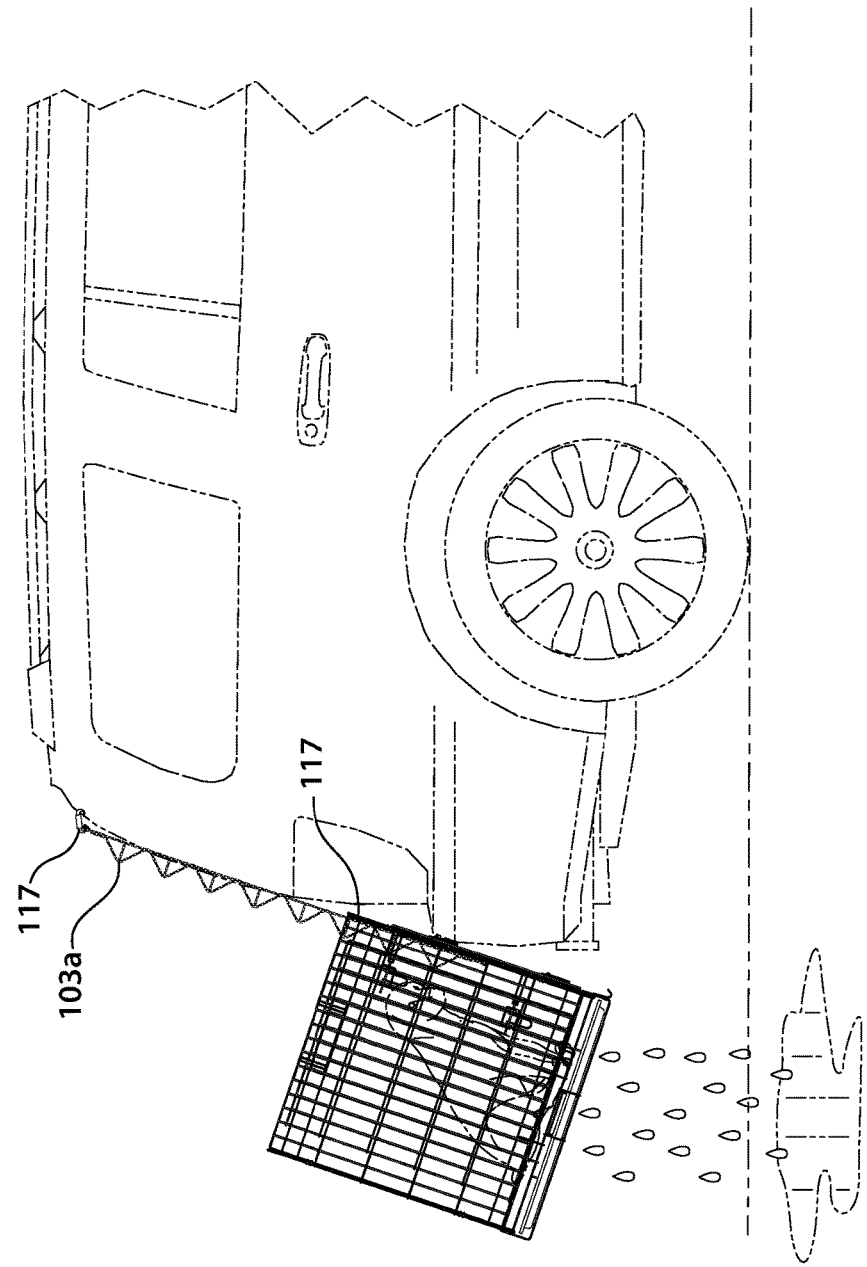
Figure 19R:
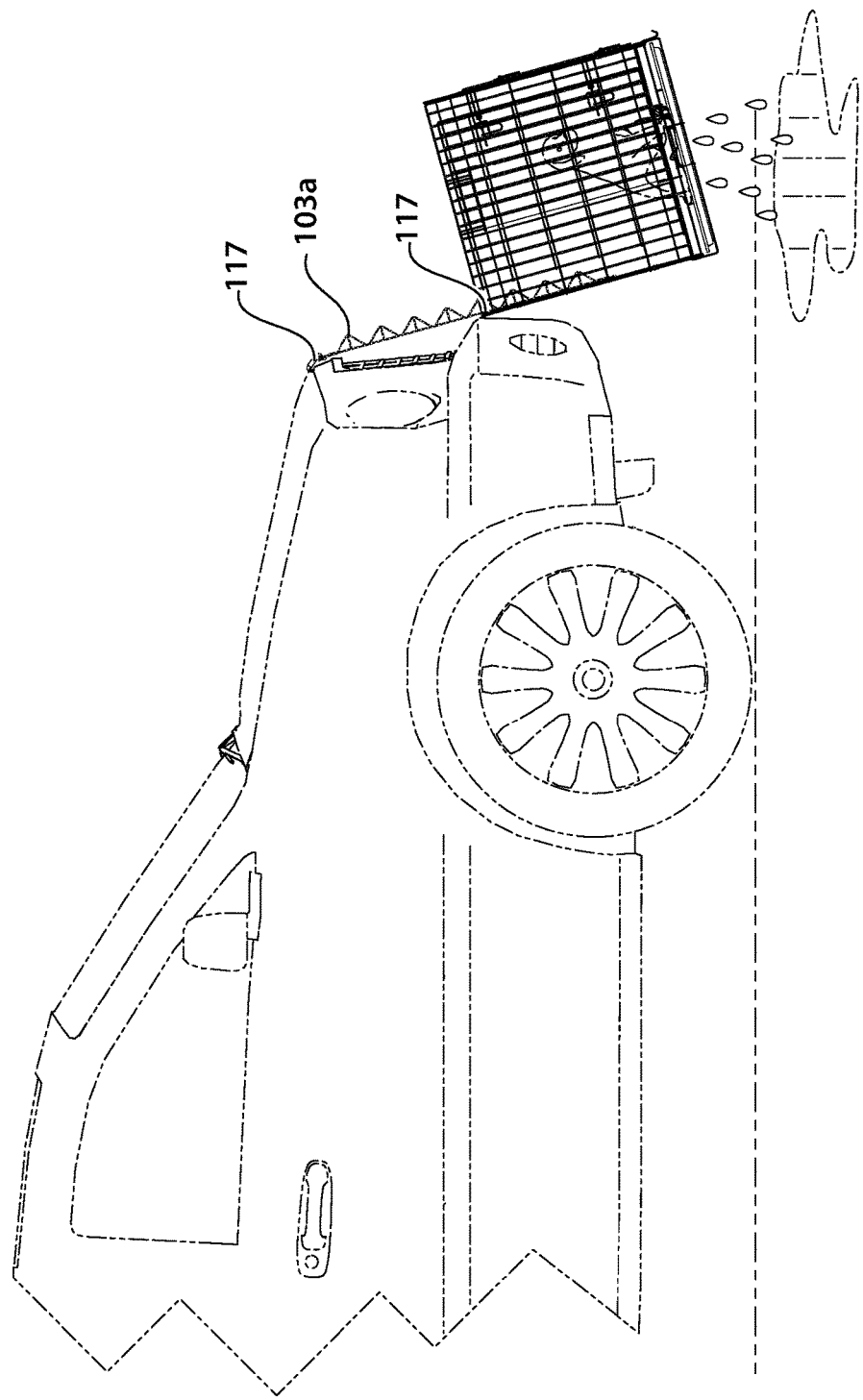
Figure 19S:
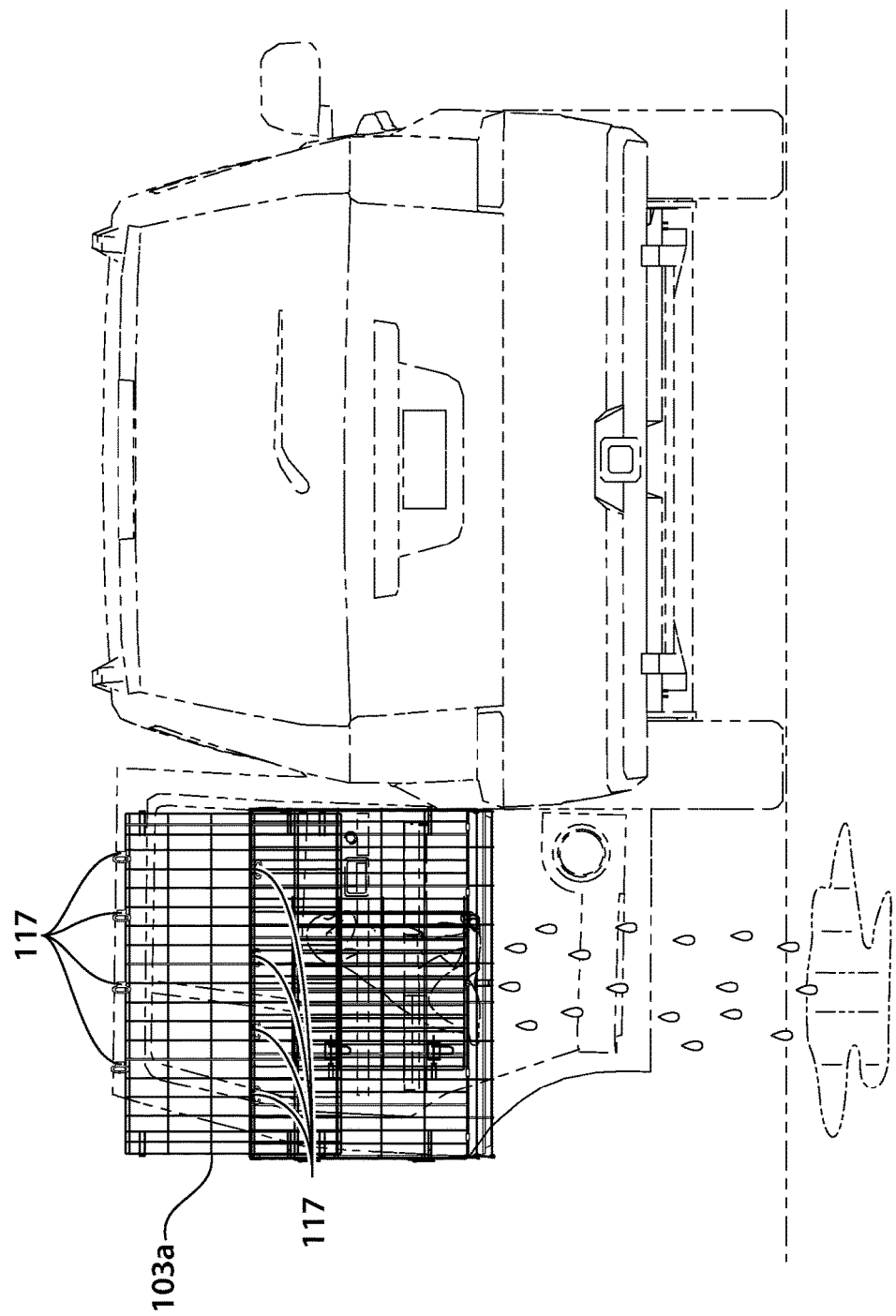
Figure 19T:
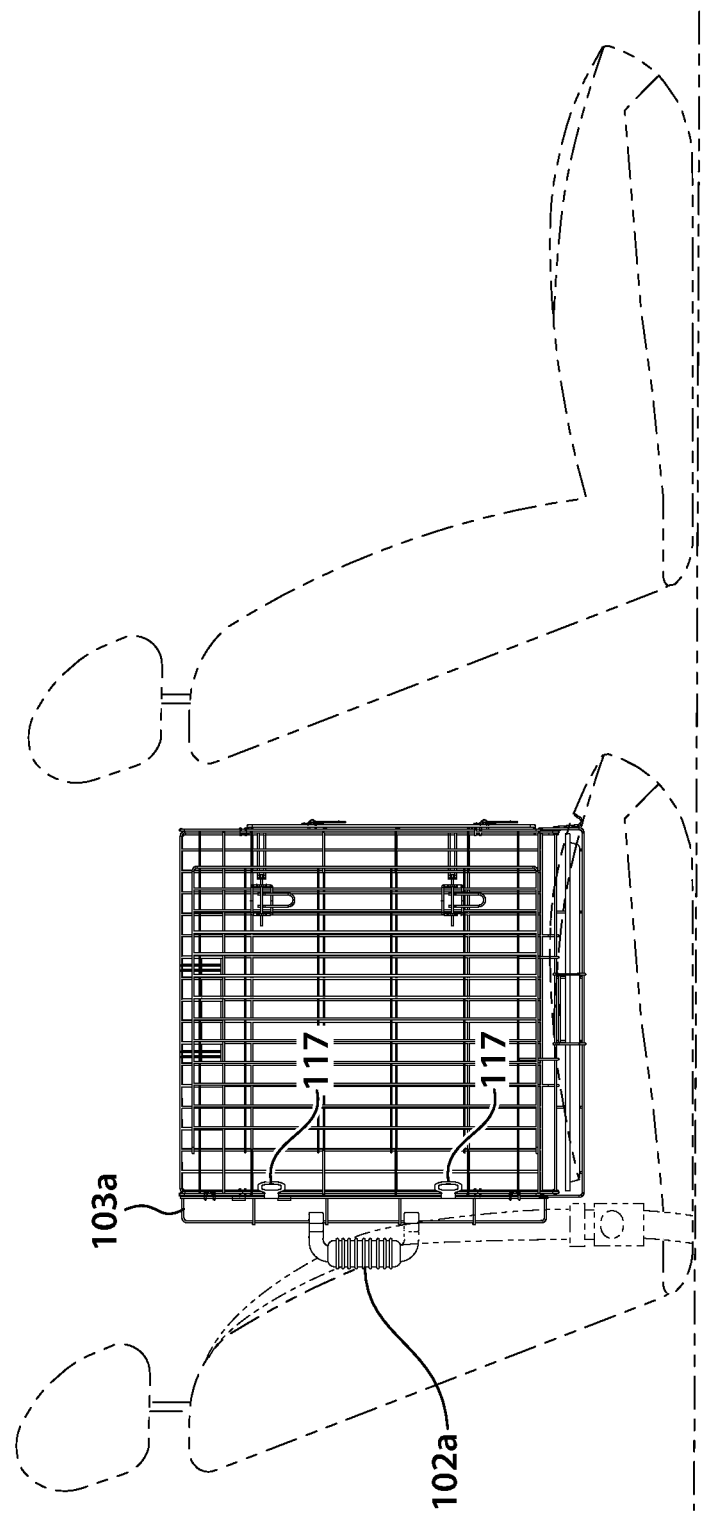
FIG. 19T illustrates a side view of how crumplable-seatbeltable-rampable-leggable top panel 103a functions as a car-seat fastener.
Figure 19U:
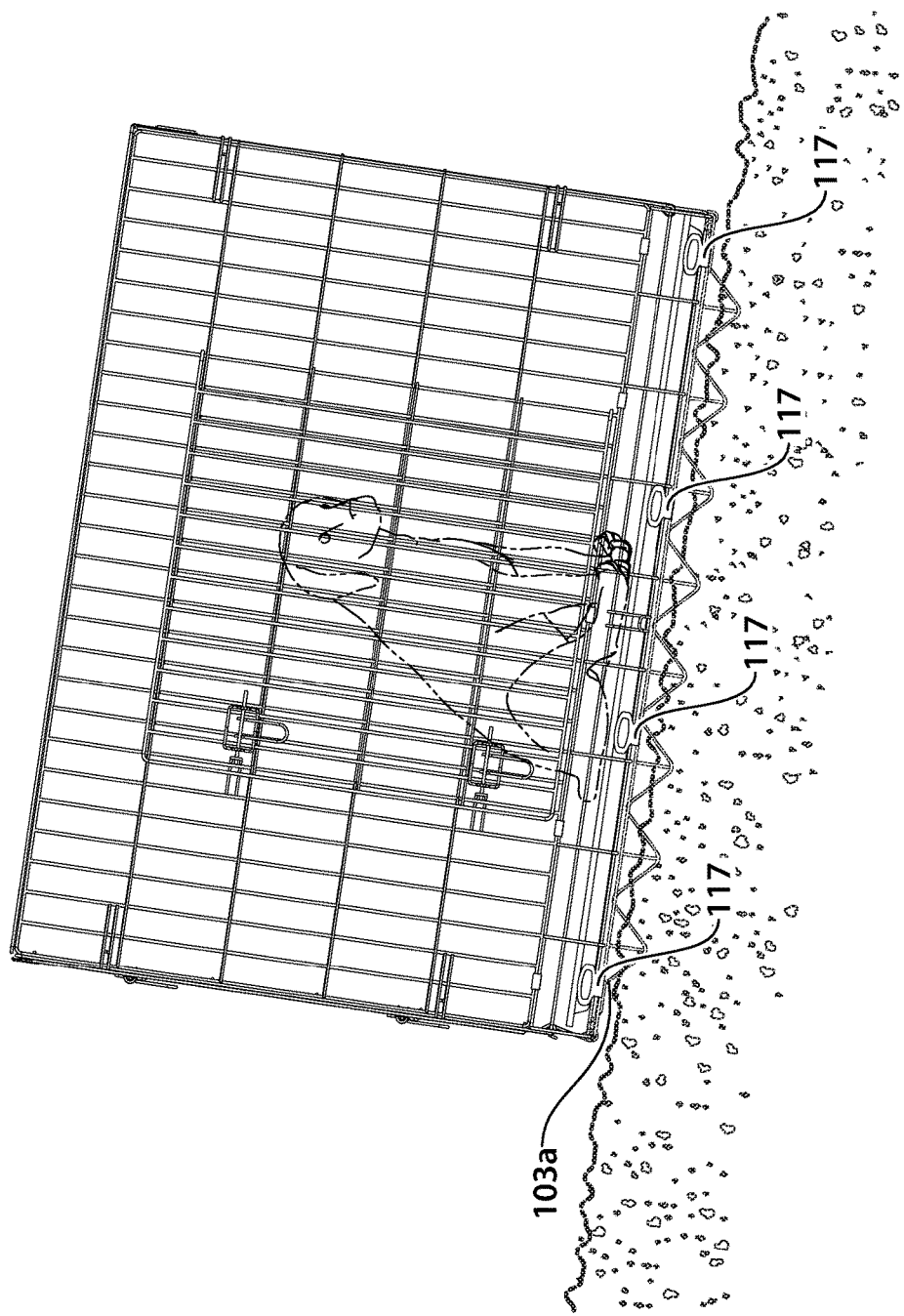
FIG. 19U and FIG. 19V illustrate side views of how crumplable-seatbeltable-rampable-leggable top panel 103a functions as a spike.
Figure 19V:
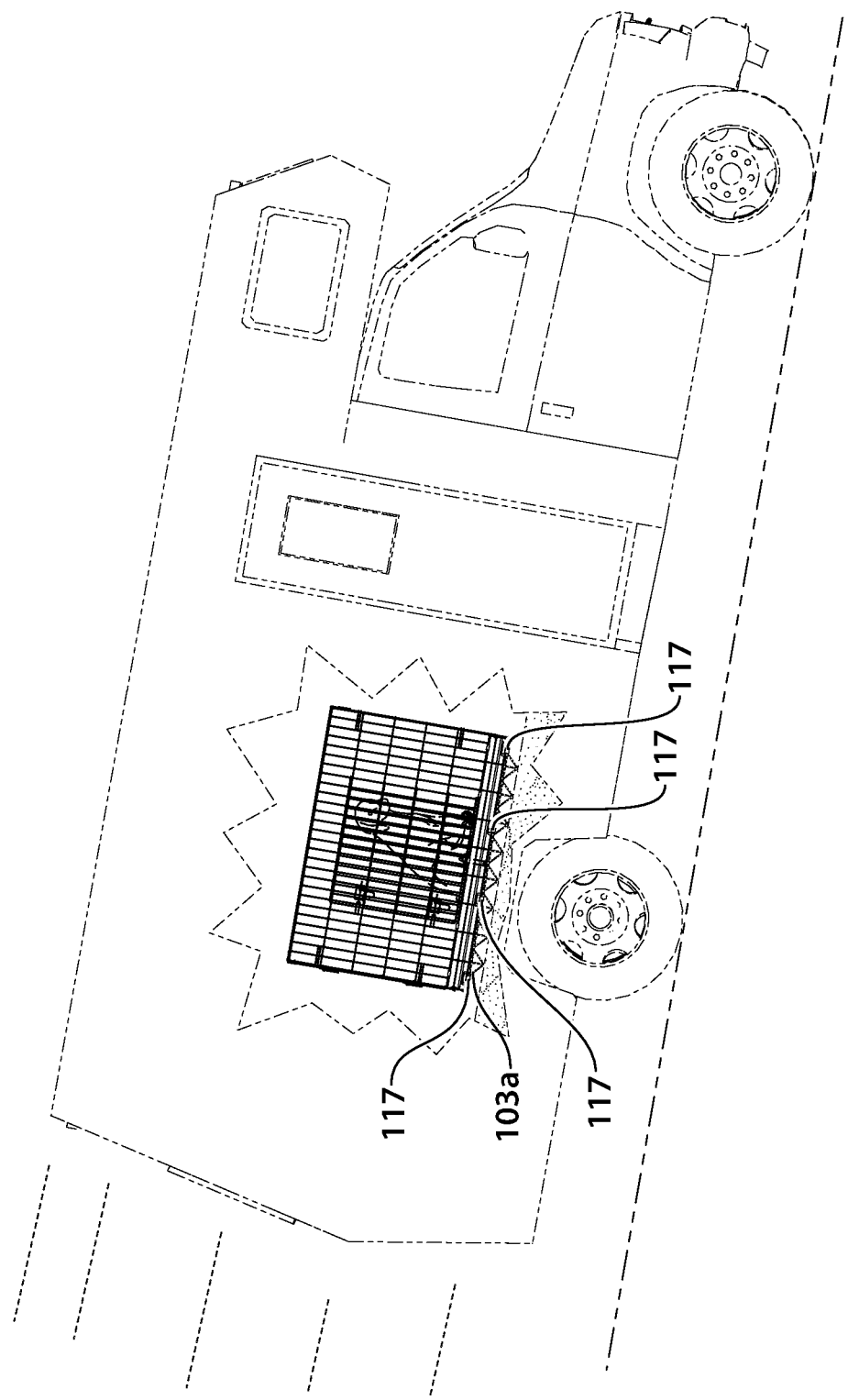
Figure 19W:
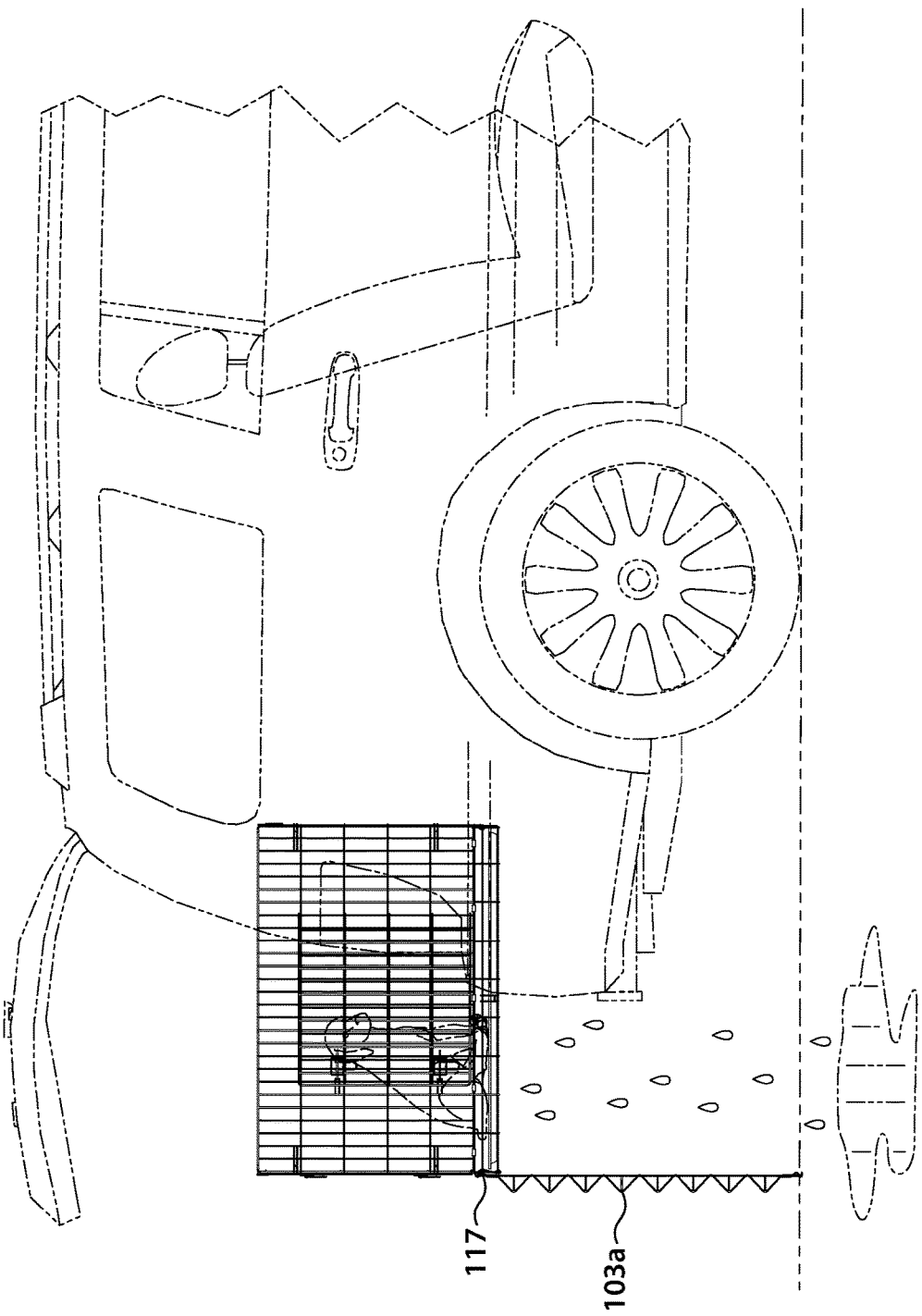
FIG. 19W illustrates a side view of how crumplable-seatbeltable-rampable-leggable top panel 103a functions as a leg.
Figure 21A:
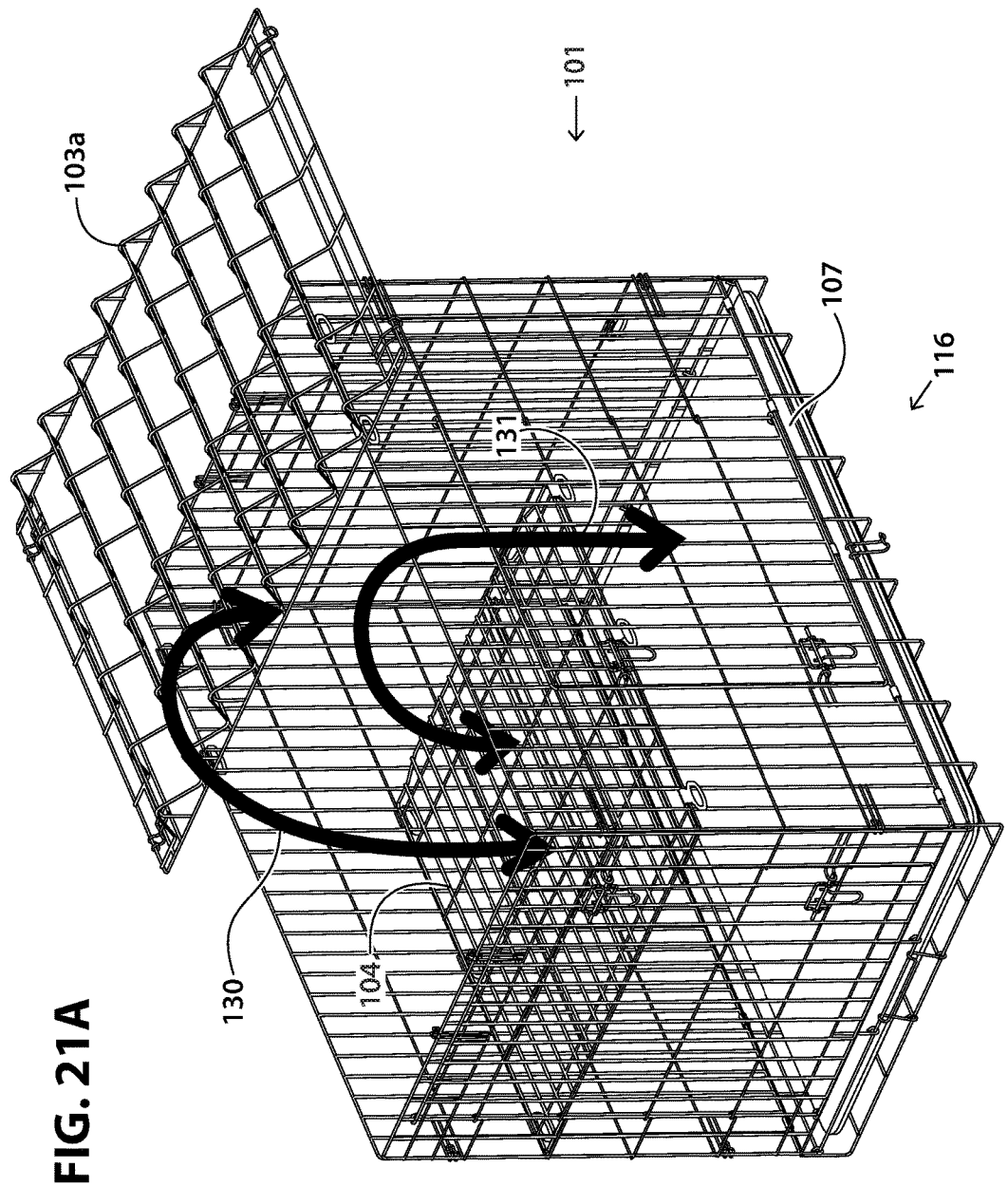
Figure 21B:
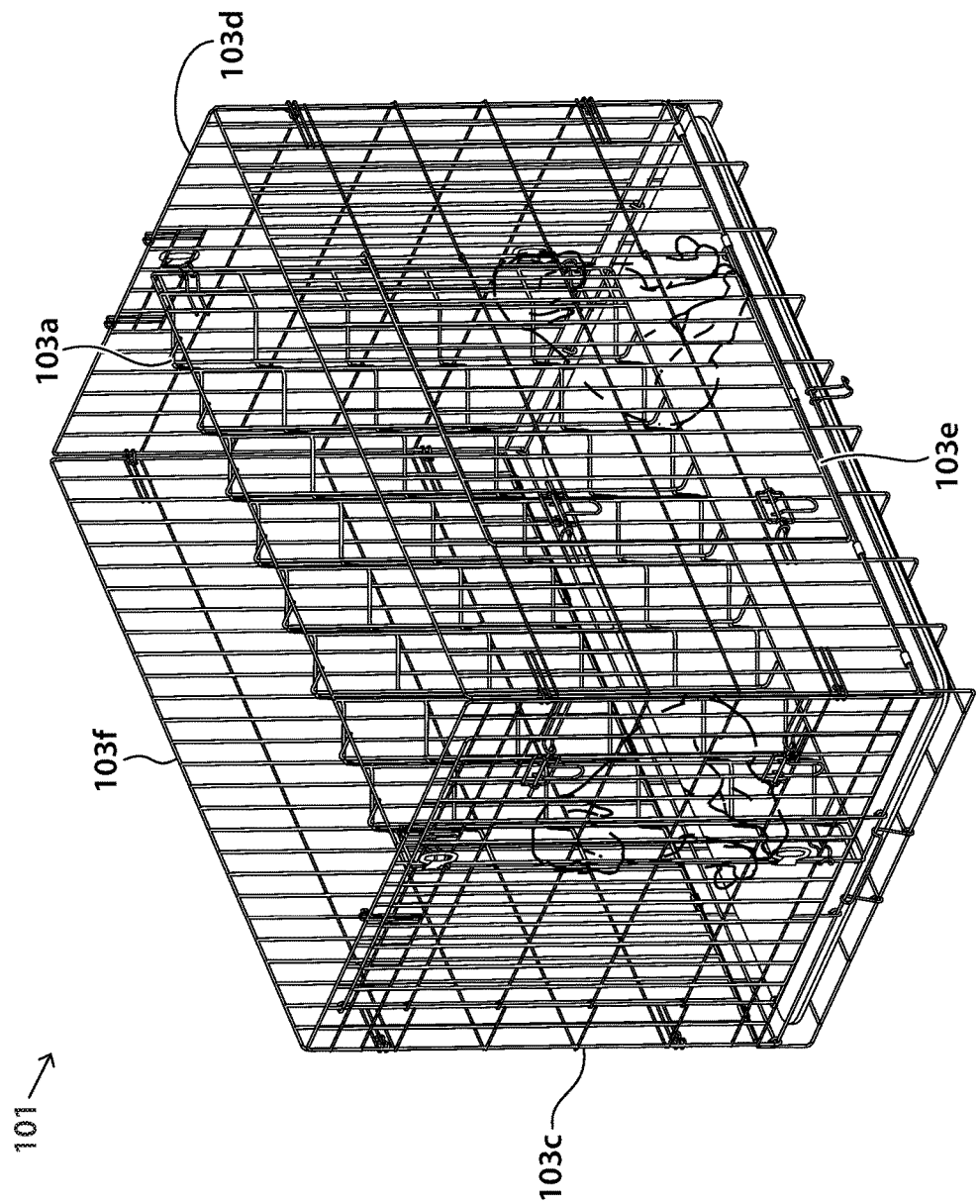
Figure 21C:
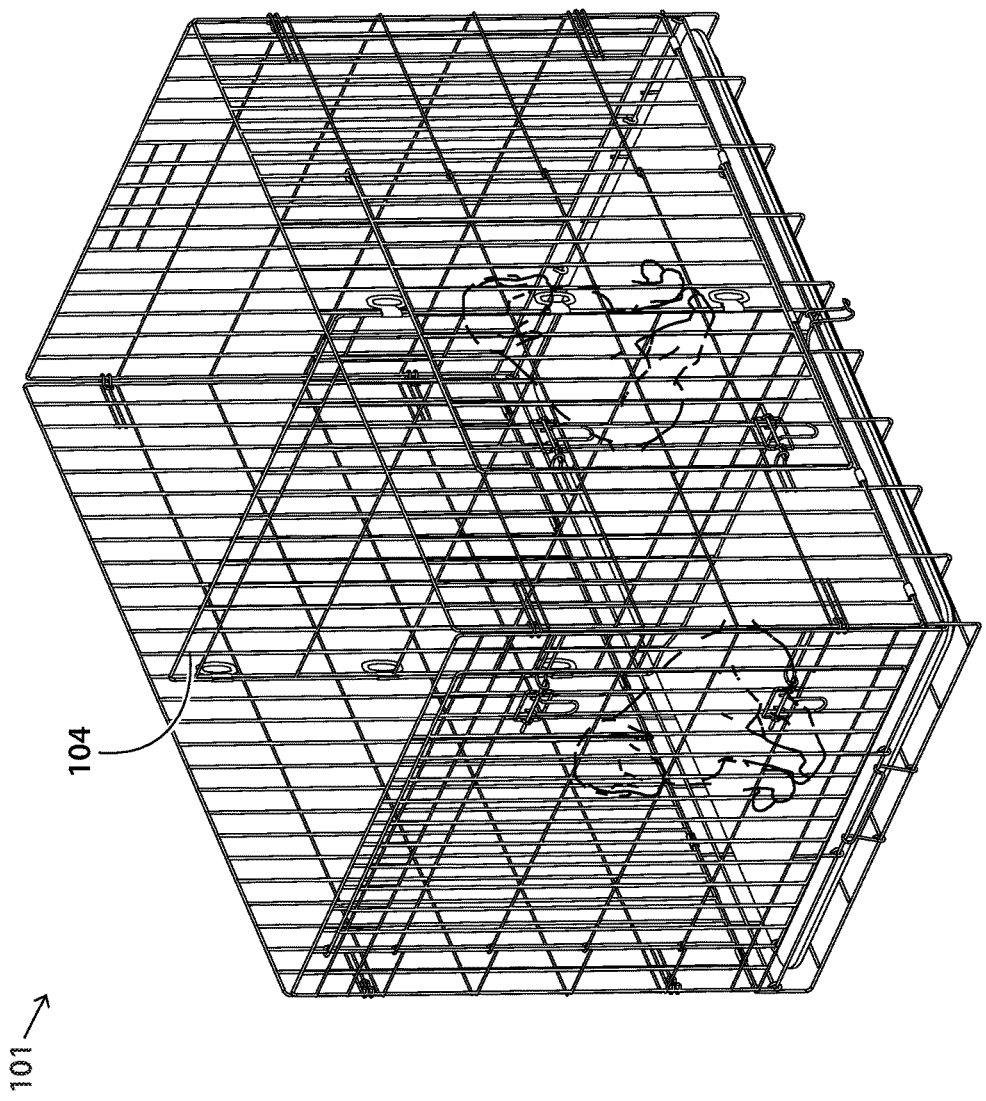
Figure 22:
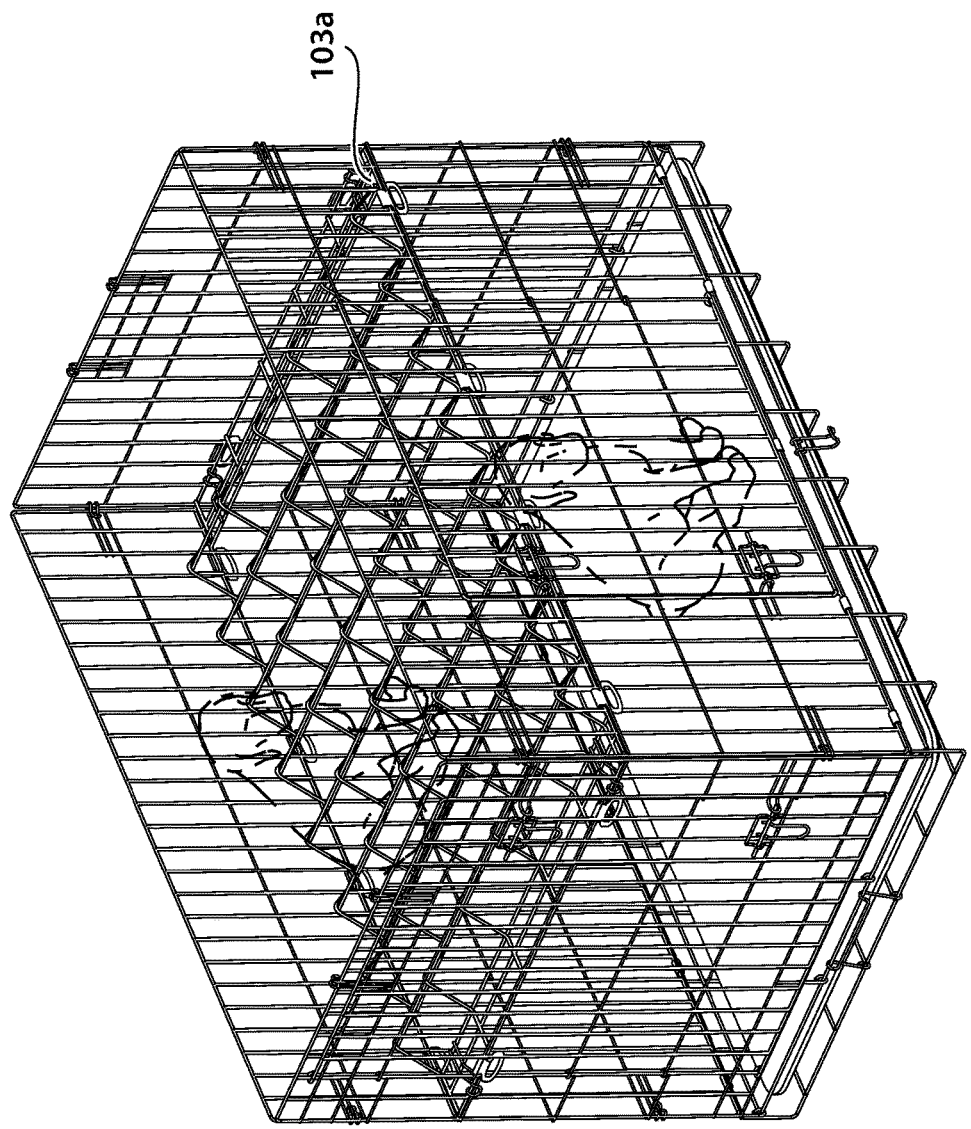
Figure 23:
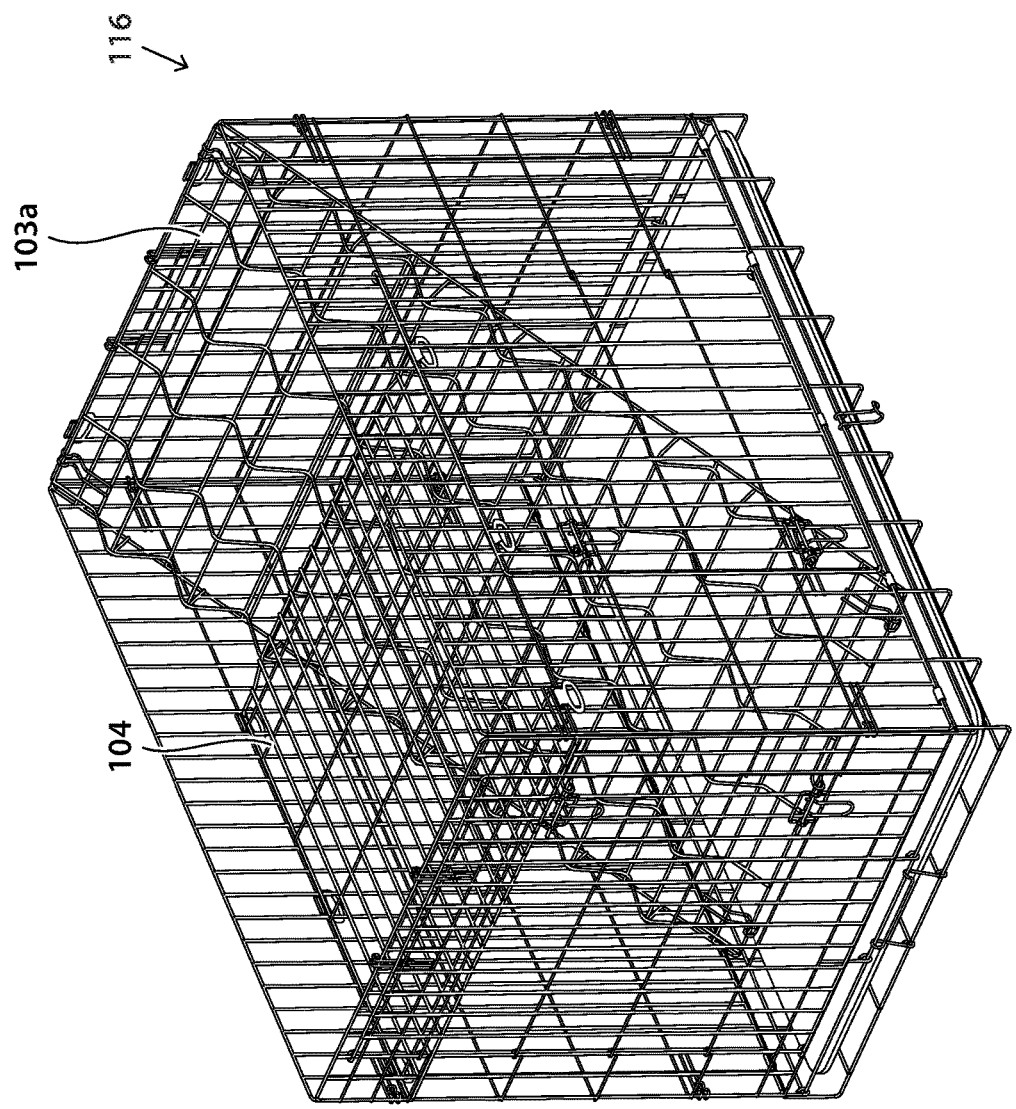

19) Removable crumple-zone multi-function accessory-hanging ring hook 119 is for:

a) Quickly and easily attaching top panel 103*a* to act as a crumple zone when attached to a seat or headrest of an automobile
   to absorb collision and provide safety to pets in the event of an accident in the direction of arrows 129*a* and 129*b*
   (see FIG. 19K, FIG. 19 L, FIG. 19M, and FIG. 19N);

b) Hooking and holding towel thereon
to use to dry pets
(See FIG. 26);
c) Hooking and holding napkin thereon
to use to clean pets
(See FIG. 26);
d) Hooking and holding medicine thereon
to use to cure pets
(See FIG. 26 and FIG. 32G); and
e) Hooking and holding toys thereon
to use to entertain pets
(See FIG. 26 and FIG. 32G).
20) Multi-pet multi-entrance door system 120 is for performing the combined functions of its components.
21) First and second door openings 121a and 121b respectively are for:
Allowing pets to enter and exit.
22) First and second doors 122a and 122b respectively are for:
Closing and opening first and second door openings 121a and 121b.
23) First and second push-rod hinges 123a and 123b respectively are for:
Hingedly attaching first and second push-rods 125a and 125b to first and second doors 122a and 122b.
24) First and second push-rod levers 124a and 124b respectively are for:
Operating first and second push-rods 125a and 125b.
25) First and second push-rods 125a and 125b respectively are for:
Releasably locking first and second doors 122a and 122b.
26) First and second push-rod-locking rings 126a and 126b respectively are for:
Releasably locking first and second push-rods 125a and 125b.

Variation

Figure 32D:
FIG. 32D, FIG. 32E, FIG. 32F, and FIG. 32G illustrate side and perspective views of multiple views of demonstrating the use of shorter side panels being used to create additional top storage and how items can be attached to side of the pet crate using removable multi-purpose multi-function accessory-hanging ring hooks 119.
Figure 32E:
Figure 32F:
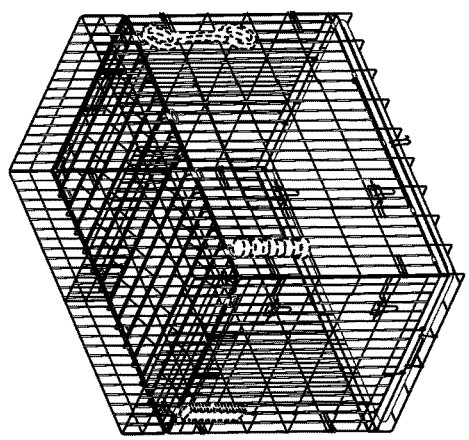
Figure 32G:
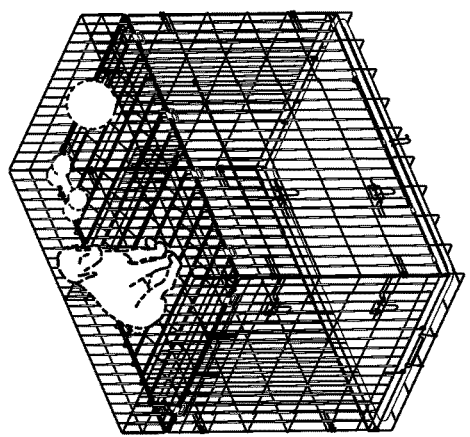
Figure 34:
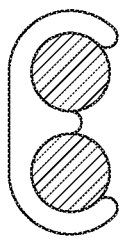
FIG. 33 and FIG. 34 illustrate cross-sectional views of variations of removable multi-function double-clip-and-ring-hook systems 116.
Figure 36:
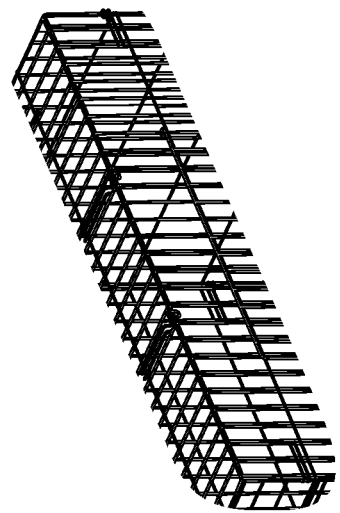
FIG. 35, FIG. 36, FIG. 37, and FIG. 38 illustrate perspective and top views of variations of top quick-panel-locking-and-releasing stopper-and-hook systems 108.
Figure 33:
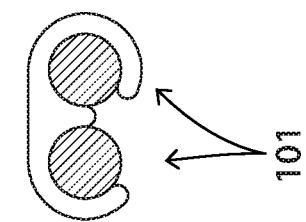
Figure 35:
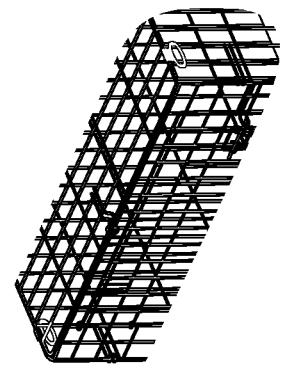
Figure 37:
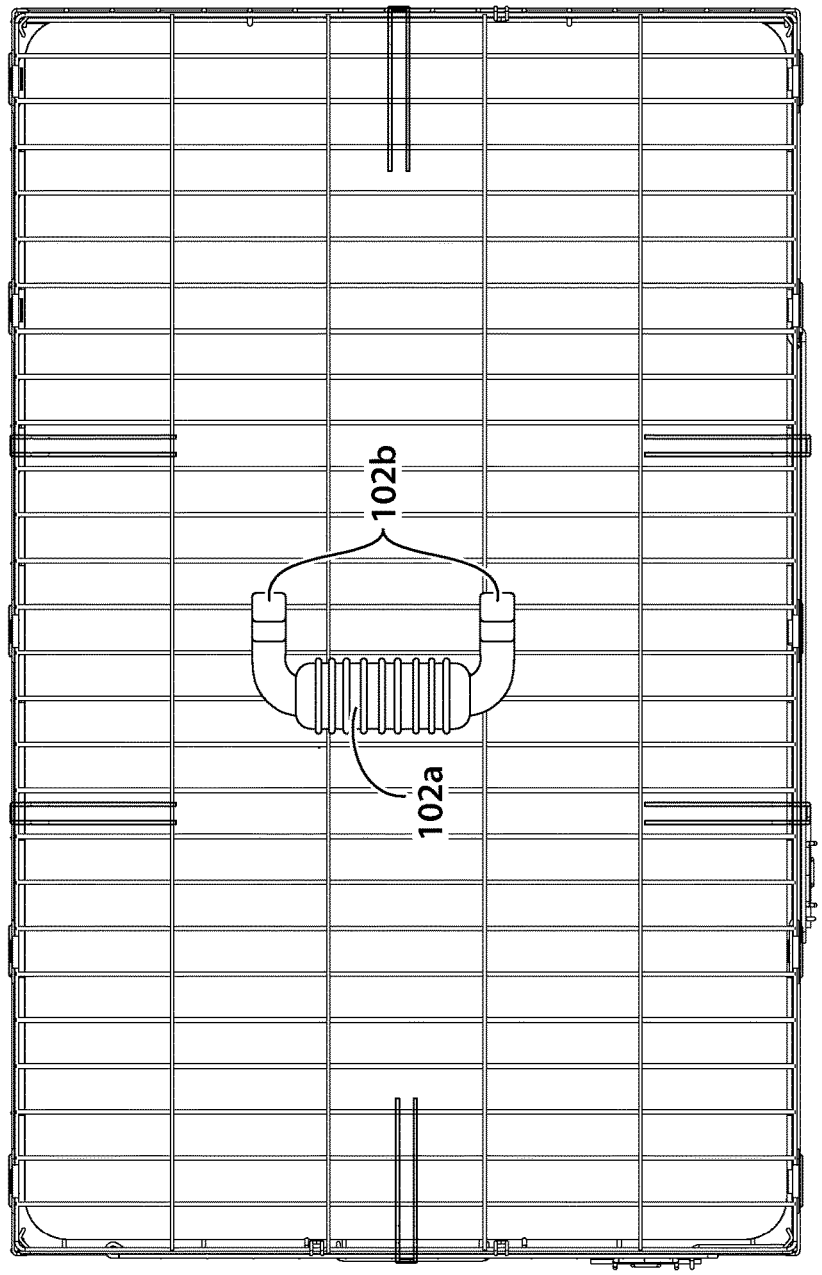
Figure 38:
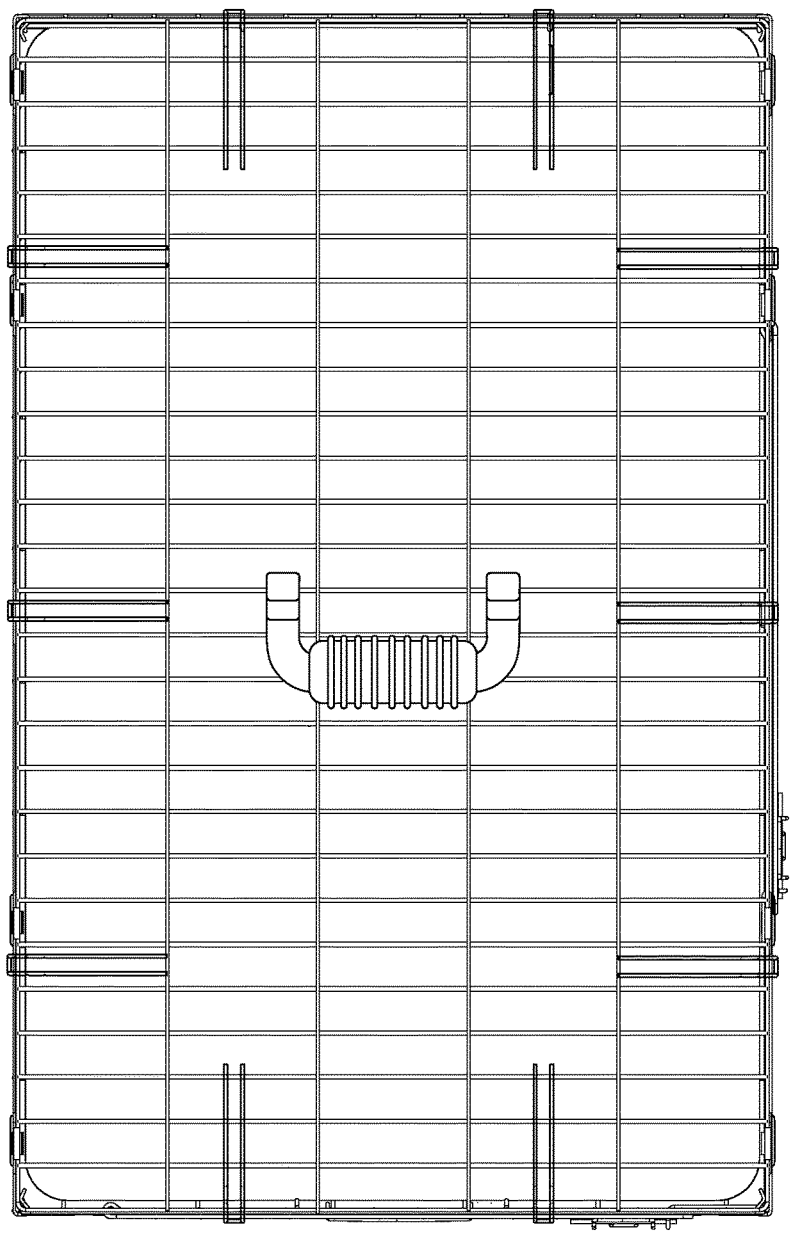
Figure 39C:
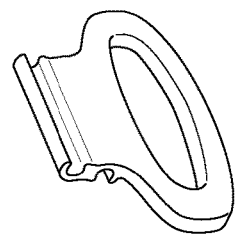
FIG. 39A, FIG. 39B, FIG. 39C, FIG. 39D, and FIG. 39E illustrate perspective views of variations of removable multi-function double-clip-and-ring-hook systems 116 and the pet crate.
Figure 39B:
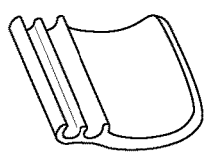
Figure 39A:
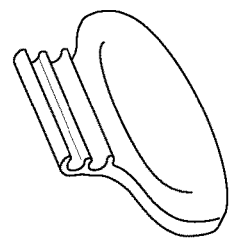
Figure 39E:
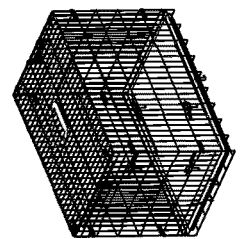
Figure 39D:
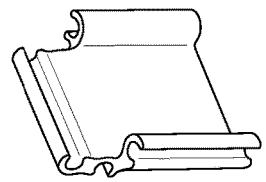

Any component of the fourteen-device-in-one crumplable-seatbeltable-rampable-leggable-top-panel pet crate can have any shape and size. Any component of the fourteen-device-in-one crumplable-seatbeltable-rampable-leggable-top-panel pet crate can be made of any material(s). FIG. 32D, FIG. 32E, and FIG. 32F illustrate shorter side panels and how they can be used to create additional storage to the top of the pet crate. FIG. 32G illustrates how items can be attached to the sides of the pet crate using hooks. FIG. 33 and FIG. 34 illustrate cross-sectional views of variations of removable multi-function double-clip-and-ring-hook systems 116. FIG. 35, FIG. 36, FIG. 37, and FIG. 38 illustrate perspective and top views of variations of top quick-panel-locking-and-releasing stopper-and-hook systems 108. FIG. 39A, FIG. 39B, FIG. 39C, and FIG. 39D illustrate perspective views of variations of removable multi-function double-clip-and-ring-hook systems 116. FIG. 39E illustrates a variation of the fourteen-device-in-one crumplable-seatbeltable-rampable-leggable-top-panel pet crate. The variation has a top panel, which is equivalent to crumplable-seatbeltable-rampable-leggable top panel 103a and is formed into a flat rectangular shape.

MAJOR ADVANTAGES OF THE INVENTION

The present invention substantially departs from the conventional concepts and designs of the prior art. In doing so, the present invention provides a fourteen-device-in-one crumplable-seatbeltable-rampable-leggable-top-panel pet crate (having: a) Crumplable-seatbeltable-rampable-leggable-top-panel system, b) Top quick-panel-locking-and-releasing stopper-and-hook systems, c) Side quick-panel-locking-and-releasing stopper-and-hook systems, and d) Removable multi-elevation double-clip-and-ring-hook systems), having many new and significant features, functions, and advantages, which overcome all the disadvantages of the prior art, as follows:

1) It is an object of the new invention to provide a fourteen-device-in-one crumplable-seatbeltable-rampable-leggable-top-panel pet crate, having
Crumplable-seatbeltable-rampable-leggable top panel 103a,
removable crumple-zone multi-elevation locking clamps 117, and
removable crumple-zone multi-elevation locking double clips 118.
Therefore, the fourteen-device-in-one crumplable-seatbeltable-rampable-leggable-top-panel pet crate:
a) Can have top panel 103a functioning as a hanger to hang the pet crate on the latch of an open tailgate of an SUV
to allow, for example, pool or river water to drip down from pets to dry the pets
(see FIG. 1D and FIG. 19P);
b) Can have top panel 103a functioning as an arm to attach the pet crate to the top edge of a closed tailgate of an SUV
to allow, for example, pool or river water to drip down from pets to dry the pets
(see FIG. 1E and FIG. 19Q);
c) Can have top panel 103a functioning as a lid to hook the pet crate on the latch of an engine hood of an SUV
to allow, for example, pool or river water to drip down from pets to dry the pets
(see FIG. 1F and FIG. 19R);
d) Can have top panel 103a functioning as a convertor to clamp the pet crate to the top edge of an open door of an SUV
to allow, for example, pool or river water to drip down from pets to dry the pets
(see FIG. 1G and FIG. 19S);
e) Can have top panel 103a functioning as a car-seat fastener (by inserting a seatbelt through handle 102a on top panel 103a of the pet crate and securing top panel 103a to left panel 103c of the pet crate,
to fasten the pet crate to the car seat.
(see FIG. 1H and FIG. 19T);
f) Can have top panel 103a functioning as a spike (by parallelly securing top panel 103a to bottom panel 103b of the pet crate)
to dig into a slanted sandy or soil beach or
to dig into a slanted carpeted floor of an RV going downhill to prevent the pet crate from sliding downwards
(See FIG. 1I, FIG. 1J, FIG. 19U, and FIG. 19V);
g) Can have top panel 103a functioning as a leg (by vertically securing top panel 103a to bottom panel 103b of the pet crate)
to support bottom panel 103b of the pet crate
(See FIG. 1K and FIG. 19W);
h) Can have top panel 103a functioning as a ladder (by angledly securing top panel 103a to the pet crate)
to allow a pet to walk up to or to walk down from the back of an SUV
(See FIG. 1M, FIG. 1N, FIG. 1O, FIG. 19H, FIG. 19I, and FIG. 19J);

i) Can have top panel 103*a* functioning as a ramp (by angledly securing top panel 103*a* to the latch of an SUV)
   to allow a pet to walk up to or to walk down from the back of an SUV
   (See FIG. 1M, FIG. 1N, FIG. 1O, FIG. 19H, FIG. 19I, and FIG. 19J).
2) It is another object of the new invention to provide a fourteen-device-in-one crumplable-seatbeltable-rampable-leggable-top-panel pet crate, having
   Crumplable-seatbeltable-rampable-leggable top panel 103*a*,
   removable crumple-zone multi-elevation locking clamps 117, and
   removable crumple-zone multi-elevation locking double clips 118.
   Therefore, the fourteen-device-in-one crumplable-seatbeltable-rampable-leggable-top-panel pet crate:
   a) Can have top panel 103*a* quickly and easily removed and stored inside a urine-waste-catching tray
      to reduce 30% of the thickness of NON-removable-top-panel pet-crate of the SAME size when the removable-top-panel pet crate is folded,
      to reduce 30% of the space needed in each shipping container, to reduce significantly the shipping cost of the pet crate
      (FIG. 1P (PRIOR ART illustrates a fixed top panel)
      (FIG. 1Q illustrates removable top panel 103*a* stored in tray 107)
      (FIG. 2A (PRIOR ART) illustrates a larger thickness 97 of the pet crate)
      (FIG. 2B illustrates a smaller thickness 98 of the new pet crate with removable top panel 103*a* stored in tray 107)
      (FIG. 2C (PRIOR ART) illustrates a larger thickness 97 of the pet crate)
      (FIG. 2D illustrates a smaller thickness 98 of the new pet crate with removable top panel 103*a* stored in tray 107)
      (FIG. 3A (PRIOR ART) illustrates a shipping container 99*a* has 100 pet crates 99*b* filling up all its internal volume 99*c*)
      (FIG. 3B illustrates a shipping container 100*a* has 100 pet crates 100*b* filling up only 70% of its internal volume 100*c* and saving 30% of its internal volume 100*d*)
      (For example:
      In order to fold a prior-art crate, its top panel and its front and rear panels have to be bent up respectively in the directions of arrows 127 and 128 (see FIG. 3C), and
      have to be folded atop one another.
      In contrast, the top panel of the current invention can simply be snapped off and stored inside tray 107 at the bottom of the crate
      (see FIG. 2B);
   b) Can be used as an anchor when attached to a seat, headrest or ceiling of an automobile
      to provide immobilization of the pet crate while traveling
      (FIG. 4E illustrates removable top panel 103*a* anchored to a headrest immobilizing the pet crate from moving during travel)
      (see FIG. 19A, FIG. 19B, FIG. 19C, FIG. 19D, FIG. 19E, FIG. 19F, and FIG. 19G);
   c) Can quickly and easily attach top panel 103*a* to be a crumple zone when attached to a seat or headrest
      to absorb collision and provide safety to pets in the event of an accident in the direction of arrows 129*a* and 129*b*
      (see FIG. 19K, FIG. 19 L, FIG. 19M, and FIG. 19N);
   d) Can have top panel 103*a* quickly and easily detached from the pet crate
      to convert the fully enclosed pet crate into an open-top pet playpen
      (see FIG. 15, FIG. 16, FIG. 17, FIG. 18A, FIG. 18B, FIG. 21A, FIG. 21B, FIG. 21C, FIG. 22, FIG. 23, FIG. 24, FIG. 25, FIG. 26, FIG. 27, FIG. 28, FIG. 29, FIG. 30, FIG. 31, FIG. 32A illustrating multiple new pet crates right side up, and FIG. 32B and FIG. 32C illustrating multiple new pet crates upside down);
   e) Can have top panel 103*a* quickly and easily removed to create one or multiple pet playpens or pet runs
      (see FIG. 15, FIG. 16, FIG. 17, FIG. 18A, FIG. 18B, FIG. 21A, FIG. 21B, FIG. 21C, FIG. 22, FIG. 23, FIG. 24, FIG. 25, FIG. 26, FIG. 27, FIG. 28, FIG. 29, FIG. 30, FIG. 31, FIG. 32A illustrating multiple new pet crates right side up, and FIG. 32B and FIG. 32C illustrating multiple new pet crates upside down); and
   f) Can have top panel 103*a* quickly and easily secured in variable positions and orientations, respectively, by using removable crumple-zone multi-elevation locking double clips 118,
      to allow top panel 103*a* to function as:
      a roof,
      a ramp,
      a balcony,
      an awning, and
      a partition
      (see FIG. 22, FIG. 23, FIG. 24, FIG. 25, FIG. 26, FIG. 27, FIG. 28, FIG. 29).
3) It is another object of the new invention to provide a fourteen-device-in-one crumplable-seatbeltable-rampable-leggable-top-panel pet crate, having
   Crumplable-seatbeltable-rampable-leggable top panel 103*a*,
   removable crumple-zone multi-elevation locking clamps 117, and
   removable crumple-zone multi-elevation locking double clips 118.
   Therefore, the fourteen-device-in-one crumplable-seatbeltable-rampable-leggable-top-panel pet crate:
   a) Can have top panel 103*a* quickly and easily removed
      to create an open-top crate,
      to make it easily accessible for pets,
      to create a non-confining environment for pets,
      to create headroom for a tall pet,
      to create a way for pets to climb out of the pet crate, or to jump out on adjacent playing or resting ramp, balcony, and patio,
      to create multiple different configurations of pet runs,
      to allow pets to sit, stand, play, rest, sleep, and climb upon
      (see FIG. 15, FIG. 16, FIG. 17, FIG. 18A, FIG. 18B, FIG. 21A, FIG. 21B, FIG. 21C, FIG. 22, FIG. 23, FIG. 24, FIG. 25, FIG. 26, FIG. 27, FIG. 28, FIG. 29, FIG. 30, FIG. 31, FIG. 32A illustrating multiple new pet crates right side up, and FIG. 32B and FIG. 32C illustrating multiple new pet crates upside down);

b) Can have top panel 103a function as a suspended top panel at different elevations
(see FIG. 23, FIG. 24, FIG. 25, FIG. 26, FIG. 27, FIG. 28, and FIG. 29); and
c) Can have top panel 103a function as a multi-pet divider and partition, to accommodate two or more pets in side-by-side compartments.

4) It is another object of the new invention to provide a fourteen-device-in-one crumplable-seatbeltable-rampable-leggable-top-panel pet crate, having Crumplable-seatbeltable-rampable-leggable top panel 103a, removable crumple-zone multi-elevation locking clamps 117, and removable crumple-zone multi-elevation locking double clips 118.

Therefore, the fourteen-device-in-one crumplable-seatbeltable-rampable-leggable-top-panel pet crate:
a) Can have top panel 103a quickly and easily secured angledly in conjunction with a removable multi-elevation roof-ramp-balcony-awning-partition mezzanine 104
to allow top panel 103a to function as adjustable-depth pet toy storages (see FIG. 24);
b) Can have top panel 103a quickly and easily secured to allow top panel 103a to function as a vertically-adjustable-height ceiling;
c) Can have top panel 103a function as a multi-story floor
to accommodate two or more pets in separate compartments stacked vertically
(see FIG. 29);
d) Can have top panel 103a function as an angled ceiling-divider,
to separate multiple pets, within crumplable-seatbeltable-rampable-leggable top panel 103a, and/or in conjunction with removable multi-elevation roof-ramp-balcony-awning-partition mezzanine 104;
e) Can have top panel 103a function as a bridge between multiple pet crates,
to provide a dry, above-ground walking surface for pets
(see FIG. 29, FIG. 30, FIG. 31, FIG. 32A illustrating multiple new pet crates right side up, and FIG. 32B and FIG. 32C illustrating multiple new pet crates upside down); and
f) Can function as a partial enclosure, with removable multi-elevation roof-ramp-balcony-awning-partition mezzanine 104 connected vertically inside the pet crate
to provide separate spaces for multiple pets, one space fully enclosed and the other with an open top
(See FIG. 29).

5) It is a further object of the new invention to provide a fourteen-device-in-one crumplable-seatbeltable-rampable-leggable-top-panel pet crate, having removable crumple-zone multi-elevation locking clamps 117, and removable crumple-zone multi-elevation locking double clips 118.

Therefore, the fourteen-device-in-one crumplable-seatbeltable-rampable-leggable-top-panel pet crate:
a) Can quickly and easily, at multiple different elevations,
attach crumplable-seatbeltable-rampable-leggable top panel 103a to bottom, left, right, front, and rear panels 103b, 103c, 103d, 103e, and 103f of the pet crate,
remove crumplable-seatbeltable-rampable-leggable top panel 103a from bottom, left, right, front, and rear panels 103b, 103c, 103d, 103e, and 103f of the pet crate;
b) Can quickly and easily, at multiple different elevations,
attach removable multi-elevation roof-ramp-balcony-awning-partition mezzanine 104 to top, bottom, left, right, front, and rear panels 103a, 103b, 103c, 103d, 103e, and 103f of the pet crate,
remove removable multi-elevation roof-ramp-balcony-awning-partition mezzanine 104 from top, bottom, left, right, front, and rear panels 103a, 103b, 103c, 103d, 103e, and 103f of the pet crate;
c) Can quickly and easily snap on top, bottom, left, right, front, and rear panels 103a, 103b, 103c, 103d, 103e, and 103f of the pet crate
to reposition crumplable-seatbeltable-rampable-leggable top panel 103a,
to reposition removable multi-elevation roof-ramp-balcony-awning-partition mezzanine 104 without tools;
d) Can quickly and easily connect crumplable-seatbeltable-rampable-leggable top panel 103a and removable multi-elevation roof-ramp-balcony-awning-partition mezzanine 104 to the interior or exterior of the pet crate,
to provide means to convert crumplable-seatbeltable-rampable-leggable top panel 103a to a partition, divider, patio, bridge, shelf, ramp, auxiliary platform, balcony, porch, floor, toy storage, and angled ceiling divider;
e) Can quickly and easily connect crumplable-seatbeltable-rampable-leggable top panel 103a and removable multi-elevation roof-ramp-balcony-awning-partition mezzanine 104 to the interior or exterior of the pet crate at multiple heights, respectively,
to provide means to reposition top panel 103a and mezzanine 104 at selective vertical levels; and
f) Can quickly and easily attach to a U-shaped locking hook of the tailgate of an automobile to be used as an anchor
to allow top panel 103a to be used as a ramp to enter and exit the rear compartment of the automobile
(see FIG. 19I and FIG. 19J).

6) It is an even further object of the new invention to provide a fourteen-device-in-one crumplable-seatbeltable-rampable-leggable-top-panel pet crate, having Removable crumple-zone multi-elevation accessory-hanging ring hook 119.

Therefore, the fourteen-device-in-one crumplable-seatbeltable-rampable-leggable-top-panel pet crate:
a) Can quickly and easily attach top panel 103a to be a crumple zone when attached to a seat or headrest
to absorb collision and provide safety to pets in the event of an accident in the direction of arrows 129a and 129b
(see FIG. 19K, FIG. 19 L, FIG. 19M, and FIG. 19N);
b) Can hold towel,
to dry pets
(See FIG. 26);
c) Can hold napkin,
to clean pets
(See FIG. 26);

d) Can hold medicine,
  to cure pets
  (See FIG. 26 and FIG. 32G); and
e) Can hold toys,
  to entertain pets
  (See FIG. 26 and FIG. 32G).

7) It is another object of the new invention to provide a fourteen-device-in-one crumplable-seatbeltable-rampable-leggable-top-panel pet crate, having
removable multi-elevation roof-ramp-balcony-awning-partition mezzanine 104,
removable crumple-zone multi-elevation locking clamps 117, and
removable crumple-zone multi-elevation locking double clips 118.

Therefore, the fourteen-device-in-one crumplable-seatbeltable-rampable-leggable-top-panel pet crate:
  a) Can create multiple pet-containing compartments,
    to accommodate two or more pets
    (see FIG. 15, FIG. 16, FIG. 17, FIG. 23, FIG. 24, FIG. 25, FIG. 26, FIG. 27, FIG. 28, and FIG. 29);
  b) Can create multiple sized pet-containing compartments,
    to accommodate pet growth from puppy to adult stage;
  c) Can create multiple sized pet-containing compartments,
    to accommodate large and small pets simultaneously;
  d) Can separate multiple pets,
    to allow multiple pets to sleep, rest and play simultaneously therein
    (For example:
    Pets can climb or jump to different elevations in the directions of arrows 130 and 131
    (see FIG. 21A, FIG. 22, FIG. 23, FIG. 24, and FIG. 25);
  e) Can provide vertical separating means within the pet crate,
    to confine multiple pets in independent compartments side by side,
    to function as a partition,
    to function as a divide;
  f) Can provide horizontal separating means within the pet crate,
    to confine multiple pets in independent compartments above and below one another;
  g) Can provide means to create a horizontal platform within the pet crate,
    to function as a pet mezzanine,
    to function as a pet shelf,
    to function as a pet step,
    to function as a pet floor,
    to function as a pet ceiling;
  h) Can provide means to attach to the interior or exterior of the pet crate,
    to function as a pet bridge,
    to function as a pet step,
    to function swingingly as a gate,
    to function as a support to crumplable-seatbeltable-rampable-leggable top panel 103a; and
  i) Can provide means to connect between multiple pet crates as a common exterior vertical panel.
    to function as a wall, and
    to function as a floor.

8) It is yet another object of the new invention to provide a fourteen-device-in-one crumplable-seatbeltable-rampable-leggable-top-panel pet crate, having
top quick-panel-locking-and-releasing stoppers 110 and
top quick-panel-locking-and-releasing hooks 111.

Therefore, the fourteen-device-in-one crumplable-seatbeltable-rampable-leggable-top-panel pet crate:
  a) Can quickly and easily snap-lock front and rear panels 103e and 103f past top quick-panel-locking-and-releasing stoppers 110 into top quick-panel-locking-and-releasing hooks 111 while eliminating the needs for forcefully bending upward crumplable-seatbeltable-rampable-leggable top panel 103a to eliminate personal injuries
    (See FIGS. 3C (PRIOR ART) and 3E);
  b) Can resist the warping forces exerted on top, bottom, left, right, front, and rear panels 103a, 103b, 103c, 103d, 103e, and 103f of the pet crate;
  c) Can resist the twisting forces exerted on top, bottom, left, right, front, and rear panels 103a, 103b, 103c, 103d, 103e, and 103f of the pet crate;
  d) Can resist the bending forces exerted on top, bottom, left, right, front, and rear panels 103a, 103b, 103c, 103d, 103e, and 103f of the pet crate;
  e) Can resist the wobbling forces exerted on top, bottom, left, right, front, and rear panels 103a, 103b, 103c, 103d, 103e, and 103f of the pet crate; and
  f) Can resist the folding forces exerted on top, bottom, left, right, front, and rear panels 103a, 103b, 103c, 103d, 103e, and 103f of the pet crate.

9) It is still yet another object of the new invention to provide a fourteen-device-in-one crumplable-seatbeltable-rampable-leggable-top-panel pet crate, having
side quick-panel-locking-and-releasing stoppers 114 and
side quick-panel-locking-and-releasing hooks 115.

Therefore, the fourteen-device-in-one crumplable-seatbeltable-rampable-leggable-top-panel pet crate:
  a) Can quickly and easily snap-lock front and rear panels 103e and 103f past side quick-panel-locking-and-releasing stoppers 114 into side quick-panel-locking-and-releasing hooks 115 while eliminating the needs for forcefully bending upward crumplable-seatbeltable-rampable-leggable top panel 103a to eliminate personal injuries
    (See FIGS. 3C (PRIOR ART) and 3E);
  b) Can resist the warping forces exerted on top, bottom, left, right, front, and rear panels 103a, 103b, 103c, 103d, 103e, and 103f of the pet crate;
  c) Can resist the twisting forces exerted on top, bottom, left, right, front, and rear panels 103a, 103b, 103c, 103d, 103e, and 103f of the pet crate;
  d) Can resist the bending forces exerted on top, bottom, left, right, front, and rear panels 103a, 103b, 103c, 103d, 103e, and 103f of the pet crate;
  e) Can resist the wobbling forces exerted on top, bottom, left, right, front, and rear panels 103a, 103b, 103c, 103d, 103e, and 103f of the pet crate; and
    Can resist the folding forces exerted on top, bottom, left, right, front, and rear panels 103a, 103b, 103c, 103d, 103e, and 103f of the pet crate.

What is claimed is:

1. A fourteen-device-in-one crumplable-seatbeltable-rampable-leggable-top-panel pet crate, having a thickness, comprising:
  a crumplable-seatbeltable-rampable-leggable top panel
    for functioning as a hanger to hang said pet crate on a latch of an open tailgate of an SUV, for functioning as an arm to attach said pet crate to a top edge of a closed tailgate of an SUV, for functioning as a lid to hook said pet crate on a latch of an engine hood of an SUV, for functioning as a convertor to clamp said pet crate to a top edge of an open door of an SUV, for functioning as a car-seat fastener to fasten said pet crate to a car seat of an SUV, for functioning as a spike to dig into slanted sandy beach, for functioning as a spike to dig into slanted carpeted floor, for functioning as a leg to support said pet crate, for functioning as a ladder to allow a pet to walk up to or to walk down from a back of an SUV, for functioning as a ramp to allow a pet to walk up to or to walk down from a back of an SUV, for functioning as a ladder to allow a pet to walk up to or to walk down from a seat of an SUV for reducing said thickness of said crumplable-seatbeltable-rampable-leggable-top-panel pet crate when said pet crate is folded to reduce space needed in shipping container to significantly reduce shipping cost of said pet crate, for being an anchor when attached to seat or headrest or ceiling of automobile to provide immobilization of said pet crate while traveling, for being a crumple zone when attached to seat or headrest of automobile to provide safety to pets in event of accident, for being detached from said pet crate to convert said fully enclosed pet crate into open-top pet playpen, for being quickly and easily removed to create one or multiple pet playpens or pet runs, for being removed to create an open-top crate to make accessible for pets to create non-confining environment for pets or to create headroom for tall pet or to create way for pets to climb out of said pet crate or to jump out on adjacent playing or resting ramp or balcony or patio to create multiple different configurations of pet runs or to allow pets to sit or stand or play or rest or sleep or climb upon, for functioning as suspended top panel at different elevations, for functioning as multi-pet divider or partition to accommodate two or more pets in side-by-side compartments, for being secured to allow said crumplable-seatbeltable-rampable-leggable top panel to function as vertically-adjustable-height ceiling, for functioning as multi-story floor to accommodate two or more pets in separate compartments stacked vertically, and for functioning as wall or bridge between a plurality of said pet crates to provide a dry above-ground walking surface for pets;

a bottom panel for functioning as a floor;

a left panel having first opening therein for functioning as a wall;

a right panel for functioning as a wall;

a front panel having second opening therein for functioning as a wall;

a rear panel for functioning as a wall;

a urine-waste-catching tray disposed on said bottom panel for catching urine and waste and for storing said crumplable-seatbeltable-rampable-leggable top panel therein to significantly reduce said thickness when said pet crate is folded for storage and transportation;

a removable multi-elevation mezzanine for creating multiple pet-containing compartments to accommodate two or more pets, for creating multiple sized pet-containing compartments to accommodate pet growth from puppy to adult stage, for creating multiple sized pet-containing compartments to accommodate large and small pets simultaneously, for separating multiple pets to allow multiple pets to sleep or rest or play simultaneously therein, for providing vertical separating means within said pet crate to confine multiple pets in independent compartments side by side to function as partition or as divide, for providing horizontal separating means within said pet crate to confine multiple pets in independent compartments above or below one another, for providing means to create horizontal platform within said pet crate to function as pet mezzanine or pet shelf or pet step or pet floor or pet ceiling, for providing means to attach to the interior or exterior of said pet crate to function as a pet bridge or pet step or gate or support to said crumplable-seatbeltable-rampable-leggable top panel, and for providing means to connect between a plurality of said pet crates as exterior panel to function as wall or floor;

a plurality of panel-coupling clips each having a C shape for hingeably coupling said bottom, said left, said right, said front, and said rear panels together;

a panel-folding clamp foldably hinged to said bottom panel for releasably clamping said top, said bottom, said left, said right, said front, and said rear panels together when said pet crate is folded;

a tray-locking clamp foldably hinged to said bottom panel for releasably locking said urine-waste-catching tray inside said pet crate;

a plurality of top arms each having a two-parallel-I shape and welded to said crumplable-seatbeltable-rampable-leggable top panel;

a plurality of top stoppers each having a two-parallel-C shape and molded to corresponding ends of said top arms for resisting said top, said left, said right, said front, and said rear panels to warp, to bend, and to wobble and for resisting said top, said left, said right, said front, and said rear panels to fold;

a plurality of top hooks each having a two-parallel-C shape and molded to corresponding ends of said top stoppers for resisting said top, said left, said right, said front, and said rear panels to warp, to bend, and to wobble and for resisting said top, said left, said right, said front, and said rear panels to fold;

a plurality of side arms each having a two-parallel-I shape and welded to said left and said right panels;

a plurality of side hooks
    each having a two-parallel-C shape and molded to corresponding ends of said side arms for resisting said top, said left, said right, said front, and said rear panels to warp, to bend, and to wobble and for resisting said top, said left, said right, said front, and said rear panels to fold;
a plurality of side stoppers
    each having a two-parallel-C shape and molded to corresponding ends of said side hooks for resisting said top, said left, said right, said front, and said rear panels to warp, to bend, and to wobble and for resisting said top, said left, said right, said front, and said rear panels to fold;
a plurality of removable crumple-zone multi-elevation locking clamps
    each having a ring shape for being grasped,
    for attaching said crumplable-seatbeltable-rampable-leggable top panel to seat or headrest of automobile to be crumple zone to absorb collision force and provide safety to pets in event of accident, and
    for attaching to U-shaped locking hook of tailgate of automobile to be an anchor to allow said crumplable-seatbeltable-rampable-leggable top panel to function as a ramp for pets to enter or exit rear compartment of automobile;
a plurality of removable crumple-zone multi-elevation locking double clips
    each having a two-tandem-C shape and respectively molded to a corresponding end of said removable crumple-zone multi-elevation locking clamps for attaching and removing said crumplable-seatbeltable-rampable-leggable top panel to and from said removable multi-elevation mezzanine, said bottom, said left, said right, said front, and said rear panels at a plurality of angles and elevations,
    for attaching and removing said removable multi-elevation mezzanine to and from said crumplable-seatbeltable-rampable-leggable top panel, said bottom, said left, said right, said front, and said rear panels at a plurality of angles and elevations,
    for attaching and removing said pet crate to and from additional pet crate,
    for attaching said crumplable-seatbeltable-rampable-leggable top panel to be anchor when attached to seat, headrest or ceiling of automobile to provide immobilization of said pet crate while traveling, and
    for attaching said crumplable-seatbeltable-rampable-leggable top panel to seat or headrest of automobile to function as crumple zone to absorb collision force and provide safety to pets in event of accident;
a plurality of removable crumple-zone multi-elevation accessory-hanging ring hooks
    each having a C shape and respectively molded to a corresponding end of said removable crumple-zone multi-elevation locking clamps for attaching said crumplable-seatbeltable-rampable-leggable top panel to seat or headrest of automobile to function as crumple zone to absorb collision force and provide safety to pets in event of accident,
    for hooking and holding a towel thereon,
    for hooking and holding a napkin thereon,
    for hooking and holding medicine thereon, and
    for hooking and holding a toy thereon;
first and second doors respectively hinged on said left and said front panels for respectively closing and opening said first and said second openings;

first and second push-rod hinges respectively welded to said first and said second doors;
first and second push-rods respectively and rotatably attached to said first and said second push-rod hinges;
first and second push-rod levers respectively welded to said first and said second push-rods; and
first and second push-rod-locking rings respectively welded to said left and said front panels for respectively and releasably locking said first and said second push-rods therein.

2. The crumplable-seatbeltable-rampable-leggable-top-panel pet crate of claim 1, wherein said crumplable-seatbeltable-rampable-leggable top panel and said removable multi-elevation mezzanine are angledly attached to each other and to said front and said rear panels for forming a plurality of adjustable-depth pet toy storages.

3. The fourteen-device-in-one crumplable-seatbeltable-rampable-leggable-top-panel pet crate of claim 1, wherein said crumplable-seatbeltable-rampable-leggable top panel and said removable multi-elevation mezzanine are angledly attached to each other and to said rear panel outside said pet crate for forming a pet-drying balcony or awning.

4. The fourteen-device-in-one crumplable-seatbeltable-rampable-leggable-top-panel pet crate of claim 1, said crumplable-seatbeltable-rampable-leggable top panel and said removable multi-elevation mezzanine are attached to each other and to said front and said rear panels and between said left and said right panels for forming multiple-pet compartments.

5. The fourteen-device-in-one crumplable-seatbeltable-rampable-leggable-top-panel pet crate of claim 1, further comprising a handle and two handle hooks, wherein said two handle hooks are molded to said handle, wherein said two handle hooks are for being hooked on said crumplable-seatbeltable-rampable-leggable top panel, wherein said handle is for carrying said pet crate and for fastening said pet crate to a car seat when a seat belt in inserted through said handle and fastened.

6. The fourteen-device-in-one crumplable-seatbeltable-rampable-leggable-top-panel pet crate of claim 1, wherein said removable crumple-zone multi-elevation locking clamps are made of plastic material, metal material, or a combination thereof.

7. The fourteen-device-in-one crumplable-seatbeltable-rampable-leggable-top-panel pet crate of claim 1, wherein said removable crumple-zone multi-elevation locking double clips are made of plastic material, metal material, or a combination thereof.

8. The fourteen-device-in-one crumplable-seatbeltable-rampable-leggable-top-panel pet crate of claim 1, wherein said removable crumple-zone multi-elevation accessory-hanging ring hooks are made of plastic material, metal material, or a combination thereof.

9. The fourteen-device-in-one crumplable-seatbeltable-rampable-leggable-top-panel pet crate of claim 1, wherein said pet crate is partially or entirely made of a material selected from the group consisting of: plastic, wood, metal, wire, and a combination of at least two of said above-mentioned materials.

10. A fourteen-device-in-one crumplable-seatbeltable-rampable-leggable-top-panel pet crate, having a thickness, comprising:
    a crumplable-seatbeltable-rampable-leggable top panel
        for functioning as a hanger to hang said pet crate on a latch of an open tailgate of an SUV,
        for functioning as an arm to attach said pet crate to a top edge of a closed tailgate of an SUV, for functioning as a lid to hook said pet crate on a latch of an engine hood of an SUV, for functioning as a convertor to clamp said pet crate to a top edge of an open door of an SUV, for functioning as a car-seat fastener to fasten said pet crate to a car seat of an SUV, for functioning as a spike to dig into slanted sandy beach, for functioning as a spike to dig into slanted carpeted floor, for functioning as a leg to support said pet crate, for functioning as a ladder to allow a pet to walk up to or to walk down from a back of an SUV, for functioning as a ladder to allow a pet to walk up to or to walk down from a seat of an SUV for reducing said thickness of said crumplable-seatbeltable-rampable-leggable-top-panel pet crate when said pet crate is folded to reduce space needed in shipping container to significantly reduce shipping cost of said pet crate, for being an anchor when attached to seat or headrest or ceiling of automobile to provide immobilization of said pet crate while traveling, for being a crumple zone when attached to seat or headrest of automobile to provide safety to pets in event of accident, for being detached from said pet crate to convert said fully enclosed pet crate into open-top pet playpen, for being quickly and easily removed to create one or multiple pet playpens or pet runs, for being removed to create an open-top crate to make accessible for pets to create non-confining environment for pets or to create headroom for tall pet or to create way for pets to climb out of said pet crate or to jump out on adjacent playing or resting ramp or balcony or patio to create multiple different configurations of pet runs or to allow pets to sit or stand or play or rest or sleep or climb upon, for functioning as suspended top panel at different elevations, for functioning as multi-pet divider or partition to accommodate two or more pets in side-by-side compartments, for being secured to allow said crumplable-seatbeltable-rampable-leggable top panel to function as vertically-adjustable-height ceiling, for functioning as multi-story floor to accommodate two or more pets in separate compartments stacked vertically, and for functioning as wall or bridge between a plurality of said pet crates to provide a dry above-ground walking surface for pets;

a bottom panel for functioning as a floor;

a left panel having first opening therein for functioning as a wall;

a right panel for functioning as a wall;

a front panel having second opening therein for functioning as a wall;

a rear panel for functioning as a wall;

a urine-waste-catching tray disposed on said bottom panel
for catching urine and waste and
for storing said crumplable-seatbeltable-rampable-leggable top panel therein to significantly reduce said thickness when said pet crate is folded for storage and transportation;

a removable multi-elevation mezzanine
for creating multiple pet-containing compartments to accommodate two or more pets,
for creating multiple sized pet-containing compartments to accommodate pet growth from puppy to adult stage,
for creating multiple sized pet-containing compartments to accommodate large and small pets simultaneously,
for separating multiple pets to allow multiple pets to sleep or rest or play simultaneously therein,
for providing vertical separating means within said pet crate to confine multiple pets in independent compartments side by side to function as partition or as divide,
for providing horizontal separating means within said pet crate to confine multiple pets in independent compartments above or below one another,
for providing means to create horizontal platform within said pet crate to function as pet mezzanine or pet shelf or pet step or pet floor or pet ceiling,
for providing means to attach to the interior or exterior of said pet crate to function as a pet bridge or pet step or gate or support to said crumplable-seatbeltable-rampable-leggable top panel, and
for providing means to connect between a plurality of said pet crates as exterior panel to function as wall or floor;

a plurality of panel-coupling clips
each having a C shape for hingeably coupling said bottom, said left, said right, said front, and said rear panels together;

a plurality of top arms
each having a two-parallel-I shape and welded to said crumplable-seatbeltable-rampable-leggable top panel;

a plurality of top stoppers
each having a two-parallel-C shape and molded to corresponding ends of said top arms for resisting said top, said left, said right, said front, and said rear panels to warp, to bend, and to wobble and for resisting said top, said left, said right, said front, and said rear panels to fold;

a plurality of top hooks
each having a two-parallel-C shape and molded to corresponding ends of said top stoppers for resisting said top, said left, said right, said front, and said rear panels to warp, to bend, and to wobble and for resisting said top, said left, said right, said front, and said rear panels to fold;

a plurality of side arms
each having a two-parallel-I shape and welded to said left and said right panels;

a plurality of side hooks
each having a two-parallel-C shape and molded to corresponding ends of said side arms for resisting said top, said left, said right, said front, and said rear panels to warp, to bend, and to wobble and for resisting said top, said left, said right, said front, and said rear panels to fold;

a plurality of side stoppers
each having a two-parallel-C shape and molded to corresponding ends of said side hooks for resisting said top, said left, said right, said front, and said rear panels to warp, to bend, and to wobble and for resisting said top, said left, said right, said front, and said rear panels to fold;

a plurality of removable crumple-zone multi-elevation locking clamps
  each having a ring shape for being grasped,
    for attaching said crumplable-seatbeltable-rampable-leggable top panel to seat or headrest of automobile to be crumple zone to absorb collision force and provide safety to pets in event of accident, and
    for attaching to U-shaped locking hook of tailgate of automobile to be an anchor to allow said crumplable-seatbeltable-rampable-leggable top panel to function as a ramp for pets to enter or exit rear compartment of automobile;
a plurality of removable crumple-zone multi-elevation locking double clips
  each having a two-tandem-C shape and respectively molded to a corresponding end of said removable crumple-zone multi-elevation locking clamps for attaching and removing said crumplable-seatbeltable-rampable-leggable top panel to and from said removable multi-elevation mezzanine, said bottom, said left, said right, said front, and said rear panels at a plurality of angles and elevations,
  for attaching and removing said removable multi-elevation mezzanine to and from said crumplable-seatbeltable-rampable-leggable top panel, said bottom, said left, said right, said front, and said rear panels at a plurality of angles and elevations,
  for attaching and removing said pet crate to and from additional pet crate,
  for attaching said crumplable-seatbeltable-rampable-leggable top panel to be anchor when attached to seat, headrest or ceiling of automobile to provide immobilization of said pet crate while traveling, and
  for attaching said crumplable-seatbeltable-rampable-leggable top panel to seat or headrest of automobile to function as crumple zone to absorb collision force and provide safety to pets in event of accident;
a plurality of removable crumple-zone multi-elevation accessory-hanging ring hooks
  each having a C shape and respectively molded to a corresponding end of said removable crumple-zone multi-elevation locking clamps for attaching said crumplable-seatbeltable-rampable-leggable top panel to seat or headrest of automobile to function as crumple zone to absorb collision force and provide safety to pets in event of accident,
  for hooking and holding a towel thereon,
  for hooking and holding a napkin thereon,
  for hooking and holding medicine thereon, and
  for hooking and holding a toy thereon;
first and second doors respectively hinged on said left and said front panels for respectively closing and opening said first and said second openings;
first and second push-rod hinges respectively welded to said first and said second doors;
first and second push-rods respectively and rotatably attached to said first and said second push-rod hinges;
first and second push-rod levers respectively welded to said first and said second push-rods; and
first and second push-rod-locking rings respectively welded to said left and said front panels for respectively and releasably locking said first and said second push-rods therein.

11. The fourteen-device-in-one crumplable-seatbeltable-rampable-leggable-top-panel pet crate of claim 10, wherein said crumplable-seatbeltable-rampable-leggable top panel and said removable multi-elevation mezzanine are angledly attached to each other and to said front and said rear panels for forming a plurality of adjustable-depth pet toy storages.

12. The fourteen-device-in-one crumplable-seatbeltable-rampable-leggable-top-panel pet crate of claim 10, wherein said crumplable-seatbeltable-rampable-leggable top panel and said removable multi-elevation mezzanine are angledly attached to each other and to said rear panel outside said pet crate for forming a pet-drying balcony or awning.

13. The fourteen-device-in-one crumplable-seatbeltable-rampable-leggable-top-panel pet crate of claim 10, said crumplable-seatbeltable-rampable-leggable top panel and said removable multi-elevation mezzanine are attached to each other and to said front and said rear panels and between said left and said right panels for forming multiple-pet compartments.

14. The fourteen-device-in-one crumplable-seatbeltable-rampable-leggable-top-panel pet crate of claim 10, further comprising a handle and two handle hooks, wherein said two handle hooks are molded to said handle, wherein said two handle hooks are for being hooked on said crumplable-seatbeltable-rampable-leggable top panel, wherein said handle is for carrying said pet crate and for fastening said pet crate to a car seat when a seat belt in inserted through said handle and fastened.

15. The fourteen-device-in-one crumplable-seatbeltable-rampable-leggable-top-panel pet crate of claim 10, wherein said removable crumple-zone multi-elevation locking clamps are made of plastic material, metal material, or a combination thereof.

16. The fourteen-device-in-one crumplable-seatbeltable-rampable-leggable-top-panel pet crate of claim 10, wherein said removable crumple-zone multi-elevation locking double clips are made of plastic material, metal material, or a combination thereof.

17. The fourteen-device-in-one crumplable-seatbeltable-rampable-leggable-top-panel pet crate of claim 10, wherein said removable crumple-zone multi-elevation ring hooks are made of plastic material, metal material, or a combination thereof.

18. A fourteen-device-in-one crumplable-seatbeltable-rampable-leggable-top-panel pet crate, having a thickness, comprising:
  a crumplable-seatbeltable-rampable-leggable top panel
    for functioning as a hanger to hang said pet crate on a latch of an open tailgate of an SUV,
    for functioning as an arm to attach said pet crate to a top edge of a closed tailgate of an SUV,
    for functioning as a lid to hook said pet crate on a latch of an engine hood of an SUV,
    for functioning as a convertor to clamp said pet crate to a top edge of an open door of an SUV,
    for functioning as a car-seat fastener to fasten said pet crate to a car seat of an SUV,
    for functioning as a spike to dig into slanted sandy beach,
    for functioning as a spike to dig into slanted carpeted floor,
    for functioning as a leg to support said pet crate,
    for functioning as a ladder to allow a pet to walk up to or to walk down from a back of an SUV,
    for functioning as a ladder to allow a pet to walk up to or to walk down from a seat of an SUV
    for reducing said thickness of said crumplable-seatbeltable-rampable-leggable-top-panel pet crate when said pet crate is folded to reduce space needed in shipping container to significantly reduce shipping cost of said pet crate, for being an anchor when attached to seat or headrest or ceiling of automobile to provide immobilization of said pet crate while traveling, for being a crumple zone when attached to seat or headrest of automobile to provide safety to pets in event of accident, for being detached from said pet crate to convert said fully enclosed pet crate into open-top pet playpen, for being quickly and easily removed to create one or multiple pet playpens or pet runs, for being removed to create an open-top crate to make accessible for pets to create non-confining environment for pets or to create headroom for tall pet or to create way for pets to climb out of said pet crate or to jump out on adjacent playing or resting ramp or balcony or patio to create multiple different configurations of pet runs or to allow pets to sit or stand or play or rest or sleep or climb upon, for functioning as suspended top panel at different elevations, for functioning as multi-pet divider or partition to accommodate two or more pets in side-by-side compartments, for being secured to allow said crumplable-seatbeltable-rampable-leggable top panel to function as vertically-adjustable-height ceiling, for functioning as multi-story floor to accommodate two or more pets in separate compartments stacked vertically, and for functioning as wall or bridge between a plurality of said pet crates to provide a dry above-ground walking surface for pets;

a bottom panel for functioning as a floor;

a left panel having first opening therein for functioning as a wall;

a right panel for functioning as a wall;

a front panel having second opening therein for functioning as a wall;

a rear panel for functioning as a wall;

a removable multi-elevation mezzanine
  for creating multiple pet-containing compartments to accommodate two or more pets,
  for creating multiple sized pet-containing compartments to accommodate pet growth from puppy to adult stage,
  for creating multiple sized pet-containing compartments to accommodate large and small pets simultaneously,
  for separating multiple pets to allow multiple pets to sleep or rest or play simultaneously therein,
  for providing vertical separating means within said pet crate to confine multiple pets in independent compartments side by side to function as partition or as divide,
  for providing horizontal separating means within said pet crate to confine multiple pets in independent compartments above or below one another,
  for providing means to create horizontal platform within said pet crate to function as pet mezzanine or pet shelf or pet step or pet floor or pet ceiling,
  for providing means to attach to the interior or exterior of said pet crate to function as a pet bridge or pet step or gate or support to said crumplable-seatbeltable-rampable-leggable top panel, and
  for providing means to connect between a plurality of said pet crates as exterior panel to function as wall or floor;

a plurality of panel-coupling clips
  each having a C shape for hingeably coupling said bottom, said left, said right, said front, and said rear panels together;

a plurality of top arms
  each having a two-parallel-I shape and welded to said crumplable-seatbeltable-rampable-leggable top panel;

a plurality of top stoppers
  each having a two-parallel-C shape and molded to corresponding ends of said top arms for resisting said top, said left, said right, said front, and said rear panels to warp, to bend, and to wobble and for resisting said top, said left, said right, said front, and said rear panels to fold;

a plurality of top hooks
  each having a two-parallel-C shape and molded to corresponding ends of said top stoppers for resisting said top, said left, said right, said front, and said rear panels to warp, to bend, and to wobble and for resisting said top, said left, said right, said front, and said rear panels to fold;

a plurality of side arms
  each having a two-parallel-I shape and welded to said left and said right panels;

a plurality of side hooks
  each having a two-parallel-C shape and molded to corresponding ends of said side arms for resisting said top, said left, said right, said front, and said rear panels to warp, to bend, and to wobble and for resisting said top, said left, said right, said front, and said rear panels to fold;

a plurality of side stoppers
  each having a two-parallel-C shape and molded to corresponding ends of said side hooks for resisting said top, said left, said right, said front, and said rear panels to warp, to bend, and to wobble and for resisting said top, said left, said right, said front, and said rear panels to fold;

a plurality of removable crumple-zone multi-elevation locking clamps
  each having a ring shape for being hold grasped,
  for attaching said crumplable-seatbeltable-rampable-leggable top panel to seat or headrest of automobile to be crumple zone to absorb collision force and provide safety to pets in event of accident, and
  for attaching to U-shaped locking hook of tailgate of automobile to be an anchor to allow said crumplable-seatbeltable-rampable-leggable top panel to function as a ramp for pets to enter or exit rear compartment of automobile;

a plurality of removable crumple-zone multi-elevation locking double clips
  each having a two-tandem-C shape and respectively molded to a corresponding end of said removable crumple-zone multi-elevation locking clamps for attaching and removing said crumplable-seatbeltable-rampable-leggable top panel to and from said removable multi-elevation mezzanine, said bottom, said left, said right, said front, and said rear panels at a plurality of angles and elevations,
  for attaching and removing said removable multi-elevation mezzanine to and from said crumplable-seatbeltable-rampable-leggable top panel, said bottom, said left, said right, said front, and said rear panels at a plurality of angles and elevations, for attaching and removing said pet crate to and from additional pet crate, for attaching said crumplable-seatbeltable-rampable-leggable top panel to be anchor when attached to seat, headrest or ceiling of automobile to provide immobilization of said pet crate while traveling, and for attaching said crumplable-seatbeltable-rampable-leggable top panel to seat or headrest of automobile to function as crumple zone to absorb collision force and provide safety to pets in event of accident;

a plurality of removable crumple-zone multi-elevation accessory-hanging ring hooks each having a C shape and respectively molded to a corresponding end of said removable crumple-zone multi-elevation locking clamps for attaching said crumplable-seatbeltable-rampable-leggable top panel to seat or headrest of automobile to function as crumple zone to absorb collision force and provide safety to pets in event of accident, for hooking and holding a towel thereon, for hooking and holding a napkin thereon, for hooking and holding medicine thereon, and for hooking and holding a toy thereon;

first and second doors respectively hinged on said left and said front panels for respectively closing and opening said first and said second openings;

first and second push-rod hinges respectively welded to said first and said second doors;

first and second push-rods respectively and rotatably attached to said first and said second push-rod hinges;

first and second push-rod levers respectively welded to said first and said second push-rods; and first and second push-rod-locking rings respectively welded to said left and said front panels for respectively and releasably locking said first and said second push-rods therein.

19. The fourteen-device-in-one crumplable-seatbeltable-rampable-leggable-top-panel pet crate of claim 18, wherein said crumplable-seatbeltable-rampable-leggable top panel and said removable multi-elevation mezzanine are attached to each other and to said front and said rear panels for forming a plurality of adjustable-depth pet toy storages.

20. The fourteen-device-in-one crumplable-seatbeltable-rampable-leggable-top-panel pet crate of claim 18, wherein said crumplable-seatbeltable-rampable-leggable top panel and said removable multi-elevation mezzanine are attached to each other and to said rear panel outside said pet crate for forming a pet-drying balcony or awning.

* * * * *